United States Patent
Avni et al.

(10) Patent No.: US 9,563,926 B2
(45) Date of Patent: Feb. 7, 2017

(54) SYSTEM AND METHOD OF ENCODING CONTENT AND AN IMAGE

(71) Applicant: Applied Neural Technologies Limited, Tortola (VG)

(72) Inventors: Yossi Avni, Caesarea (IL); Eytan Suchard, Kiryat Bialik (IL)

(73) Assignee: APPLIED MATERIALS TECHNOLOGIES LIMITED, Tortola (VG)

( * ) Notice: Subject to any disclaimer, the term of this patent is extended or adjusted under 35 U.S.C. 154(b) by 556 days.

(21) Appl. No.: 13/831,158

(22) Filed: Mar. 14, 2013

(65) Prior Publication Data

US 2014/0281946 A1    Sep. 18, 2014

(51) Int. Cl.
| | |
|---|---|
| *G06K 9/00* | (2006.01) |
| *G06T 1/00* | (2006.01) |
| *G06F 3/01* | (2006.01) |
| *H04L 29/06* | (2006.01) |

(52) U.S. Cl.
CPC ............ *G06T 1/0021* (2013.01); *G06F 3/017* (2013.01); *G06K 9/00174* (2013.01); *G06K 9/00194* (2013.01); *G06T 1/0028* (2013.01); *H04L 63/12* (2013.01)

(58) Field of Classification Search
CPC .. G06F 3/017; G06K 9/00174; G06K 9/00194
USPC ....................................................... 382/119
See application file for complete search history.

(56) References Cited

U.S. PATENT DOCUMENTS

| | | | |
|---|---|---|---|
| 4,495,644 A | 1/1985 | Parks et al. | |
| 5,402,492 A | 3/1995 | Goodman et al. | |
| 5,434,928 A | 7/1995 | Wagner et al. | |
| 5,828,772 A | 10/1998 | Kashi et al. | |
| 6,307,955 B1 | 10/2001 | Zank et al. | |
| 6,661,908 B1 | 12/2003 | Suchard et al. | |
| 6,687,390 B2 | 2/2004 | Avni et al. | |
| 6,735,336 B2 | 5/2004 | Avni et al. | |
| 6,912,658 B1 | 6/2005 | Glogau et al. | |
| 6,950,538 B2 | 9/2005 | Suchard et al. | |
| 6,985,610 B2 | 1/2006 | Suchard et al. | |
| 7,054,470 B2 | 5/2006 | Bolle et al. | |

(Continued)

FOREIGN PATENT DOCUMENTS

| | | |
|---|---|---|
| BE | 1012936 A6 | 6/2001 |
| CA | 1049146 A2 | 2/1979 |

(Continued)

OTHER PUBLICATIONS

International Search Report and Written Opinion for Application No. PCT/IB2014/000354 dated Aug. 7, 2014.
International Search Report and Written Opinion for Application No. PCT/IB2014/000362 dated Nov. 12, 2014.
Munich M E et al: "Continuous dynamic time warping for translation-invariant curve alignment with applications to signature verification"?Computer Vision?1999, The Proceedings of the Seventh IEEE Internation AL Conference on Kerkyra?Greece Sep. 20-27, 1999? Los Alamitos? CA? USA?IEEE Comput. Soc? US?vol. 1?Sep. 20, 1999 (Sep. 20, 1999)?pp. 108-115?XP010350401?

(Continued)

*Primary Examiner* — Manuchehr Rahmjoo
(74) *Attorney, Agent, or Firm* — Armstrong Teasdale LLP

(57) ABSTRACT

A method of verifying the identity of a user at an authentication server that includes receiving user data relating to a signature gesture entered by a user at a computing device, the user data having a plurality of sample points, verifying the user data at the authentication server by comparing to reference signature data, encoding a verification message within a digital image, and notifying the user that their identity has been verified on the basis of the user data received from the computing device.

7 Claims, 18 Drawing Sheets

(56) References Cited

U.S. PATENT DOCUMENTS

| | | |
|---|---|---|
| 7,424,462 B2 | 9/2008 | Avni et al. |
| 7,715,600 B2 | 5/2010 | Avni et al. |
| 2003/0138135 A1 | 7/2003 | Chung et al. |
| 2004/0017926 A1 | 1/2004 | Tonisson |
| 2004/0136562 A1 | 7/2004 | Sarraf et al. |
| 2005/0036651 A1 | 2/2005 | Wen |
| 2005/0179923 A1 | 8/2005 | Sojian et al. |
| 2007/0250920 A1* | 10/2007 | Lindsay ............... G06F 21/31 726/7 |
| 2007/0292002 A1 | 12/2007 | Kaplan |
| 2008/0320588 A1 | 12/2008 | Lipetz |
| 2009/0268940 A1 | 10/2009 | Kunieda |
| 2009/0328143 A1* | 12/2009 | Ming ................ G06T 1/0028 726/2 |
| 2010/0063922 A1 | 3/2010 | Evans |
| 2010/0225443 A1 | 9/2010 | Bayram et al. |

FOREIGN PATENT DOCUMENTS

| | | |
|---|---|---|
| DE | 19907251 A1 | 8/2000 |
| DE | 19930908 A1 | 1/2001 |
| EP | 0782090 A2 | 7/1997 |
| EP | 0950992 A2 | 10/1999 |
| EP | 1280098 A1 | 1/2003 |
| GB | 2259391 A | 3/1993 |
| GB | 2335767 B | 4/2003 |
| WO | 03009217 A1 | 1/2003 |
| WO | 2004038532 A2 | 5/2004 |
| WO | 2005027502 A1 | 3/2005 |
| WO | 2007127038 A2 | 11/2007 |

OTHER PUBLICATIONS

Search Report for Application No. GB1304602.4 dated Sep. 30, 2013 (claims 1-55).
Search Report for Application No. GB1304605.7 dated Sep. 30, 2013 (claims 1-26).
Search Report for Application No. GB1304605.7 dated Dec. 9, 2013 (claims 27-36).
Search Report & Written Opinion for Application No. GB1304603.2 dated Sep. 4, 2013 (claims 1&13).
Search Report for Application No. GB1304603.2 dated Dec. 5, 2013 (claims 61&71).
Search Report for Application No. GB1304603.2 dated Dec. 5, 2013 (claim 50).
Search Report for Application No. GB1304603.2 dated Nov. 29, 2013 (claims 48&49).
Search Report for Application No. GB1304603.2 dated Nov. 25, 2013 (claim 56).
Search Report for Application No. GB1304603.2 dated Nov. 27, 2013 (claims 40&44).
Search Report for Application No. GB1304603.2 dated Nov. 25, 2013 (claims 19, 36 & 37).
Wikipedia, "Digital Watermarking", <http://en.wikipedia.org/wiki/Digital_watermarking>, last modified Nov. 7, 2013.
Wikipedia, "Steganography", <http://en.wikipedia.org/wiki/Steganography>, last modified Nov. 8, 2013.

* cited by examiner

SYSTEM AND METHOD OF ENCODING CONTENT AND AN IMAGE

CROSS-REFERENCE TO RELATED APPLICATIONS

The present application claims priority from GB Pat. App. No. 1304602.4, filed Mar. 14, 2013. The present application also claims priority from GB Pat. App. No. 1304603.2 filed Mar. 14, 2013. The present application further claims priority from GB Pat. App. No. 1304605.7, filed Mar. 14, 2013.

TECHNICAL FIELD

The present disclosure relates to a method, apparatus and system of encoding content and an image. In particular, this disclosure relates to systems and methods for analysing signature related user data from a user and encoding the signature related user data into an image such as a representation of a user's signature that is embedded into an electronic document.

BACKGROUND

The use of computers, netbooks, notebooks and tablet-like devices within computer networks such as the Internet is constantly growing. Additionally, with the increase in processing power mobile phones (including so called "smartphones" which are essentially computing devices) have become more powerful making functionality traditionally ascribed to the non-mobile computing environment available on a mobile platforms. Further, laptops, tablets and other hand-held computing devices may be connected to the Internet or other wide area networks via a wireless data network, such as those available from any number of wireless carriers.

In concert with this development, there are a myriad of traditional services and transactions that do not easily transition to the electronic computing environment including, for example, services/transactions where a user's hand written signature is required. For example, it is still common practice that the contracts or other documents involved in the sale of property, or a merger or acquisition be executed with human signatures. In addition, in some countries a person's signature is required for even more basic day-to-day transactions. Even further, in some cultures the signature is not enough but rather is replaced or accompanied by a seal that is personal to the user, e.g., a chop. Where the parties to these transactions are not collocated this typically results in the exchange of multiple faxes. Using a fax machine can compromise the integrity of the signature and, in some instances, may allow for breaches in security.

Furthermore, there are other day-to-day transactions that require a person's signature, which could be potentially forged and result in substantial losses to a retail business. For example, when a credit card is stolen, the victim is often unaware that his or her credit card is stolen. In some instances, the victim's physical credit card need not be stolen; simply obtaining the victim's credit card information (such as the credit card account number, expiration date, and credit card security code) allows for creation of any number of physical credit cards bearing the victim's credit card information (known as "credit card cloning"). The cloned credit card may then be used by simply forging the victim's signature without reservation. The end result is that the victim, at minimum, has to resolve the billing issues that arise with the credit card company. In some instances, the impact on the victim can be greater as the fraudulent activity, if it goes undetected long enough, may affect their credit rating.

The ubiquitous reach of computers and their ability to exchange digital copies of information provide a convenient mechanism to transact business. In that regard, security within the computing environment or computer networks is important whenever users exchange personal information such as usernames and password, or other content with each other or trusted websites; or, in general, when business is conducted over such networks. And, although computer networks, such as the Internet, are used in transacting billions of dollars in business, those networks have the capacity to transact additional business such as those described above where traditional signatures are required or considered more trustworthy. However, computing devices and computer networks themselves suffer from security flaws.

These flaws may include man-in-the-middle (MITM) attacks. Considered an active eavesdropping attack, MITM works by an attacking host computer device establishing connections to victims' machines and relaying messages between them. Thus, in cases like these, one victim believes it is communicating directly with another victim, when in reality the communication flows through the host computer device (i.e., the "man in the middle"). The end result is that the attacking host can not only intercept sensitive data, but can also inject and manipulate a data stream to gain further control of a victim's computing device.

Another potential network security flaw is "phishing". In the field of computer security, phishing is the criminally fraudulent act of acquiring sensitive information such as usernames, passwords and credit card details by masquerading as a trustworthy entity in an electronic communication. Phishing attacks are especially commonplace when popular websites are involved, such as social networking websites (e.g., Facebook or MySpace), auction websites (e.g., EBay), or websites for any number of banks. Phishing is typically carried out by e-mail or instant messaging, and it often directs users to enter details at a fake website whose look and feel are almost identical to the legitimate one. Even when using server authentication, it may require tremendous skill to detect that the website is fake. Phishing is an example of social engineering techniques used to fool users and exploits the poor usability of current web security technologies. Attempts to deal with the growing number of reported phishing incidents include legislation, user training, public awareness, and technical security measures.

As part of the growing increase in electronic based communications, parties also conduct more transactions and document exchanges electronically. Thus, as mentioned above, the need for electronic documentation and document authenticity (i.e., the ability to either validate an individual signing an electronic document or subsequently validating who signed the electronic document) is a challenging task.

Current solutions tend to be based on signing electronic documents using digital certificates and public and private encryption keys. However, once an electronic document is signed using a digital certificate, it generally cannot be altered, such as by adding a person's handwritten signature). Thus, there is a challenge in integrating a person's physical signature (i.e., a hand-written signature or other type of signature gesture such as a physical gesture) within digitally signed documents.

It is therefore an object of the present disclosure to provide a method of encoding content, and in particular signature based content, into an image for use within digitally signed documents. Of utility then, are methods, apparatus and systems for encoding content, such as for example signature based content, into an image for use within digitally signed documents.

SUMMARY

According to a first aspect of the present disclosure there is provided a method of a method of encoding content data into a digital image comprising: determining bit values of a pixel within the digital image; modifying the bit values within the pixel based on content data to be encoded in order to encode the content data into the digital image; wherein determining the bit values of a pixel within the digital image comprises determining a binary representation of the bit values of the pixel and wherein modifying the bit values comprises determining a binary representation of the content data to be encoded within the pixel and encoding the content data using a reversible binary operation.

The present disclosure provides a method of encoding content (e.g. data relating to a user of a verification system) into a digital image by modifying the bit values of pixels within the image via a reversible binary operation. As the process of encoding is via a reversible operation an encoded digital image may conveniently also be decoded in order to recover the encoded data.

The digital image may comprise a grayscale image such that a black pixel is represented by all the bit values being set to a value of zero and a white pixel is represented by all the bit values being set to a value of one.

Alternatively, the digital image may comprise a Red-Green-Blue (RGB) image such that each pixel within the image is expressed as an RGB triplet of colour components and wherein the determining step comprises determining the bit values of each colour component of the RGB triplet within the pixel and wherein the modifying step comprises modifying at least part of one colour component within the triplet of the pixel via the reversible binary operation.

The modifying step may comprise modifying at least part of each colour component within the triplet of the pixel. In this manner the content data to be encoded may be split across the colour components of a pixel.

The RGB image may conveniently be based on a colour system where the colour components within the triplet have integer values from 0 to 255.

The colour components may conveniently comprise n bits each, such as 8 bits. The step of modifying a colour component may then conveniently comprise modifying m bits of a colour component, where m<n. For example, for a 8-bit per component colour system then 3 bits may be modified on the first two components (Red (R) and Green (G)) and 2 bits may be modified on the last component (Blue (B)). In this manner a full byte of content data may be encoded into a single pixel. It is noted that the exact number of bits per component that may be modified may be varied.

The method may conveniently comprise determining an area of the digital image where all the pixels have the same bit values such that data to be encoded within the digital image is confined within the determined area of the digital image. For example, the digital image may comprise a background portion and the encoding may be confined to the background area. If the initial colour of the background area is not known to a decoding entity then the content data may effectively be hidden within the digital image as the decoding entity will not know from what starting point the reversible binary operation was made.

Accordingly, the colour of the determined area may comprise a pre-determined colour (predetermined bit values) and the step of determining bit values of a pixel within the digital image may comprise looking up the predetermined bit values. In one application of the present disclosure a user may be associated with a pre-determined colour during a registration process and different users may be allocated different starting colours for the predetermined area. This allows a level of security to be introduced into the encoding process as the "starting" colour for the predetermined area is effectively a private piece of data. For an 8 bit RGB colour system there are 256*256*256=16777216 colours to choose from.

The reversible binary operation may conveniently be an XOR operation.

According to a second aspect of the present disclosure there is provided a computing device for encoding content data into a digital image comprising a processor arranged to: (i) determine bit values of a pixel with the digital image and (ii) modify the bit values within the pixel based on the content data to be encoded in order to encode the content data into the digital image wherein the processor is arranged to (a) determine a binary representation of the bit values of the pixel in order to determine bit values of a pixel within the digital image and (b) modify the bit values by determining a binary representation of the content data to be encoded within the pixel, the processor being arranged to encode the content data using a reversible binary operation.

The present disclosure may conveniently extend to a server device comprising a computing device according to the second aspect of the present disclosure. The server device may further comprise inputs arranged to receive content data (e.g. from a signature capturing device) and also outputs arranged to output a digital image encoded with content data.

The present disclosure may also extend to a mobile computing device (such as a smartphone, tablet, laptop or other communications device) comprising a computing device according to the second aspect of the present disclosure. The mobile computing device may further comprise inputs arranged to receive content data (e.g. via a touchscreen device, smart-stylus, or other input device).

According to a third aspect of the present disclosure there is provided a method of encoding user data within a signature field of an electronic document comprising: receiving user data captured as a user enters a signature gesture, the user data comprising a plurality of sample points; generating a digital image for incorporation into the signature field of the electronic document; encoding the user data within pixels of the digital image; inserting the digital image within the signature field of the electronic document.

The signature gesture may be entered by the user into a computing device via an input device. The signature gesture may be sampled as it is entered into the computing device in order to produce user data. Each sample point of user data may comprise position data and temporal data. Conveniently, the signature gesture may be entered via a touch interface and the user data may comprise touch position data. The user data may further comprise lift data representing when the user is not in contact with the touch interface during signature capture.

In an alternative embodiment, the signature gesture may be entered via a motion sensing device, such as a Microsoft Kinect system. In such an implementation the user data may comprise three-dimensional positional data.

The digital image that the user data is encoded into may comprise a background portion. The background portion may comprise a unique colour associated with the user whose data is being encoded into the digital image. The unique colour may be stored within a user profile (for example on an authentication/verification server).

The user data may be encoded into pixels forming the background portion of the signature field. It is noted that where there's a unique colour in the background the encoding of data into pixels forming the background portion may effectively provide an additional layer of security as noted above.

Conveniently, the user data may be encoded within pixels of the signature field using the method of the first aspect of the present disclosure.

The method may further comprise generating a representation of the entered signature gesture from the captured user data wherein the representation of the captured signature gesture may comprise a trace line reproduction of the signature gesture entered by the user (in other words a "pen & ink" style representation of the entered/received signature gesture may be generated). As an alternative to encoding data within a background portion of a digital image, user data may be encoded into pixels forming the trace line reproduction of the signature. (In a further alternative data may be coded into multiple areas of a digital image, e.g. trace line and background portion). Conveniently, the user data may be encoded within pixels of the trace line reproduction of the signature using the method of the first aspect of the present disclosure. The trace line reproduction may comprise a unique colour associated with the user.

According to a fourth aspect of the present disclosure there is provided a computing device for encoding user data within a signature field of an electronic document comprising: an input for receiving user data captured as a user enters a signature gesture, the user data comprising a plurality of sample points; image generator for generating a digital image for incorporation into the signature field of the electronic document; an encoder for encoding the user data within pixels of the digital image; an insertion module for inserting the digital image within the signature field of the electronic document.

According to a fifth aspect of the present disclosure there is provided a server device for encoding user data within a signature field of an electronic document comprising: an input for receiving user data captured as a user enters a signature gesture, the user data comprising a plurality of sample points; image generator for generating a digital image for incorporation into the signature field of the electronic document; an encoder for encoding the user data within pixels of the digital image; an output for outputting a digital image having the user data encoded therein.

The output may be arranged to send the digital image encoded with user data to a further computing device for insertion within the signature field of an electronic document. The server device may further comprise an insertion module for inserting the digital image within the signature field of the electronic document.

According to a sixth aspect of the present disclosure there is provided a method of encoding user data within a digital image comprising: receiving user data that has been captured as a user performs a verification action, the user data comprising a plurality of sample points; and, encoding the user data within pixels of the digital image.

The method may further comprise outputting the digital image with encoded user data for use as a verification stamp. Conveniently, at least some of the image comprises encoded user data captured during a user verification action. The user data may be encoded according to the method of the first aspect of the present disclosure.

According to a seventh aspect of the present disclosure, there is provided a computing device for encoding user data within digital image comprising: an input for receiving user data captured as a user performs a verification action, the user data comprising a plurality of sample points; an encoder for encoding the user data within pixels of the digital image.

The disclosure extends to a server comprising a computing device according to the seventh aspect of the disclosure.

According to an eighth aspect of the present disclosure there is provided an electronic document comprising a signature field wherein the signature field comprises user data encoded according to the method of the third aspect of the present disclosure. To prevent changes to the electronic document, the document may be digitally signed with a digital certificate to prevent alteration.

According to a ninth aspect of the present disclosure there is provided a method of verifying the identity a user from user data encoded within the pixels of a digital image, the method comprising: decoding user data from pixels within the digital image, the user data representing data captured when a user entered a signature gesture into a computing device; comparing the user data with a reference signature gesture to determine the identity of the user.

According to a tenth aspect of the present disclosure there is provided a computing device for verifying the identity of a user from user data encoded within the pixels of a digital image, comprising: a decoder arranged to decode user data from pixels within the digital image, the user data representing data captured when a user entered a signature gesture into a computing device; a processor arranged to compare the user data with a reference signature gesture to determine the identity of the user.

In one aspect the disclosed systems and methods are directed to a digital chop that encapsulates a user's biometric signature information (e.g., hand-writing signature) and the user signature image. An embodiment of this technology includes a mechanism developed by Applied Neural Biometrics Ltd. to securely encode human signatures and an image.

In yet another aspect, the disclosed systems and methods are directed to a verification process whereby a verification server receives user signature data, and verifies whether the received user signature data is authentic. The signature data may be received from a variety of sources including brick-and-mortar businesses, online retailers, online auction providers, third-party payment processors (e.g., PayPal), and other such sources. The verification server may confirm or provide a message to the provider of the user signature data that the user signature data is authentic or not authentic.

This technology may be implemented in desktop PCs, laptops, tablets, notebooks, smartphones and, in general, computing devices that support remote and secure signing of electronic documents. In one embodiment, the technology is implemented in a computing environment with computing devices that have touchscreens, such as tablets and smartphones. The technology may be implemented in any electronic document format, such as the Microsoft Word "DOC" format and the Adobe "PDF" format.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

The disclosed systems and methods may be deployed in a myriad of different environments, and these and other variations and combinations of the features discussed above and below can be utilized without departing from the subject matter as defined by the claims. The provision of the examples described herein (as well as clauses phrased as "such as," "e.g.", "including" and the like) should not be interpreted as limiting the claimed subject matter to the specific examples; rather, the examples are intended to illustrate only some of many possible aspects of this disclosure.

BRIEF DESCRIPTION OF THE DRAWINGS

Embodiments of the present disclosure will now be described, by way of example only, with reference to the accompanying drawings, in which like reference numerals are used for like parts, and in which.

DETAILED DESCRIPTION

Figure 1A:
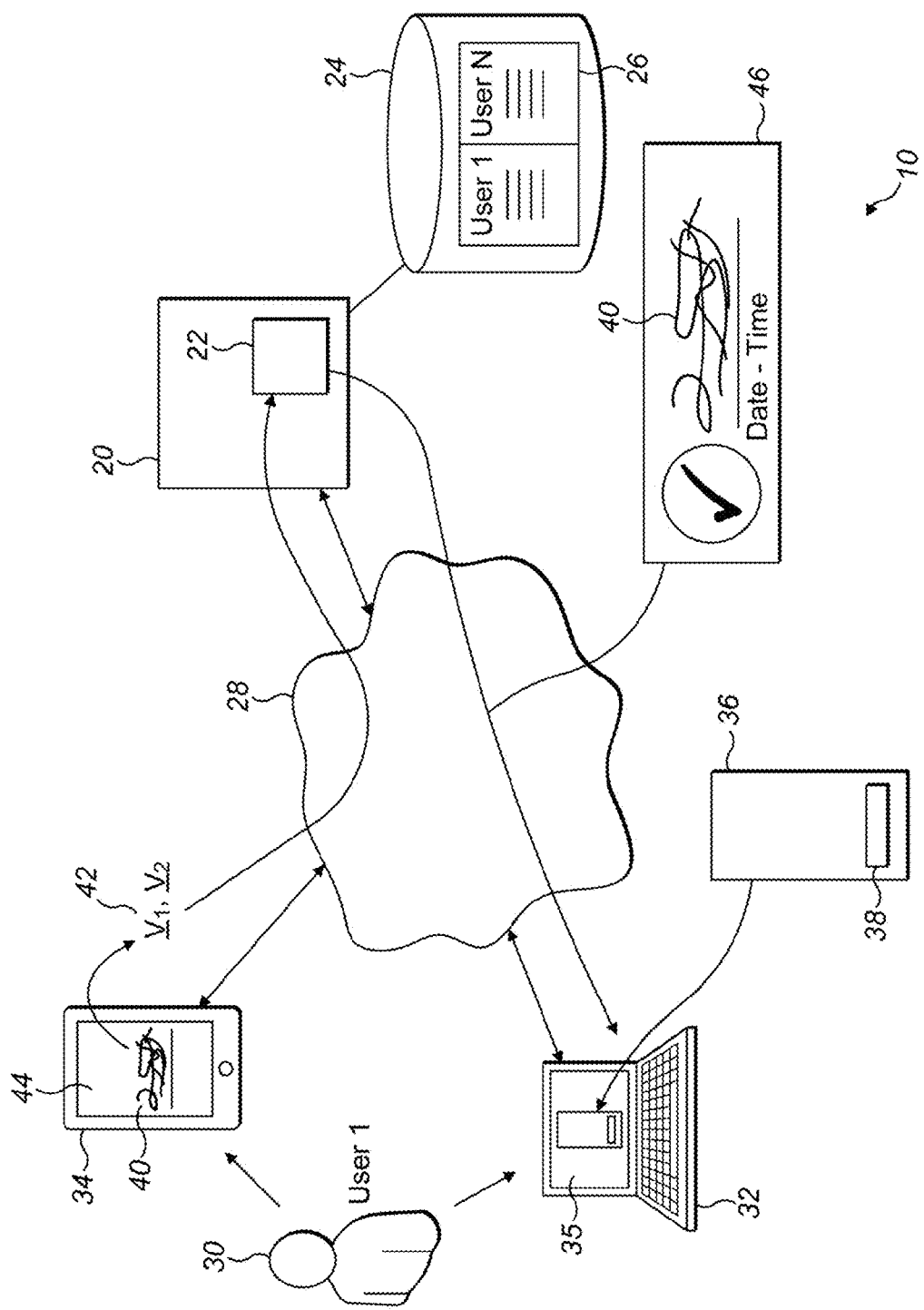
FIG. 1A shows an overview of a system in accordance with aspects of the present disclosure.

The present disclosure comprises a number of different aspects relating to the encoding of data into a digital image and to various uses for such encoded data. For example, the disclosure provides a method of signing an electronic document in which user data (or user signature data), which has been captured during a signature or verification action, is received and then encoded into a digital image. The digital image may then be embedded into the electronic document to indicate that the user has seen and signed the document and to allow their user data, which was captured during the signature process, to be recovered in the event of a dispute.

The digital image plus encoded user data may therefore be thought of as a digital "chop" or seal that may be applied to a document to indicate that a user has signed off on the document. Uses of such a method may include contract signature, payment processes, retail shopping (e.g., at the point-of-sale), in the review and approval of documents, and in other similar situations.

User data may be entered via a touch-enabled device (e.g. the screen of a smartphone) or may be entered via the use of a smart pen that tracks the pen tip position as the user signs, such as pens and/or pads found at many retail shopping locations. The user data may comprise a number of sample points, e.g. the position of a user's finger or of the pen tip over time. Pen/finger lift may also be captured such that a number of vector points are captured. The captured user data may be sent to and received by an authentication device, such as a remote server, that can process the received user data and compare it against previously captured user data in order to verify the identity of the user.

In one example, a user may enter a signature gesture at a device and the captured user data may be sent to a server for verification of the user's identity. Where the user is verified, the user may be able to sign/approve a document. The captured user data that has been received may also be encoded into a digital image and applied in the manner of a digital chop/seal to the document that has been reviewed/ approved in order to indicate that the user has seen/approved the document. A digital certificate may subsequently be applied to the document to prevent further modification of the document. The presence of the digital chop within the document may serve a number of purposes. It may show that the user has signed and it may allow the encoded user data to be recovered at a later date in the event that a user disputes that the signature is genuine.

In another example, the disclosure provides for a system where a user signature is provided as a digital chop to a computing device, e.g., a server that compares the digital chop to a locally stored chop for authentication. The computing device then transmits a message to another computing device indicating the result of the comparison. In accordance with this aspect of the disclosure, the digital chop may include the user's handwritten signature, and data that encodes a portion of the handwritten signature using pixels associated with the handwritten signature. Those pixels may be used as part of the encoding process and may further comprise those that provide a background to the handwritten signature. Alternatively, the pixels may comprise an image selected by the user. The encoded data may be embedded in the handwritten signature, in the background associated with the handwritten signature, or in the image selected by the user. In some circumstances, the encoded data may not be visible to the human eye. However, if a large enough portion of the signature, background or image (i.e., enough pixels) is encoded, the encoded data may be visible. To the extent it is visible, it may appear as a change in colour or shading relative to the surrounding area.

In addition, this disclosure provides for encoding content data into a digital image via a reversible binary encoding operation. This disclosure also provides for the encoding of user data received as a result of a signature capture processor other verification action into a digital image.

In yet further aspects of the present disclosure multiple signature gestures relating to a user may be used to manage access to a protected resource such as a secure electronic system or to a purchasing system or any other system where user access may be controlled. According to these aspects of the present disclosure a user may define a number of different signature gestures that relate to him/her (e.g. the user may sign an "initials only" version of their signature, a "first name only" version and a full name version). Depending on the level of access required by a user they may be requested to provide different versions of their signature. For example, low value access areas may only require an initial only version of their signature whereas high value access areas may require a full signature. The varying signature lengths represent different levels of signature complexity and therefore reproducibility by a forger, thus longer signatures may be more difficult to copy. In this manner a user's access to a protected resource can be managed. Conveniently a security policy may link different actions with different levels in the policy and therefore different signatures that are required.

Signature gestures may comprise traditional "pen and ink" style signature actions by may also comprise more abstract signature gestures such as drawing a predefined picture or even a physical movement based gesture that could be captured by a device such as a Microsoft Kinect type device.

In a further aspect of the present disclosure, a "jamming" method is disclosed that makes the reproduction of a genuine signature gesture by a fraudulent user more difficult.

A signature analysis method and system is also disclosed herein.

In providing a "signature," a user may provide a "signature gesture" via a suitable input device. A traditional signature gesture would be a signature that a user would sign using a pen and paper. The following description relates to the inputting of signatures using a computing device with a suitable input device. Examples of signature gestures in the following description include, but are not limited to, "pen & paper" style signature gestures that are provided via an electronic pen or stylus, signature gestures entered via a touch-enabled device (e.g. a smartphone touchscreen, tablet or computer touchscreen, trackpad or similar) and signature gestures (e.g. hand and body movements) entered via a motion detection system such as, for example, the Microsoft Kinect system. It is noted that the entered signature gesture may correspond to a user's "pen and paper" signature gesture or alternatively may be an abstract signature gesture provided by similar methods.

References to verification, validation and authentication should be regarded as interchangeable. In various embodiments of the present disclosure the verification/validation/authentication action that is performed by a user comprises entering a signature gesture into a suitable input device.

In the following description a user's signature gesture is sampled during a signature action to provide a number of sample data points, the "user data". Whereas known signature analysis systems may be operable to compare a visual image/representation of a user's signature gesture, the disclosed systems and methods analyse this user data in order to verify a user's identity. In other words it is the sampled data (or data derived from such sampled data) that is analysed rather than a comparison of a signature trace line with another signature trace line. User data may comprise positional data relating to the position of a pen, finger or input device during the signature process and may also comprise temporal data. In the example of a signature gesture entered via a touchscreen device the user data may comprise x, y data relating to the position of the finger on the touchscreen, contact data relating to whether the finger is in contact with the screen when the sample data point is taken and time data.

Various embodiments of the present disclosure discussed below envisage the encoding of the captured user data into a digital image file (referred to below as a "digital image"). It is noted that there may be a variety of different mechanisms used for encoding the data into the digital image. It is further noted that the user data may be encoded into a variety of digital image types. For example, the digital image may comprise a white rectangular background portion and a "pen and ink" style representation of the captured signature gesture. In such a case the user data may be encoded into the "ink" of the representation or it may be encoded into the white background (or a combination of both). In further examples, the background portion may be represented in a specific colour that could be associated with the user providing the user data. The "ink" representation may also be provided in a specific colour (as well as a traditional ink colour such as blue or black). In yet further examples the digital image could be an abstract image or a user selected image (e.g. a famous landmark such as Big Ben, a personal photo etc.). In all of the above examples the location of the encoded data could be restricted to a certain area of the image (e.g. top left corner only, on the "ink" representation only, on the hands of the clock face of Big Ben etc.). The location of the encoded data may also represent a security feature as a verification system may require knowledge of where the data is encoded in order to extract the encoded data for verification purposes.

A representation of a signature gesture may, as noted above, be provided by a photographic-like representation of an entered hand-written signature. It may also be provided by any other suitable arrangement of the captured user data within an image. In one example, letters making up a user's hand-written signature gesture may be superimposed upon one another rather than being represented in the manner of a traditional signature (e.g. across a page).

The present disclosure is described with reference to the system architecture of FIG. 1A. However, it is to be appreciated that the present disclosure may be used in environments other than the distributed computer environment described in those drawings. For example, one or more embodiments of the present disclosure may be implemented on a standalone computer.

It is noted that the implementation architectures described below relate generally to a client side/server-side arrangement. It should be noted however that the various aspects of the present disclosure may be provided in differing computer architecture arrangements. For example, the methods may be provided locally only (e.g., at the user only on, for example, a smartphone).

Furthermore, although the input device envisaged below for receiving a user's signature gesture is in most cases described as a touch-screen device other arrangements are possible. For example a "smart-stylus" device may be linked via Bluetooth to a smartphone in a user's pocket that does all the required computation. In a further example a "smart-watch" may be linked to a mobile device and a user may provide their signature gesture by interacting with the smart-stylus or smart-watch. Other arrangements are also envisaged, e.g. using a traditional keyboard and mouse set up, a computer web-cam set up and any other suitable set up that may be used to collect/receive a user's signature gesture.

FIG. 1A shows a signature validation system 10 comprising a validation server 20 having a validation processing means 22 and being in communication with a local database 24 of signature related data and user profiles 26. As shown in FIG. 1A the validation server 20 is in communication via the Internet 28 with a user 30. The user 30 has access to two separate Internet enabled devices, a laptop computer 32 and a "smartphone" device 34 such as an iPhone, iPad, Android based devices, or other similar devices. Though in this embodiment, the system is shown the devices is shown as communicating over the Internet, any other wide-area or local-area network may comprise the network over which the computing devices communicate with the server.

Figure 1B:
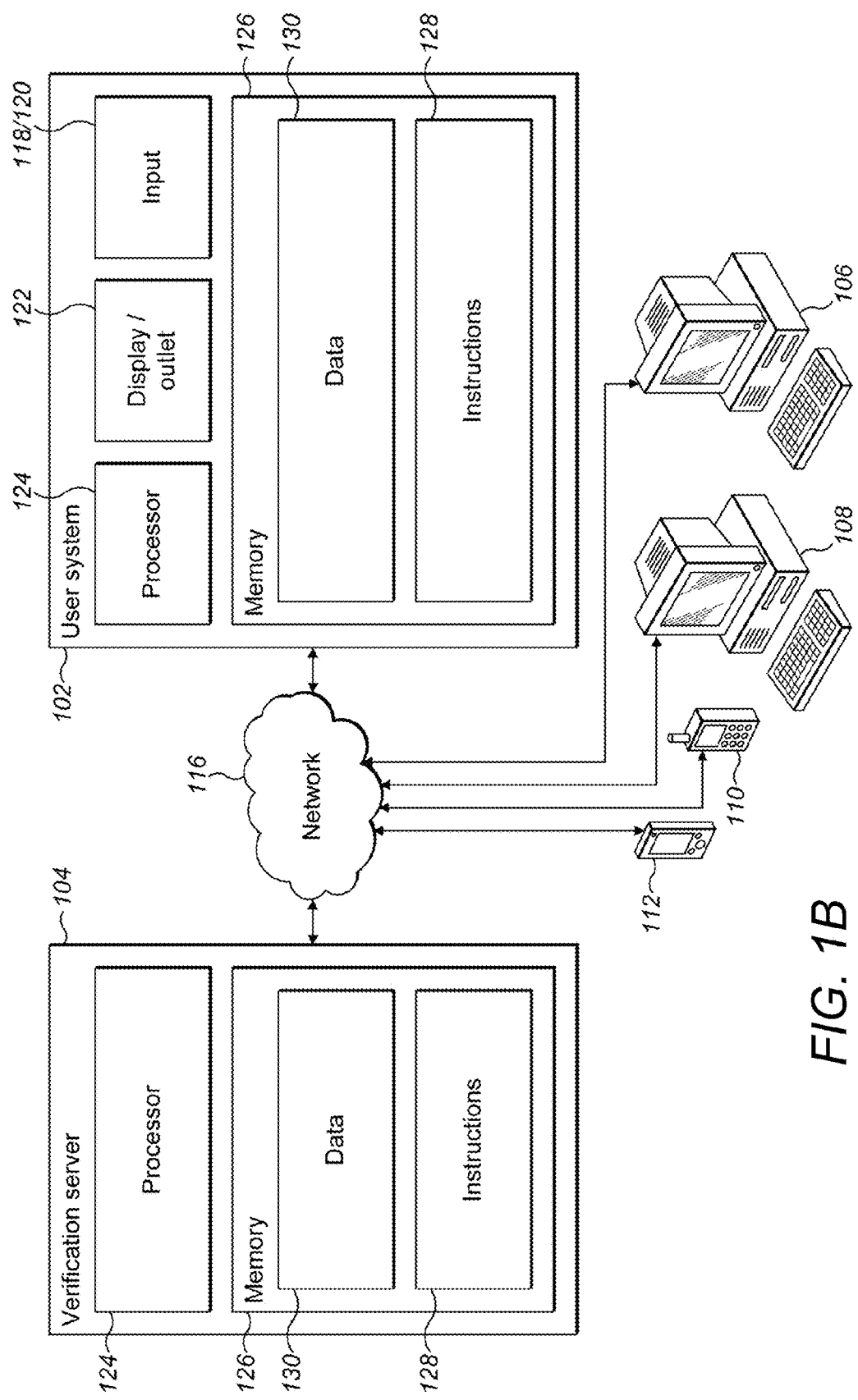
FIG. 1B illustrates a schematic diagram of a computer system depicting various computing devices that can be used alone or in a networked configuration in accordance with aspects of the present disclosure.

Specifically, turning to FIG. 1B, this illustration presents a schematic diagram of a computer system depicting various computing devices that can be used alone or in a networked configuration in accordance with aspects of the present disclosure. For example, this figure illustrates a computer network 100 having a plurality of computers 102, 104, 106 and 108 as well as other types of devices such as portable electronic devices such as a mobile phone 110 and a PDA 112. Various elements in the computer network 100 may be interconnected via a local or direct connection and/or may be coupled via a communications network 116 such as a local area network ("LAN") such as a WiFi network, a wide area network ("WAN"), the Internet 28, etc. and which may be wired or wireless.

Each computer apparatus can include, for example, one or more computing devices having user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop/palmtop. As shown in FIG. 1B each computer such as computers 102 and 104 contains a processor 124, memory 126 and other components typically present in a computer.

Memory 126 stores information accessible by processor 124, including instructions 128 that may be executed by the processor 124 and data 130 that may be retrieved, manipulated or stored by the processor. The memory may be of any type capable of storing information accessible by the processor, such as a hard-drive, ROM, RAM, CD-ROM, flash memories, write-capable or read-only memories. The processor 124 may comprise any number of well-known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present disclosure are explained in more detail below.

Data 130 may be retrieved, stored or modified by processor 124 in accordance with the instructions 128. The data may be stored as a collection of data. For instance, although the disclosure is not limited by any particular data structure, the data may be stored in computer registers, in a relational database as a table having a plurality of different fields and records, XML documents, or flat files. Map-type image data may be stored in flat files such as keyhole flat files ("KFF").

The data may also be formatted in any computer readable format such as, but not limited to, binary values, ASCII etc. Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable CD-ROM or DVD. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives, server farms or the like.

In one aspect, server 104 communicates with one or more client computers 102, 106 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 104 and client computers and other devices are capable of direct and indirect communication with other computers, such as over network 116. Although only a few computing devices are depicted in FIG. 1B it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth and HTTP. Communication across the network, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the disclosure are not limited to any particular manner of transmission of information. For example, in some aspects, the information may be sent via a medium such as a disk, tape, CD-ROM, DVD, or directly between two computer systems via a dial-up modem. In other aspects, the information may be transmitted in a non-electronic format and manually entered into the system.

Moreover, computers and client devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110.

Figure 2A:
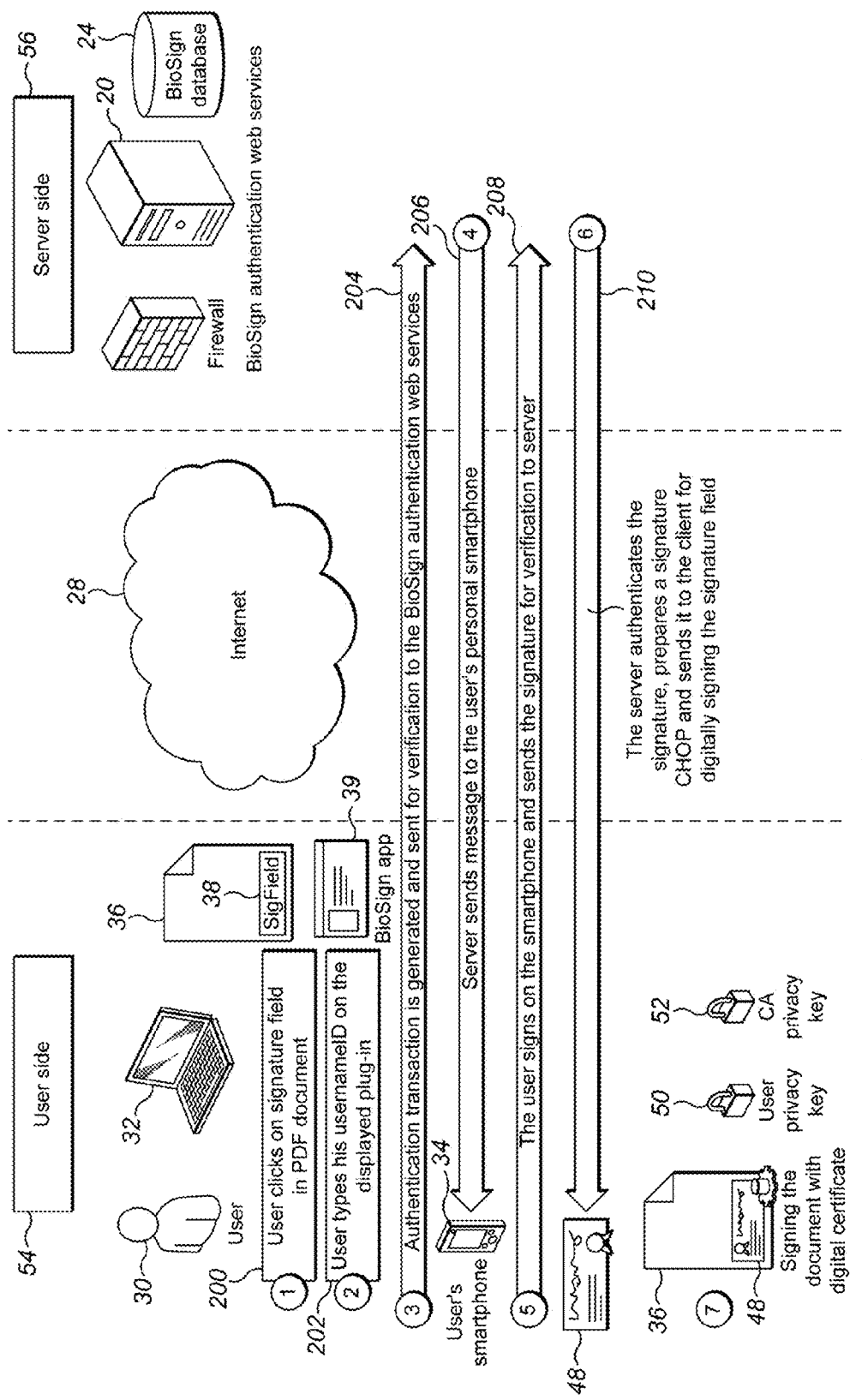
FIG. 2A shows a flow chart illustrating the interactions between a user and a verification server during a signature signing process within the system shown in FIG. 1A.

A method of operation of the signature validation system is hereby described in relation to FIG. 1A and the flow diagram of FIG. 2A.

The laptop computing device 32 comprises a display device 35 which in the example of FIG. 1A is displaying an electronic document 36 (e.g., a document provided in the Adobe PDF format) comprising a signature field 38.

In the event that the user 30 wishes to sign the document 36, he may click, in step 200, on the signature field 38 within the PDF document thereby causing a plug-in to run and a dialog box 39 (shown in FIG. 2A) to appear on the display device 34 of the laptop computing device 32.

The dialog box 39 prompts the user to enter a username/ID (step 202) and an authentication request is sent (step 204) to the verification server 20.

The verification server 20 retrieves the user's profile 26 from the database 24 and initiates a signature verification process in which a message may be sent (step 206) to the user's mobile device 34 with a request to provide a signature (in other words a request for the user to enter a signature gesture 40).

The user then signs, step 208, on their mobile device 34 and the signature is sent for verification by the verification server 20. In one implementation the mobile device may be arranged to sample the signature over time and a series of vector data points 42 related to the signature may be sent to the verification server 20.

As may be appreciated, the process of FIG. 2A may account for a man-in-middle attack by separating the device requesting signature verification, e.g., the laptop 32, from the device 34 that provides the verifying signature. Since these are two different computing devices, the attacker would necessarily need to be between the server 20 and laptop 32 and the server and the mobile device 34. This technique may be applied in other embodiments where the device requesting verification or authentication is also the device that provides the verifying signature. This technique may be further be used in the context of logging on to a standalone computer or other computing device, including mobile computing devices. In such an embodiment, the instructions and data needed for verification would be resident in the standalone computer, laptop, mobile phone or other computing device.

Returning to FIG. 1A, the mobile device 34 comprises a touchscreen 44 such that a user's signature may be entered by touching the screen and tracing out the signature 40. The mobile device 34 may be arranged to sample the user's finger position (e.g., x- and y-coordinates) at a number of measurement points (e.g., measurement over time) such that a number of vector data points (x, y, t) are recorded. These vector data points may represent user data that is captured during the signature process.

Additionally the mobile device 34 may measure other aspects of the user interacting with the touchscreen, such as when the user's finger is in contact with the touchscreen during the signature process and when it is not in contact (e.g. when the user's finger is lifted from the touchscreen as part of their signature). In such an instance each vector data point may also comprise a fourth variable (e.g. a contact or no contact indication flag). In this manner the vector data points may take the form (x, y, t, c), where "c" represents the contact or no contact indication flag.

It is noted that although a touchscreen data entry method is illustrated in FIG. 1A, alternative data entry methods as mentioned above may be used, e.g., a pen that tracks pen tip movements, a touchscreen and stylus entry (e.g. as seen on the Samsung Note device) or any other suitable data entry means for capturing a user signature. Moreover, other touch-sensitive devices may include touch-sensitive pads found at point-of-sale locations.

In a further alternative the data entry method may utilise a motion sensing control interface (e.g. Microsoft Kinect system). In such an alternative the data entry system may track the position of, for example, the user's hand (x and y coordinates) over time (t). In this alternative example there would be no "contact" data field as there would be no contact between the user and a control/data entry surface. Potentially depth data (z coordinate) might be collected such that the vector data point comprises (x, y, z, t).

The verification server then authenticates, step 210, the signature via a suitable signature verification method. Examples of such a signature verification method may comprise those at www.biosignid.com/poc and in relation to FIGS. 15 to 20 below.

Once the user and/or the user's signature has been authenticated, a digital representation of the entered signature in the form of a digital image file 46 is created and sent back to the user 30. The digital image 46 may then be incorporated into the PDF document 36 using a known digital certificate signature 48 process. The document may, as part of this process, be signed using the user's private key 50 and also the public key 52 of a certification authority.

Once signed, the document 36 cannot be altered without cancelling the validity of the digital certificate 48.

Figure 2B:
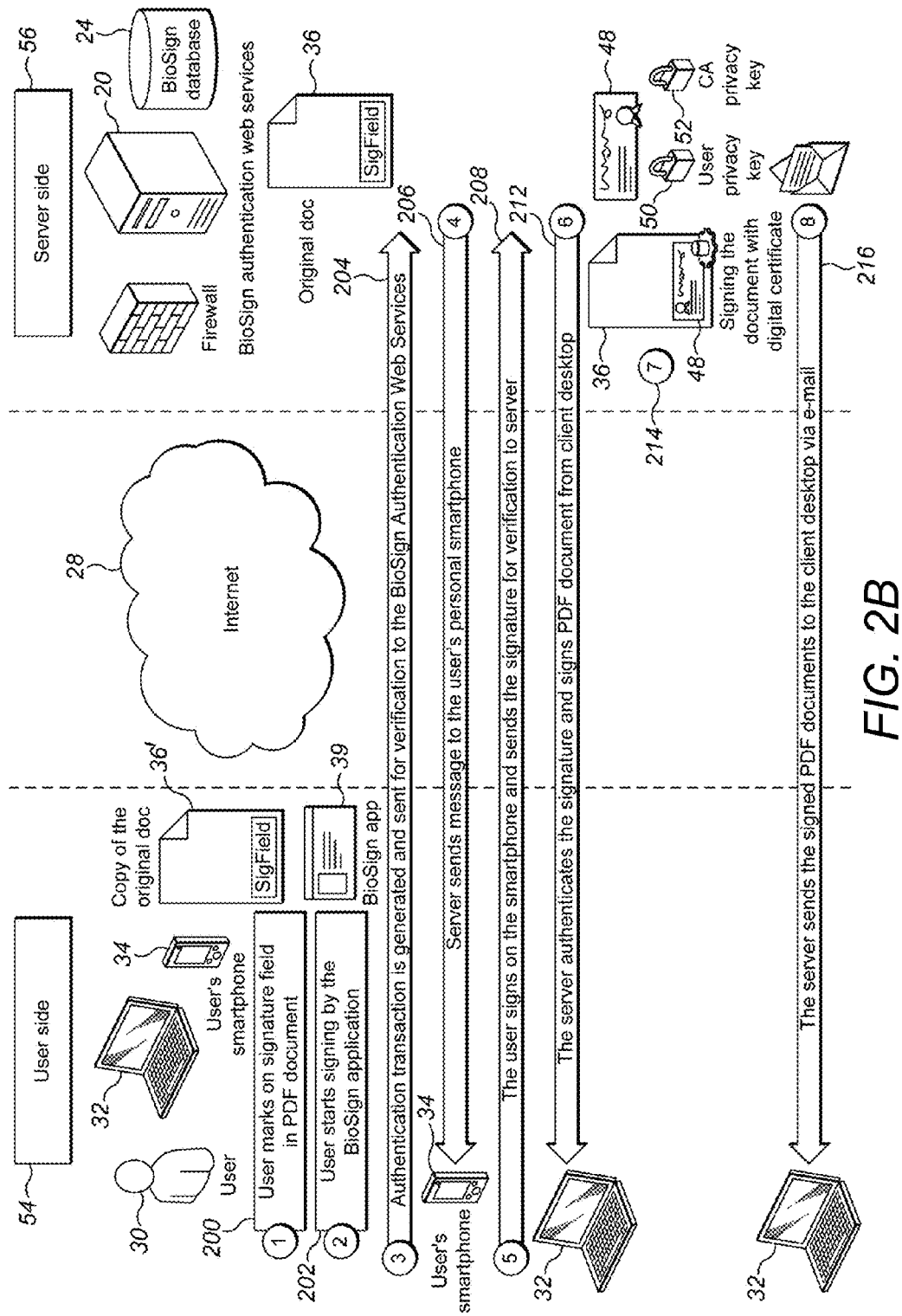
FIGS. 2B and 2C are flow charts illustrating further interactions between a user and a verification server during a signature signing process.

A method of operation of the signature validation system 10 in accordance with a further embodiment of the present disclosure is hereby described in relation to FIG. 1A and the flow diagram of FIG. 2B.

The further embodiment shown in FIG. 2B is similar to that of FIG. 2A. In FIG. 2A it is noted that the electronic document 36 for signature is stored on the user side 54 of the system. Data relating to the user's sampled signature 40 is, in FIG. 2A, sent over the internet 28 to the server side 56 of the system 10 where the user 30 is verified and then an image file 46 is created and sent to the user side 54 of the system.

However, in contrast to the process of FIG. 2A, it is noted that, in FIG. 2B, the electronic document 36 is uploaded from the user side 54 of the system to the server side 56. The electronic document 36 is then stored on the server 20 and the version of the document that is signed by the digital certificate signature 48 process is also stored on the server 20. In more detail the process of FIG. 2B is as follows:

Steps 200 to 208 in FIG. 2B may be the same as for FIG. 2A (or the steps 200 to 208 in FIG. 2B may be similar to those shown in FIG. 2A).

In Step 212, the verification server authenticates the signature 40 via a suitable signature verification method as in FIG. 2A. However, instead of creating a digital image file 46 and sending it to the user 30 (as per Step 210 of FIG. 2A), the server 20 instead authenticates the signature and then signs, in Step 214, the copy 36' of the electronic document stored on the server from the user's desktop using a known digital certificate signature process. The document may, as part of this process, be signed using the user's private key and also the public key of a certification authority. The digital image, is still created in Step 212 of FIG. 2B. However, it is not transmitted to the user 30 but is applied to the server version of the electronic document 36 by the server 20. This version of the electronic document 36 is then signed 214 using the digital certificate process as noted above to prevent further changes occurring.

Once signed the electronic document 36 cannot be altered without cancelling the validity of the digital certificate 48. However in step 216 a copy 36' of the signed document is emailed to the user's laptop 32 for information.

Figure 2C:
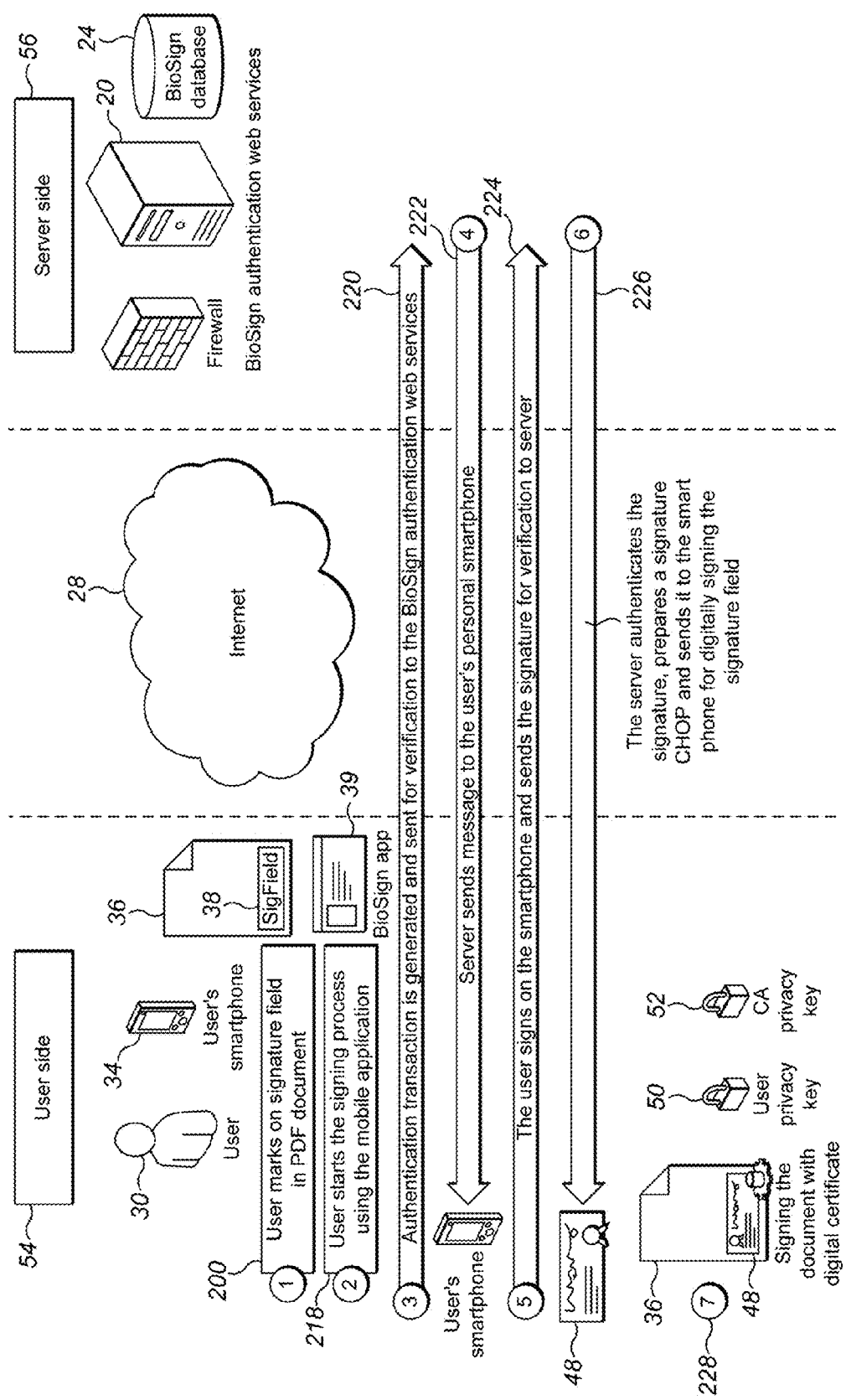

A method of operation of the signature validation system 10 in accordance with a yet further embodiment of the present disclosure is hereby described in relation to the flow diagram of FIG. 2C.

The further embodiment shown in FIG. 2C is similar to that of FIGS. 2A and 2B. In contrast to FIGS. 2A and 2B the system arrangement of FIG. 2C comprises a single computing device 34 only on the user side 54 of the system.

In FIG. 2C an electronic document 36 (e.g. a document provided in the Adobe PDF format) comprising a signature field 38 is displayed on the user's mobile computing device 34 (in this case a smartphone).

In the event that the user 30 wishes to sign the document 36 he may, in Step 200, click on the signature field 38 within the PDF document 36 thereby causing a plug-in 39 to run and a dialog box to appear on the display device of the mobile computing device (Step 218).

The dialog box 39 may prompt the user 30 to enter authenticating information, such as a username/ID or password and an authentication request is sent, in Step 220, from the mobile device 34 to the verification server 20.

The verification server 20 retrieves the user's profile 26 from the database 24 and initiates a signature verification process in which a message is sent, in Step 222, to the user's mobile computing device 34 with a request to provide a signature (to enter a signature gesture 40).

The user then, in Step 224, provides his or her signature to their mobile computing device, such as by using his or her finger, a stylus, a connected touch-sensitive pad, or other input device. In one embodiment, the provided signature is sent to a verification server 20 for verification. In another embodiment, the mobile computing device extrapolates or captures user data as the signature is being provided, and the user signature data may be sent to the verification server 20 for verification. Combinations or variations of the foregoing are also possible.

In one embodiment, the mobile computing device 34 may be arranged or configured to sample the signature over time, and a series of vector data points related to the signature, may be sent to the verification server 20.

The verification server then authenticates the signature, in Step 226, via a suitable signature verification method. Examples of such a signature verification method are described in relation to FIGS. 15 to 20.

Once the user and the user's signature have been authenticated a digital representation of the entered signature in the form of an image file is created and sent back to the mobile computing device of the user (Step 226). The digital signature may then be incorporated into the PDF document using a known digital certificate signature process (Step 228). The document 36 may as part of this process be signed using the user's private key 50 and also the public key 52 of a certification authority.

Once signed the document 36 may not be altered without cancelling the validity of the digital certificate 48.

A. Electronic Contract Signature

An application of the authentication process according to one embodiment shown in FIG. 2A is within the context of electronic contract signature. Many organizations are now moving to a paperless or "paper-light" environment. Such working environments can often complicate the process of contract signature. This may involve, for example, the generation of electronic documents 36 (PDF format) that are signed electronically using a user's personal PKI key 50.

Figure 3:
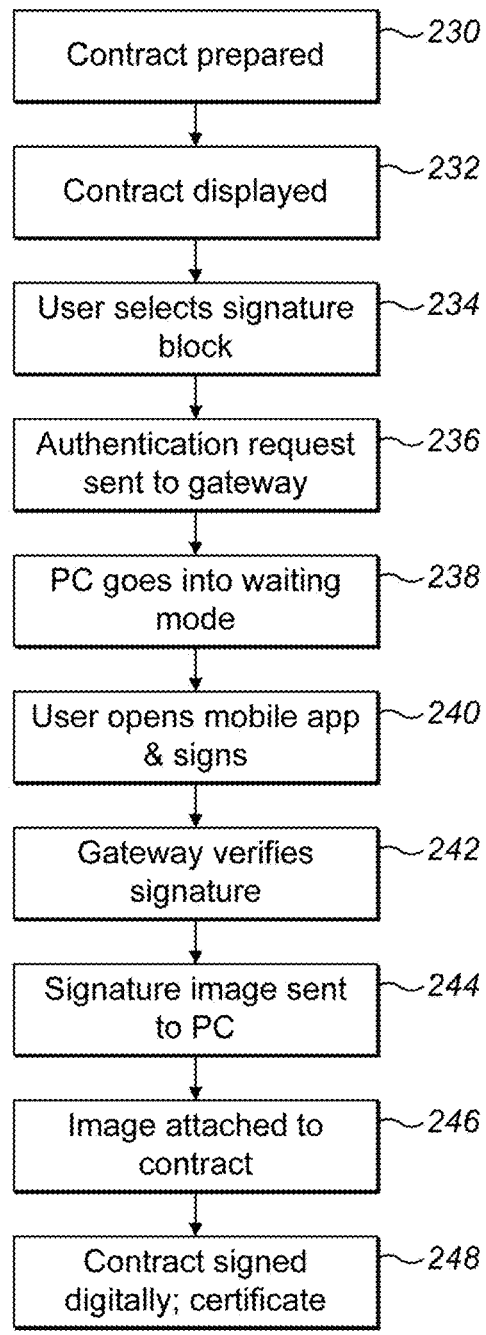
FIG. 3 is a flow chart illustrating a process of signing a contract document in accordance with an embodiment of the present disclosure.

The present disclosure may provide a convenient solution to the signature of documents in such paperless (or paper-light) environments as described below with reference to FIG. 3:

1. In Step 230, a customer comes to a law office in order to sign a contract;

2. In Step 232, an attorney displays the contract 36 on a monitor (e.g. the laptop 32 from FIG. 2A) to the user;

3. In Step 234, the customer points and clicks on the signature placement section 38 of the electronic document 36;

4. In Step 236, an authentication transaction request is generated and sent to the server side 56 of the system for verification (this corresponds to step 204 in FIG. 2A);

5. In Step 238, once the transaction request is sent, the document viewer/editor goes to "Waiting mode" pending authorization from the server 20. It is noted that this step also corresponds to Step 204 from FIG. 2A. It is further noted that this step 238 corresponds to a first asynchronous transaction;

6. In Step 240, the customer opens a client application on his mobile device 34 and signs 40 on the device's touchscreen 44;

7. In Step 242, the signature 40 is sent for verification at the server 20 (a second asynchronous transaction);

8. In Step 244, upon a successful verification, a digital representation 46 of the entered signature in the form of a digital image file 46 is generated and sent to the waiting session on the law office computing device (32) where the document 36 is opened. It is noted that the digital image file 46 may comprise further data in addition to the representation of the entered signature, e.g. time stamp, sampled user data, authentication code etc.;

9. In Step 246, the signature is attached at the correct location 38 within the electronic document 36 (signature placement);

10. In Step 248, the document 36 is signed digitally and a certificate 48 is generated in order to ensure the authenticity of the signed document.

B. Digital Image with Signature Data

As described in relation to FIG. 1A above the server 20 may generate a digital image 46 that incorporates a digital representation of the user's signature gesture 40. An example of this digital image 46 is also shown in FIG. 4 in more detail.

It is noted that in addition to the representation of the signature 40, the digital image 46 may also incorporate additional information. In particular, the user data that is captured during the signature process may be encoded into the digital image 46 as described below in more detail.

The digital image 46 is described above being applied to an electronic document 36. As such it may be thought of as a "chop" feature or seal which confirms the identity of a user whose information is included within the image 46.

Figure 4:
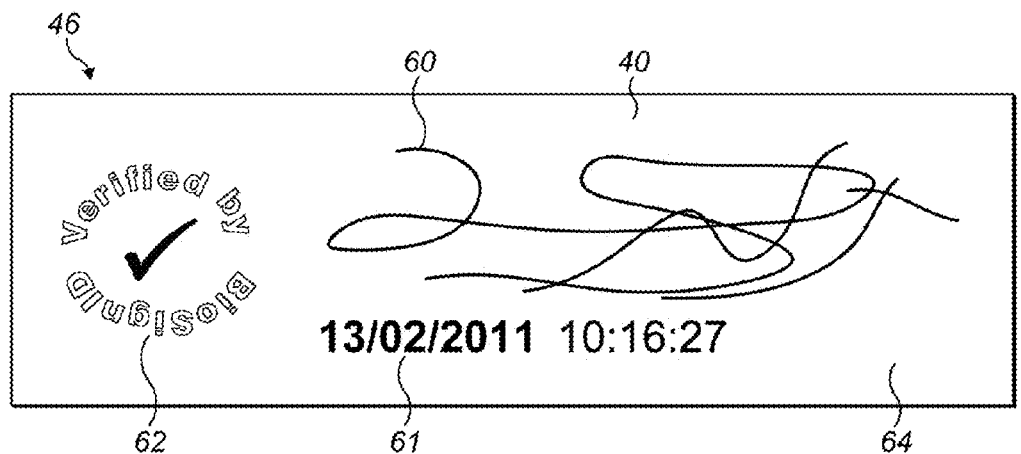
FIG. 4 shows an example of a representation of a digital file in accordance with an embodiment of the present disclosure.

The version of the digital image 46 shown in FIG. 4 may comprise a number of components: (i) a digital representation of the signature gesture 40 entered by the user on the smartphone device 34. This representation essentially is the user's finger trace 60; (ii) a date and time stamp 61; (iii) a seal 62 from the verification server 20; and, a background portion 64.

Components (i), (ii) and (iii) provide a subsequent reader of the PDF document with information about the user who has signed the document. Furthermore, some or all of these components would allow the subsequent reader to send an information request to the verification server to determine that the verification server did indeed verify the signature of the first user at the time and date indicated. In such an embodiment, upon receipt of the verification request, the server would search a database for a stored version of the chop associated with a user. It may then compare the stored version with the chop it received in the request. If there is a match, the requesting device is sent a message confirming the identity of party associated with the authentication request. As an alternative the server may extract user data from the chop and compare this user data to stored user data in order to verify the user/authenticate the request.

It is noted that the digital image 46 shown in FIG. 4 is but one example of a digital image 46 that may be created in accordance with the disclosed embodiments of the present disclosure. Depending on the particular configuration of the system some of the features (i) to (iv) noted above may not be present. As described below, user data may be encoded into the digital image. In one example therefore the digital image may comprise an arbitrary image (e.g. Big Ben) and the user data may be encoded into the image and this may still provide a means of identifying a user.

Figure 5:
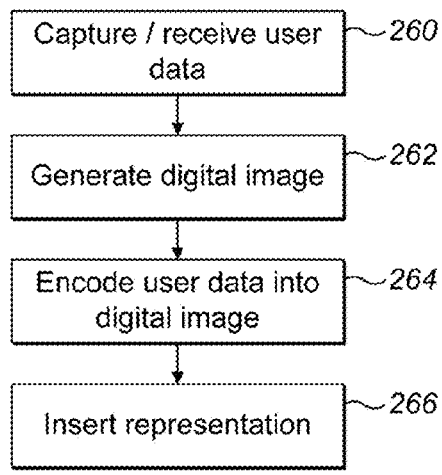
FIG. 5 shows the process of capturing user data and encoding it into a file for use in a digital document according to an embodiment of the present disclosure.

In accordance with an aspect of the present disclosure, the user data collected during the signature process by the mobile device may be embedded within the digital image 46 such that it can be recovered at a later date to enable independent verification of the authenticity of the first user's signature. This is shown in the flow chart of FIG. 5. In step 260, user data is captured as a user enters their signature gesture 40 into a computing device during an identity verification process. The device, e.g., a touchscreen of a mobile computing device 34, may sample the user's signature and generate a plurality of vector points defining, for example, an x, y position of an input member (e.g., a user's finger in the example of a touchscreen, or alternatively a stylus position, mouse cursor etc.) over time (t). Where the user is entering their signature gesture on a screen or against a surface then additionally a "lift" coordinate may be recorded to indicate when the pen/finger/mouse/etc. was lifted from the surface. Where the signature gesture is entered via a motion sensing device (such as a Microsoft Kinect device) then the lift coordinate may be replaced by a depth (z) coordinate. At the end of the signature process a plurality of vector points, e.g. (x, y, lift, t) or (x, y, z, t), may have been captured. This plurality of vector points represents the captured user data.

Once the signature gesture has been captured and verified by a suitable analysis algorithm (such as those described below in relation to FIGS. 15 to 20) a digital image 46 may be created (see for example the digital file depicted in FIG. 4) in step 262. The user data captured from step 260 in FIG. 5 may then be encoded into the digital image 46 in step 264. In one example the data may be encoded into a background area 64 of the image. In another example, the image 46 may comprise a digital representation of the entered signature gesture 40 in the form of a trace line 60 and the data may be encoded into the "trace line" 60 of the signature itself. The output of step 264 is therefore a digital image 46 in which the user data has been encoded.

In step 266, the digital image 46 with encoded user data may be inserted into, for example, a signature field 38 of an electronic document 36. Once the document 36 has been signed with a digital certificate 48 the image file 46 cannot be altered without compromising the certificate. In the event that a third party or the user themselves wanted to verify that the signature 40 entered during step 260 was genuine the user data could be extracted from the digital image 46 during a decoding process and the verification algorithm could reanalyse the user data to confirm whether the signature was genuine or not.

Embedding of the signature data may be achieved by varying a proportion of the pixels within the digital image.

Figure 6:
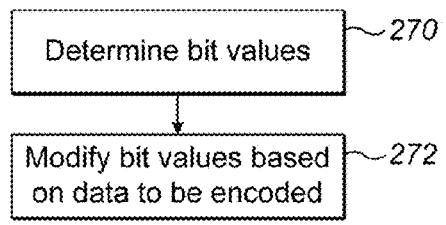
FIG. 6 shows an overview of encoding data into the pixels of an image according to an embodiment of the present disclosure.

FIG. 6 illustrates an overview of a process of encoding data into a digital image 46 according to an embodiment of the present disclosure. In step 270, the bit values of pixels within the image are determined and in step 272 the bit values within the pixel are varied in order to encode data within the image. A binary representation of both the pixel bit value and the data to be encoded can be determined and the data then encoded using one or more Boolean operations, such as the logical XOR operation. However, any suitable reversible binary operation may be used.

For example, the trace 60 representation (component (i) above) of the first user's signature may be represented within the image by a trace of black pixels. Since a pixel in a digital image within a computer system may be represented by 3 colours (red, green, blue) of 8 bits each, it is possible to vary the colour of the black pixel slightly by changing the value of a number of the bits within the pixel to encode the signature data.

In the example where a signature is represented as an x coordinate, y coordinate, time coordinate and contact coordinate (e.g., either finger contact (1) or no finger contact (0), which may also be called a "click" or "pen"), each vector data point of the signature may be encoded within the digital image.

For example, the handwritten signature may be turned into a bitmap as a black or red curve on a white background. To encode this data, each of the user signature data variables (e.g., x, y, t, and pen), may require a varying number of bytes. For example, the x variable data may require 2 bytes, the y variable data may require 2 bytes, the t variable data may require 4 bytes and the pen variable data may require 1 byte.

Since signatures are not likely to be more than a minute in length it is also practical to encode the time (e.g., the t variable data) by three bytes. The time data may be represented by any measurement of time, such as nanoseconds, microseconds, milliseconds, and so forth.

Given the foregoing memory requirements of this one embodiment, each vector data point in the sample signature may represent 8 bytes of information (made up of 2 bytes for the x variable data, 2 bytes for the y variable data, 3 bytes for t variable data and one further byte for the pen variable data).

Capturing a signature may include hundreds or thousands of sampled data points. For example, a long signature may require 1600 samples. Therefore, encoding a long signature requires about 12800 bytes (i.e., 1600 samples*8 bytes per sample). Longer or shorter signatures may require a different number of samples.

Figure 7:
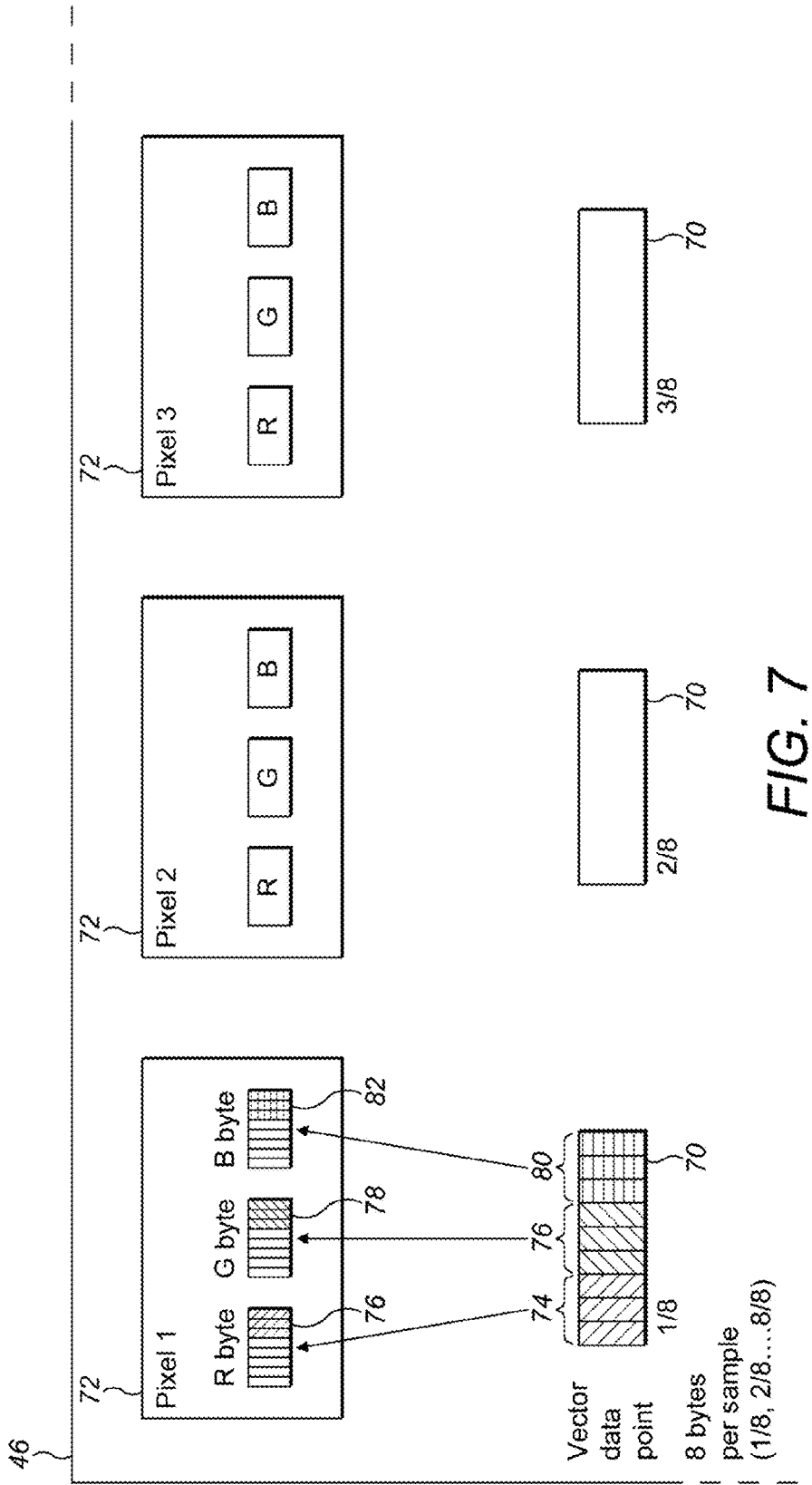
FIG. 7 shows how data may be encoded within a pixel of a digital image in accordance with an embodiment of the present disclosure.

The disclosed systems and methods may leverage the number of bytes present in a single RGB pixel to encode the data from a sampled data point. As an RGB pixel may be encoded with three bytes, each byte of a vector data point (i.e., a sampled data point) may be split over these three bytes using the XOR operation mentioned above. For example, the first 3 bits of a vector data point may be XORed with the lower 3 bits out of the 8 bits of the red colour, the second 3 bits of the vector data point may be XORed with 3 lower bits out of the 8 bits of the green colour, and the last 2 bits of the vector data point may be XORed with the 2 lower bits out of the blue colour. In this manner, each RGB pixel may encode one byte of vector data. The above described process of splitting a vector data point byte 70 over an RGB pixel 72 is shown in FIG. 7.

The encoding process within the RGB model is described in more detail below.

C. Verification/Authentication Server as Intermediary

Figure 14:
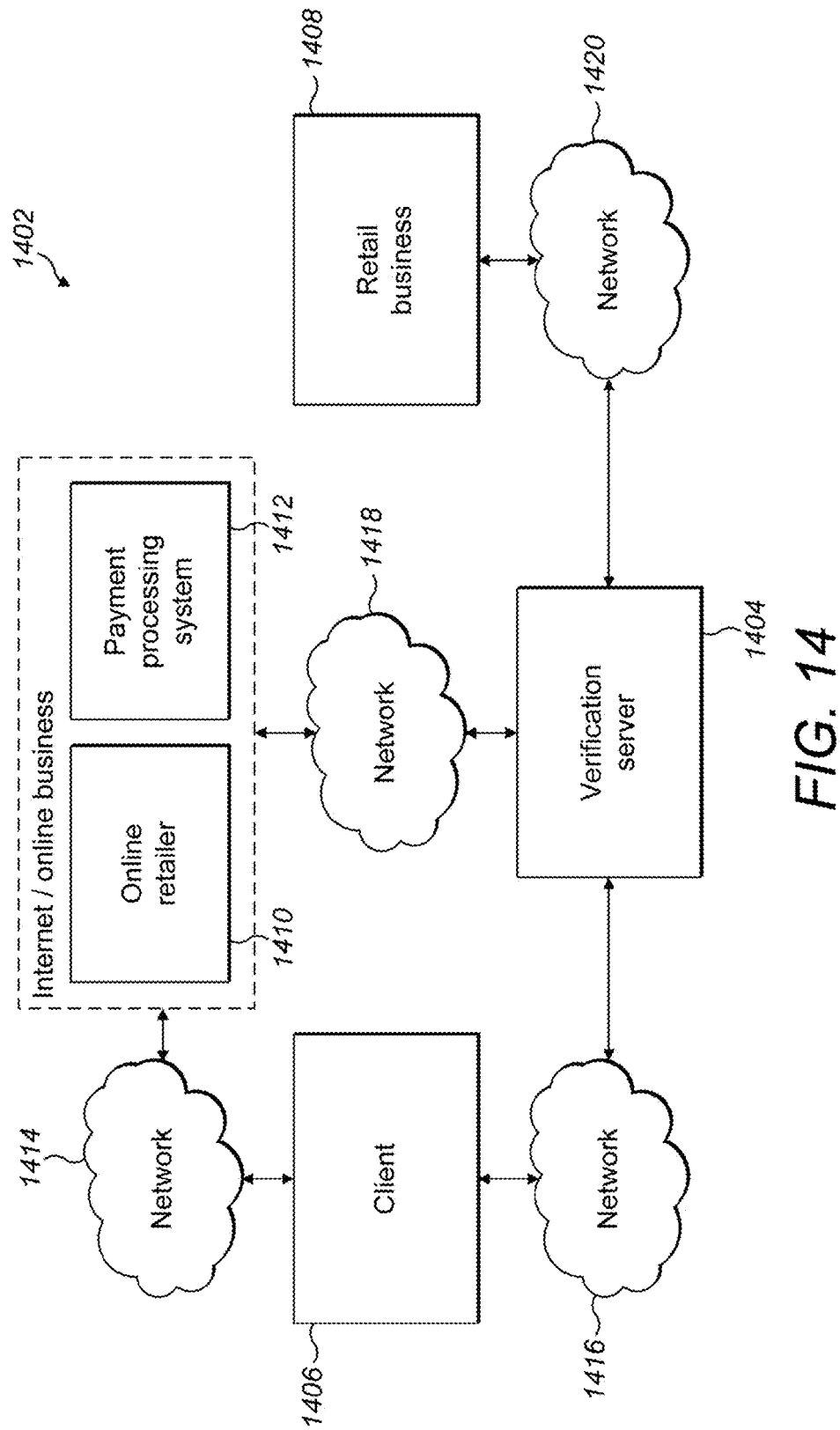
FIG. 14 shows an example of a verification server operating in an intermediary role to verify and authenticate signature-related user data.

While FIGS. 1-6 generally relate to using the disclosed systems and methods in conjunction with a user digitally signing a document, the disclosed systems and methods may also be used in an intermediary or facilitating role. In other words, the verification server may be deployed such that it verifies the signatures of users on behalf of parties desiring to authenticate the signature of a user. FIG. 14 illustrates an example 1402 of the verification server 1404 operating in this intermediary role.

As shown in FIG. 14, the verification server 1404 may be in communication with a client device 1406 and one or more online or Internet businesses 1410-1412 seeking to authenticate the signature of a user of the client device 1406. The Internet businesses 1410-1412 may include an online retailer 1410, such as Amazon.com, Overstock.com, and the like, and a payment processing system 1412, such as PayPal, VISA, Mastercard, or other such payment processing systems. The verification server 1404 may also be in communication with a retail business 1408 (e.g., a physical retailer) that desires to authenticate the signature of a customer.

The client device 1406 may be any type of computing device configured to communicate using a network such as a desktop computer, laptop, netbook, tablet computer, smartphone, or any other such computing device. The client device 1406 may be equipped with a touch-sensitive display, such as those found in a tablet or smartphone, or may be connected to a touch-sensitive device, such as a touch-sensitive pad, touch-sensitive stylus, or other such device.

The entities 1404-1412 may communicate through one or more networks 1414-1420. The networks 1414-1420 may include local area networks, wide area networks, personal area networks, and combinations thereof.

In one embodiment, the user of the client device 1406 may communicate with the verification server 1404 to register his or her signature with the verification server 1404. For example, the user of the client device 1406 may use the client device 1406 to provide the previously discussed user data. Providing the user data may also include providing multiple signatures to the verification server 1404 such that the verification server 1404 has a sufficient sampling of the user data. A sufficient sampling may include receiving one set of user data (i.e., the user data derived from one signature), ten sets of user data, a hundred sets of user data, or any other such number of user data.

The verification server 1404 may then establish a user profile associated with the provided user data. The verification server 1404 may reference the user profile to retrieve the corresponding user data when a request is received to verify the user's signature.

The user of the client device 1406 may do business with a number of online businesses directly, such as the online retailer 1410, or indirectly, such as the payment processing system 1412. To confirm the identity of the user, the online businesses 1410-1412 may request that the verification server 1404 verify user data that may be provided by the user.

For example, suppose that the user desires to purchase a product from the online retailer 1410. Prior to completing the transaction with the online retailer 1410, the online retailer 1410 may request that the user provide his or her signature. The user data derived from the provided signature may then be transmitted to the verification server 1404. The online retailer 1410 may also send the verification server 1404 user authentication information to access the previously registered user profile so that the verification server 1404 is informed of which set of previously registered user data to compare with the provided user data.

The verification server 1404 may then compare the provided user data with the previously registered user data. Should there be a deviation in the comparison, the verification server 1404 may inform the online retailer 1410 of this deviation, at which point, the online retailer 1410 may decide to decline the transaction with the user. If the provided user data should match or relatively approximate the previously registered user provided data, the verification server 1404 may inform the online retailer 1410 of this fact. The online retailer 1410 may then decide to complete the transaction with the user.

Communications between the verification server 1404 and the payment processing system 1412 may proceed similarly. That is, the payment processing system 1412 may receive a request to facilitate a payment between a payor and a payee, and the payment processing system 1412 may request that the payor provide user data to authenticate the payment. The payment processing system 1412 may then communicate the user data to the verification server 1404 to authenticate the provided user data. The verification server 1404 may then inform the payment processing system 1412 of the results of the comparison, at which point, the payment processing system 1412 may decide to decline or complete the payment between the payor and payee.

With regard to the retail business 1408 (i.e., a physical brick-and-mortar business), the retail business 1408 may request that the user provide a signature to complete a transaction. The retail business 1408 may then communicate the provided user data derived from the provided signature to the verification server 1404 for authentication. The retail business 1408 may also provide user authentication information to identify a user profile registered with the verification server 1404 and associated with registered user data. The verification server 1404 may then compare the provided user data with the registered user data. The verification server 1404 may then inform the retail business 1408 of the results of that comparison, which may then decide to decline or complete the transaction.

While the verification server 1404 is shown separate from each of the entities 1408-1412, each of the entities may maintain their own verifications server and database of registered users. In this manner, the payment processing system 1412 may maintain a verification server separate and apart from any verification server of the online retailer 1410 or retail business 1408. Moreover, as there are some customers who may not use the Internet or desire to register with the verification server 1404, a business maintaining its own verification server may be beneficial.

Furthermore, while the user may register with the verification server 1404 prior to a transaction, the user may also register at other points in time, such as during a transaction. For example, the retail business 1408 may ask a customer whether he or she desires to register their signature (either with the retail business 1408 specifically or with the verification server 1404 generally) at the time a transaction begins or completes. Similarly, the online retailer 1410 may prompt the user of the client device 1406 whether he or she desires to register his or her signature prior to, or after the completion of, a transaction with the online retailer 1410. In this manner, a user or customer may register his or her signature at any time with the verification server 1404 or any of the other businesses 1408-1412.

D. The RGB Colour Model and Encoding a Vector Data Point Byte

The RGB colour model is an additive colour model in which red, green, and blue light (Red, Green and Blue=RGB) are added together to produce a range of colours. The name of the model comes from the initials of the three additive primary colours, red, green, and blue.

The main purpose of the RGB colour model is for the sensing, representation, and display of images in electronic systems, such as televisions and computers, though it has also been used in conventional photography.

To form a colour with RGB, three coloured light beams are superimposed. Each of the three beams is called a component of that colour, and each of them can have an arbitrary intensity, from fully off to fully on, in the mixture.

The RGB colour model is additive in the sense that the three light beams are added together, and their light spectra add, wavelength for wavelength, to make the final colour's spectrum, Zero intensity for each component gives the darkest colour (no light, considered a black colour), and full intensity of each gives a white colour.

When one of the components has the strongest intensity, the colour is a hue near this primary colour (reddish, greenish, or bluish), and when two components have the same strongest intensity, then the colour is a hue of a secondary colour (a shade of cyan, magenta or yellow). A secondary colour is formed by the sum of two primary colours of equal intensity: cyan is green+blue, magenta is red+blue, and yellow is red+green. Every secondary colour is the complement of one primary colour; when a primary and its complementary secondary colour are added together, the result is white: cyan complements red, magenta complements green, and yellow complements blue.

In computers, the component values are often stored as integer numbers in the range 0 to 255, the range that a single 8-bit byte can offer. These are often represented as either decimal or hexadecimal numbers.

Where the colour components are all at their maximum intensity, white light is produced. In the RGB system this can be represented as in Table 1 below:

TABLE 1

| Colour component | Integer | Binary representation (8-bit byte) |
| --- | --- | --- |
| Red (R) | 255 | 11111111 |
| Green (G) | 255 | 11111111 |
| Blue (B) | 255 | 11111111 |

Where the colour components are all at minimum intensity then no light is displayed (which equates to black). Using the above representation this can be shown as in Table 2 below:

TABLE 2

| Colour component | Integer | Binary representation (8-bit byte) |
| --- | --- | --- |
| Red (R) | 0 | 00000000 |
| Green (G) | 0 | 00000000 |
| Blue (B) | 0 | 00000000 |

A binary to decimal converter (see http://easycalculation.com/decimal-converter.php for example) and a RGB colour chart (see http://www.rapidtables.com/web/color/RGB_Color.htm for example) can be used to generate the binary representation of any colour that the display device can show. For example orange with a hex colour code of FFB266 can be represented as in Table 3 below:

TABLE 3

| Colour component | Integer | Binary representation (8-bit byte) |
| --- | --- | --- |
| Red (R) | 255 | 11111111 |
| Green (G) | 178 | 10110010 |
| Blue (B) | 102 | 01100110 |

It is noted that some high-end digital image equipment may be able to deal with larger integer ranges for each primary colour, such as 0 . . . 1023 (10 bits), 0 . . . 65535 (16 bits) or even larger, by extending the 24-bits (three 8-bit values) to 32-bit, 48-bit, or 64-bit units (more or less independent from the particular computer's word size).

In accordance with an embodiment of the present disclosure it is possible to encode data into the pixels 72 of a digital image 46 without noticeably changing the image according to the following process:

Each pixel in the RGB system comprises 3 bytes (R, G and B) of 8 bits (i.e., a first byte of 8 bits, a second byte of 8 bits, and a third byte of 8 bits). A byte of data to be encoded may be split over the three bytes of the RGB pixel using an XOR operation.

E. Encoding/Decoding Example

In the following example a byte of data 70 is encoded into a RGB pixel 72 which has a colour of white: R=11111111; G=11111111; B=11111111

The byte to encode (data byte 70) within the RGB pixel relates to an x coordinate value of "120". The equivalent binary value is 01111000.

In order to encode a data byte within the RGB pixel, 3 bits (74) of the data byte are XORed with the lower 3 bits (76) of the red colour, 3 bits (78) are XORed with the three lower bits (80) of the green colour and 2 bits (82) are XORed with the 2 lower bits (84) of the blue colour.

In this example, the data byte=01111000=3 bit groupings of "011", "110" and "00". Therefore, the first bit grouping of 011 may be encoded with the last 3 bits of the R pixel ("111"). The second bit grouping of 110 may be encoded with the last 3 bits of the G pixel ("111") and the third bit grouping of 00 may be encoded with the last 2 bits of the B pixel component ("11").

Shown below is the present example of the XOR encoding and decoding process for each of the pixel components, where "–" signifies that no data is being XOR'ed.

Red Component

| Pixel | = 11111 | 111 |
| Data bits | = — | 011 |
| XOR operation | | |
| Encoded R component | = 11111 | 100 |

In order to recover the data byte from the encoded pixel, the last 3 bits of the encoded red component (11111100) may be XORed with the known starting colour component (11111111). In other words 100 XOR 111=011, which corresponds to the first bit grouping of the data byte that was encoded.

The encoded red pixel component as calculated above was, in binary format, 11111100 which equates to a value of "252" in the RGB colour system. As is known in the art, a red component assigned the value of "255" may represent a "pure" red colour.

Green Component

| Pixel | = 11111 | 111 |
| Data bits | = — | 110 |
| XOR | | |
| Encoded G component | = 11111 | 001 = 249 |

In order to recover the data byte from the encoded pixel, the last 3 bits of the encoded green component (11111001) may be XORed with the known starting colour component (11111111). In other words 001 XOR 111=110, which corresponds to the second bit grouping of the data byte that was encoded.

The encoded green pixel component as calculated above was 11111001 which equates to a value of "249" in the RGB colour system. As is known in the art, a green component assigned the value of "255" may represent a "pure" green colour.

Blue Component

| Pixel B | = 111111 | 11 |
| Data bits | = — | 00 |
| XOR | | |
| Encoded B component | = 1111111 | = 255 |

In order to recover the data byte from the encoded pixel, the last 2 bits of the encoded blue component (1111111) may be XORed with the known starting colour component (11111111). In other words 11 XOR 11=00, which corresponds to the third bit grouping of the data byte that was encoded.

The encoded blue pixel component is calculated above was 11111111 which equates to a value of "255" in the RGB colour system. As is known in the art, a blue component assigned the value of "255" may represent a "pure" blue colour.

In the above example therefore encoding the data byte equating to the x coordinate of 120 changed the pixel from a pixel value of
Pixel=255, 255, 255 (#FFFFFF)
to an encoded pixel value of
Encoded pixel=252, 249, 255 (#FCF9FF) Purple As shown above the original data byte was recoverable by virtue of a second XOR operation based on the knowledge of the initial pixel colour.

It is noted that although the data byte is encoded such that 3 bits are encoded with the lower R component, 3 bits with the lower 3 bits of the G component and 2 bits with the lower 2 bits of the B component, other arrangements may be contemplated within the scope of the present disclosure. For example, other bit selections from the RGB pixel data, such as the upper 2 or 3 bits of the RBG pixel may also be used to encode the data.

Alternatively, instead of encoding the data byte with a (3, 3, 2) bit grouping onto the RGB components the data could be encoded with a (2, 3, 3) bit grouping or any other convenient grouping.

As noted above the data recovery process requires knowledge of the initial colour of the pixel. In a variant of the disclosure the initial colour pixel could be set/established by the user encoding the data such that only another user with knowledge of this initial colour could retrieve the data.

For example, a user may either be provided with or choose the colour R=251, G=253, B=249 to be associated with them. The pixel components for this colour are: 11111011; 11111101; 11111001.

If this colour is encoded with the same data byte as above (01111000) then the encoded pixel is
Encoded R=11111000
Encoded G=11111011
Encoded B=11111001
Encoded pixel colour=248, 251, 249

It is noted that in order to run the decoding XOR operation a decoding user would need to know the initial colour associated with the encoding user. By setting a colour to be associated with a given user, that user may encode data into a digital image such that another user cannot easily decode the data. As noted above there is a large number of potential colours in an 8-bit RGB system and so this method provides a convenient mechanism for protecting encoded data.

The above description has been presented in the context of an RGB colour system. It is also noted that the methods described herein could be adapted for use in the QRGB system in which 4 bytes of information are used to represent a colour. Q refers to opacity of the colour with Q=0 meaning a transparent image and Q=255 meaning a fully opaque colour. R, G and B have the same meanings as in the RGB system described above.

In the context of the digital image shown in FIG. 4 the above described method of encoding user data into a digital image provides a mechanism for subsequent recovery and validation of a user. Where the user data relates to signature data captured during a signature process then the sampled signature data may be analysed using a suitable signature recognition method to determine the authenticity of the digital file.

As an added level of security the background colour of the digital image may be manipulated prior to encoding such that a particular user is associated with a particular colour. Unless this colour is known to a person attempting to decode the image then the encoded data will be extremely difficult to recover.

A digital image encoded with user data in this manner may be used for a number of purposes. As noted above the image may be inserted into the signature field of an electronic document which is subsequently locked by the application of a digital certificate.

The digital image may also be used as an authentication key, for example, a user may supply a copy of their digital image for authentication.

Figure 8:
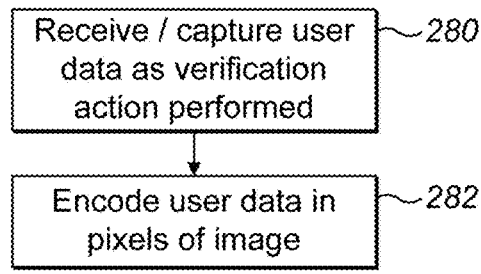
FIG. 8 shows a process of encoding data into an image according to a further embodiment of the present disclosure.

FIG. 8 shows an encoding method according to an embodiment of the present disclosure in which user data is captured (step 280) during a verification action and is then encoded into the pixels of an image (step 282).

As described above, encoding is done is using the XOR, i.e., the exclusive OR function, in which the bits associated with a pixel are combined with the data to be encoded to produce an encoded XOR output signal. Use of the XOR function is but one example of one type of scheme to use in encoding the data. Other more sophisticated techniques may be used to encode the data with each the pixel bits to provide a unique signature associated with a particular signature associated with a user. Those techniques include a further implementation of the pixel encoding method described above in which the lower two or three bits may be determined as a function of the higher 5 or 6 bits. In the example above 3 bits of the red and green components are altered which leaves the higher 5 bits untouched by the encoding process. These 5 bits represent 32 colours. For the blue component there is a 6/2 split in the bits used which leaves 64 colours available in the higher bit portion of the blue component.

With this in mind a table (such as Table 4 below) may be defined for each pixel component on a per user basis in which the initial values for the lower 3 or 2 bits are predefined. This table effectively defines the colours that may be present in the digital image prior to encoding of the user data. It is also noted that the encoding process using this implementation will only result in a small change in the overall pixel colour which will be virtually undetectable to the naked eye.

TABLE 4

| Value of upper 5 bits | Value of bits 7, 6, 5, 4, 3 | Set arbitrary values of bits 2, 1, 0 |
| --- | --- | --- |
| 0 | 00000 | 111 |
| 1 | 00001 | 110 |
| 2 | 00010 | 101 |
| 3 | 00011 | 100 |
| 4 | 00100 | 011 |
| 5 | 00101 | 010 |
| 6 | 00110 | 001 |
| 7 | 00111 | 000 |
| 8 | 01000 | 111 |
| 9 | 01001 | 110 |
| 10 | 01010 | 101 |
| 11 | 01011 | 100 |
| 12 | 01100 | 011 |
| 13 | 01101 | 010 |
| 14 | 01110 | 001 |
| 15 | 01111 | 000 |
| 16 | 10000 | 111 |
| 17 | 10001 | 110 |
| 18 | 10010 | 101 |
| 19 | 10011 | 100 |
| 20 | 10100 | 011 |
| 21 | 10101 | 010 |
| 22 | 10110 | 001 |
| 23 | 10111 | 000 |
| 24 | 11000 | 111 |
| 25 | 11001 | 110 |
| 26 | 11010 | 101 |
| 27 | 11011 | 100 |
| 28 | 11100 | 011 |
| 29 | 11101 | 010 |
| 30 | 11110 | 001 |
| 31 | 11111 | 000 |

Table 4 above represents an example for a user of the initial values of the red component of pixels within the background of a digital image.

If a digital image is provided with encoded content and the red component of a pixel is 11001,111, the last 3 bits may be decoded as follows.

From the table we see that the high bits (11001) designate entry 25 within the table for which the initial value of the remaining bits is 110 (it is noted that this initial value is arbitrarily defined in this table for each user). The last 3 bits of the encoded component, 11001,111, are 111. XORing the encoded portion of the encoded component with the initial value yields 111 [111 XOR 110=001]. So the value that was encoded and which has been decoded is 001.

F. Forensic Analysis of a User of a Signature Recognition System

Figure 9:
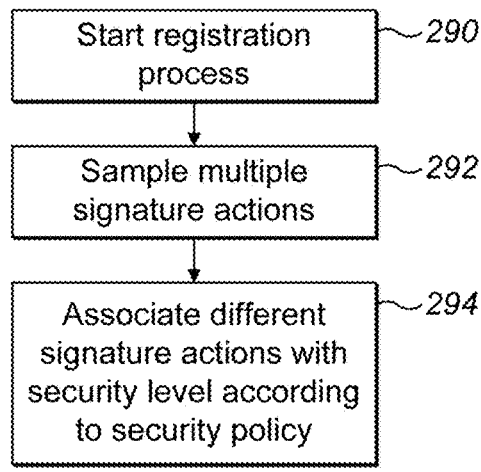
FIG. 9 shows a registration process for a signature verification mechanism.

FIG. 9 shows a signature verification registration process according to an embodiment of the present disclosure for a system in which a user may be granted varying levels of security access depending on a pre-defined security policy. It is noted that the authentication service providing device may perform either or both of registration and verification procedures.

In step 290 a registration process for a user to join a signature verification system is initiated. During the process as defined in the following steps, the user may be asked to provide a number of signature samples for use as a reference signature.

In step 292, the user enters his/her signature sample or samples. It is noted that the signature may be entered via a touchscreen device (with or without a stylus) or via a motion tracking stylus or via a gesture control system or any other suitable data input device in which the user may define a unique "signature" action.

It is noted that the user may also be requested to provide signature samples in respect of more than one input device. For example, the user may be requested to provide a signature action in respect of a touchscreen that accepts input with the user's finger and may also be requested to provide an equivalent action via a touchscreen that accepts a stylus input.

Any and all input signature actions/samples may be stored within a user profile on a verification/authentication server 20.

The disclosed encoding and/or decoding mechanisms may be deployed within a verification system that supports a security policy defining a number of different levels of security. The various security levels may determine the different actions a user is cleared to take or the level of access to a system that a user is allowed. For example, the security policy may define different levels of verification depending on a pre-defined security level. Taking the example of a purchase ordering system, a user may be required to provide a basic level of verification in order to purchase a low value item, a higher level of verification for mid-value items and a yet higher level of verification for high value items.

In order for the verification process to operate within such a security policy, the registration procedure of an aspect of the present disclosure may require the user, in step 292, to provide more than one type of signature gesture. For example, taking the example of a user with the name John Smith the user may be asked to provide the following signature gestures:

1) Initials only: user signs "JS"
2) First name only: user signs "John"
3) Full name: user signs "John Smith"
4) Phrase: user asked to sign a phrase, e.g. "Roses are red", in addition to their full name Each signature gesture (1) to (4) may, in step 294, then be associated with a different security level. Each security level may in turn be associated with one or more user actions that fall within that security level. For example,

TABLE 5

| Security level | Security actions | Signature gesture |
|---|---|---|
| Basic | I, II | (1) |
| Medium | III | (2) |
| High | IV, V, VI | (3) |
| Full | VIII | (4) |

As can be seen from Table 5, if the user attempts to perform action I (e.g. to purchase a low value item) the server will link this "basic" level action with a need to provide a sample of signature gesture (1) [Initials only] for verification before the action is allowed. Similarly, if the user attempts to perform action VIII (e.g. to purchase a very high value item) then the server will request the user enters signature gesture (4) for verification before the action is allowed.

It is noted that the security actions in Table 5 may be any action that requires some level of verification before being allowed. For example, logging into a user's account on an Internet forum may be classed as a basic level action; logging into a user's online bank account may be classed as a high level action; and authorising a payment from the online account or setting up a new payee may be regarded as a full security level action.

Figure 10:
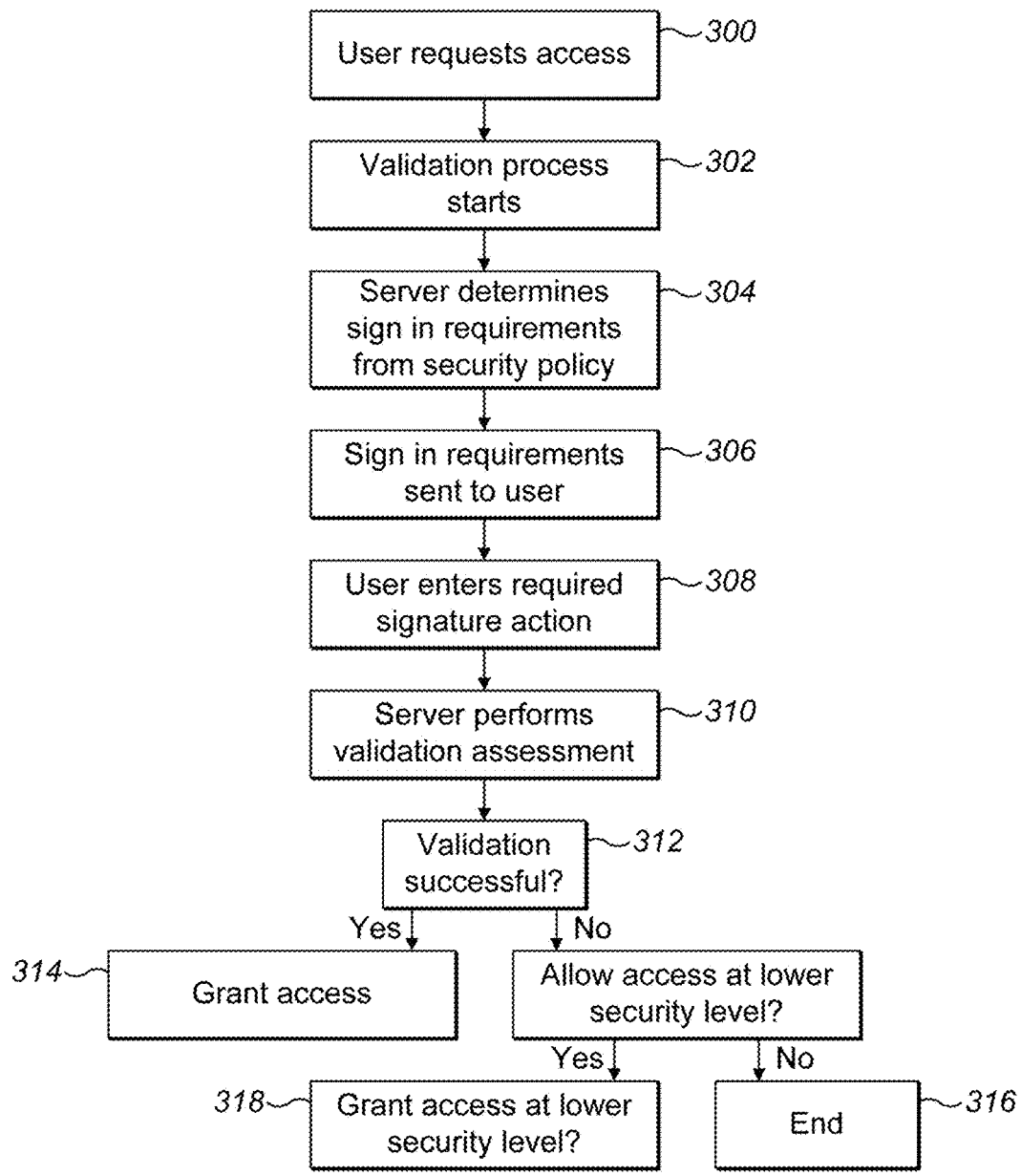
FIG. 10 shows a signature verification/validation process used in conjunction with a security policy.

FIG. 10 shows a signature validation process according to an embodiment of the present disclosure used in conjunction with a system that implements a security policy as described above.

In step 300 a user either requests access to a secure system or attempts a transaction (e.g. a purchase based transaction) that requires the user to be authorised.

In step 302, a validation process is started such as that described in relation to FIG. 2A, 2B or 2C or in relation to FIGS. 15-20.

In step 304 the validation/authentication server 20 determines the level of access required for the user to complete the requested action and determines the associated sign-in requirements from a security policy (in other words it determines the signature action that the user needs to provide and have validated in order to be granted the required level of access).

In step 306 the particular sign-in requirements needed to meet the determined security level are transmitted to the user, e.g. the user may be informed that he is required to sign his full name.

In step 308, the user enters the required signature gesture 40 which is then transmitted back to the authentication server 20.

In Step 310, the authentication server 20 attempts to validate the received signature gesture 40. In the event that the signature passes the validation process (312) then the user is granted access (314). In the event that the signature does not meet the requirements of the validation process then the user may be denied access entirely (316). As an alternative, if the user's signature is determined to be within a certain tolerance of passing the validation check then they may be granted a reduced level of access to the system (318)—see FIG. 10.

Figure 11:
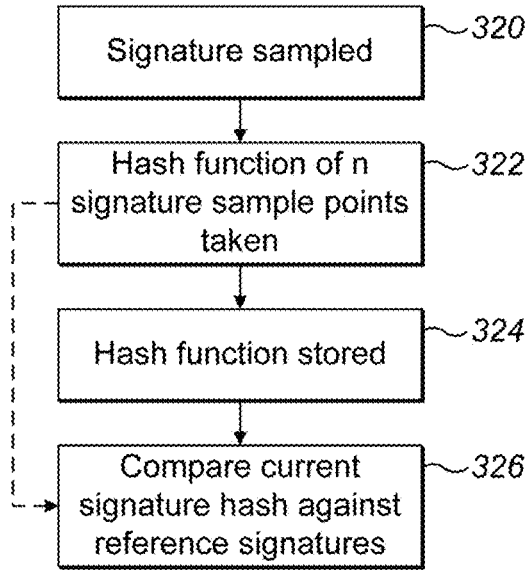
FIG. 11 shows a process of capturing a user's signature.

FIG. 11 shows a signature capture process according to an embodiment of the present disclosure.

In step 320 the user's signature (signature gesture 40) is sampled by a computing device, e.g. by the user's touchscreen enabled mobile computing device 34. Conveniently, two or more separate data capture routines are scheduled to run simultaneously on the processor of the computing device 34. The data capture routines running on the computing device will essentially be competing with other processing routines that may be running on the device. Running more than one data capture routine helps to ensure a sufficient number of sampling points are recorded during the user's signature gesture/action. It is noted that a minimum capture frequency would be approximately 50 Hz and an average signature might be expected to yield in the region of 600 data points.

It is also noted that since there are two capture processes running on the computing device which are competing with other processes running on the computing device the timing of the sampling points will vary slightly from one signature capture to another. Since the sampling points are not fixed this provides a convenient mechanism to mitigate against the effects of potential replay attacks against the system. Therefore, in step 322, a hash function is taken of the first n sample points (e.g. the first 100 points) and the hash result is stored on the authentication server in step 324 against the user's profile. (Note Step 324 may be optional in that the hash function of a currently sampled signature may not be permanently stored on the server against the user profile. Instead the hash function may merely be calculated, compared in step 326 below to the reference signature and then discarded. However storing the hash function, or at least a number of the most recent hash functions, would provide an indication of failed signature attempts or suspicious replay attacks).

In step 326, the hash function of a signature that has just been entered into the user's computing device 34 is compared to the hash function of the reference signature(s) held by the authentication server 20. If the hash functions match then the system can flag that a hacking attempt has been detected. In a further variation the hash function of a plurality of previous signatures provided by the user can be stored and the authentication server can compare a current signature hash function with all of the plurality of hash functions to determine whether the current signature data relates to a previous signature, which would indicate a replay attack.

Figure 12:
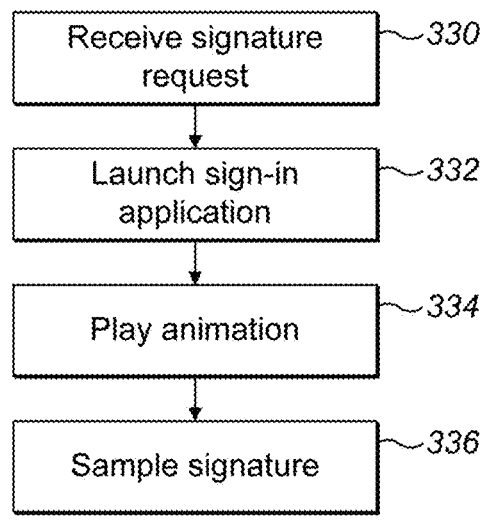
FIG. 12 illustrates a process for reducing signature forgery.
Figure 13C:
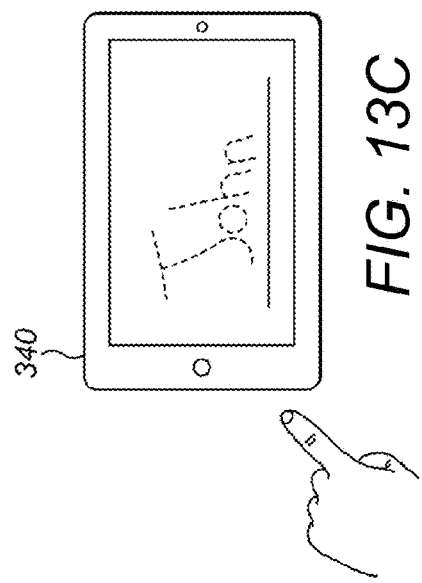
FIGS. 13A-13C illustrate an example of using a device to reduce signature forgery.

FIGS. 12 and 13 show a process and device for reducing signature forgery. It has been found that a potential forger finds reproducing a third party's signature gesture more difficult if they have recently viewed a "scrambling" animation. For example, if a forger is shown an animation of a scribble on a display associated with the signature entry device then the ability of the forger to subsequently reproduce the third party's signature is reduced/compromised.

Referring to FIG. 12, in step 330, the authentication server 20 receives a request to initiate a signature verification process. A track-pad or touchscreen-enabled device is activated in step 332. Such a device 340 is shown in FIG. 13A.

Figure 13B:
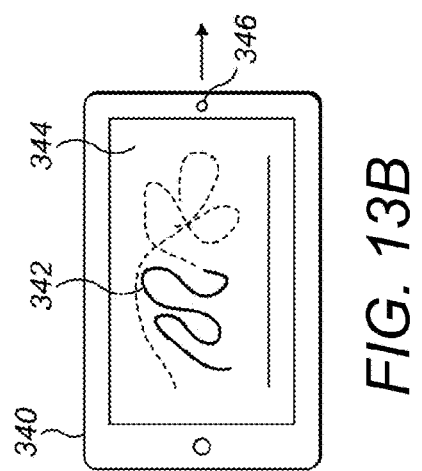
Figure 13A:
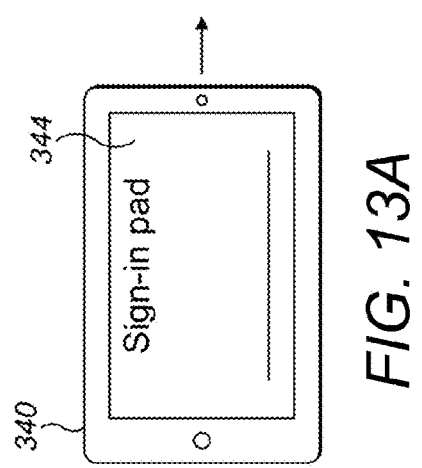

In step 334, a scribble animation 342 is played on the display device 344 of the device 340 shown in FIG. 13. An example of such an animation 342 is illustrated in FIG. 13B. In the event that the computing device 340 comprises a camera 346 then the method may include tracking the user's viewpoint to ensure that they watch the animation as it is displayed and do not look away or close their eyes during the animation.

In Step 336 (and FIG. 13C), once the scribble animation has ended the user providing the signature sample is then able to enter their signature. Valid users will generally be able to reproduce their signature gesture 40 without any loss of accuracy due to the scribble animation. Forgers however tend to find that their ability to reproduce a signature that is not their own is reduced.

G. Signature Recognition Algorithm

In addition, this disclosure provides, amongst other things, a system and method for verifying behavioural biometric information derived from a user's signature.

Figure 15:
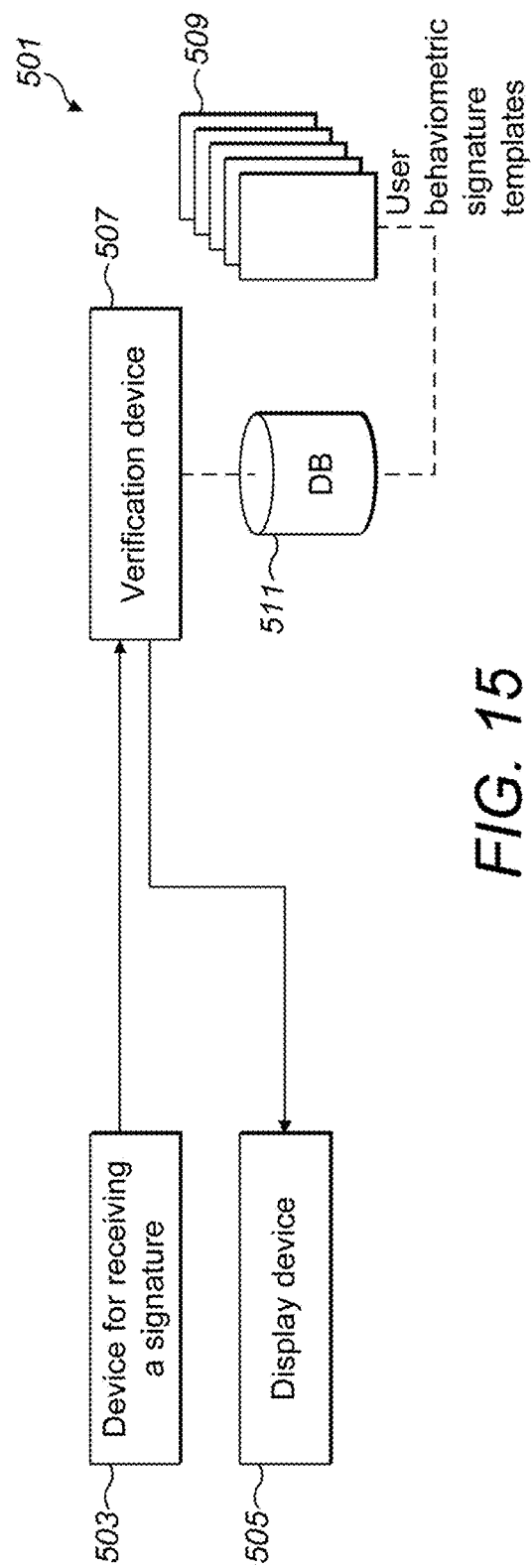
FIG. 15 is an example of a system arranged to carry out a signature verification method, in accordance with an embodiment of the disclosure.

FIG. 15 is a schematic illustration of one example of a behaviometric signature verification system 501 arranged to implement the present method. The system 501 comprises a device 503 suitable for receiving a signature, which device 503 will be referred to as a signature entry device in the following discussion; a display device 505, and a verification device 507. The signature entry device 503 may relate to any apparatus in which a user may provide a signature, and which is configured to monitor and record the time taken to receive the signature in addition to recording the stylised script associated with the signature, whilst it is being generated by the user. The display device 505 may be configured to display visual cues and/or instructions to the user for entering their signature, in addition to displaying signature verification results. For example, the display device 505 may be configured to display instructions instructing the user when to begin entering their signature on the signature entry device 503.

The verification device 507 is configured to verify the authenticity of the provided signature by analysing the signature, and specifically behaviometric information derived therefrom, and comparing this information with a user's pre-stored behaviometric signature template 509, which is stored in a database 511. The database 511 is operatively coupled to the verification device 507, providing the verification device 507 with access to the pre-stored biometric signature template 509.

The signature entry device 503 and the verification device 507 may each comprise a processor, memory and may include other components typically present in such devices and general purpose computers. In one example, each memory may store information accessible by the device's processor, including instructions that may be executed by the processor. The memory may also include data that may be retrieved, manipulated or stored by the processor. The memory may be any type of medium capable of storing information accessible by the processor, such as a hard-drive, memory card, DVD, and/or write-capable and read-only memories. The processor may be any conventional processor, including general processing units and Reduced Instruction Set Computing ("RISC") processors. Alternatively, the processor may be a dedicated controller such as an ASIC.

The instructions may be any set of instructions to be executed by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Although signature entry device 503 and verification device 507 may each contain their own processor, each device's processor and memory may contain multiple processors and memories that may or may not be stored within the same physical housing. For example, some of the instructions and data may be stored on removable media and others within a read only computer chip. Some or all of the instructions and data may be stored in a location physically remote from, yet still accessible by, the processor. Similarly, the processor may actually contain a collection of processors which may or may not operate in parallel. Yet further, even if signature entry device 503 is at a remote location relative to verification device 507, signature entry device 503 may contain a screen and touch-sensitive surface and little other logic circuitry, such that the input at the signature entry device 503 is sent to the processor of verification device 507 for processing and video signals of the information to be displayed may be sent by the verification device 507 to the display device 505.

The data may be retrieved, stored or modified by processor in accordance with the instructions. For instance, although the present disclosure is not limited by any particular data structure, the data may be stored in computer registers, in a relational database as a table having a plurality of different fields and records, XML documents, or flat files. The data may also be formatted in any computer-readable format such as, but not limited to, binary values or Unicode. The data may contain any information sufficient to identify the relevant information, such as numbers, descriptive text, proprietary codes, pointers, references to data stored in other memories (including other network locations) or information that is used by a function to calculate the relevant data. In some embodiments any one or more of the signature entry device 503, the display device 505, and the verification device 507 may be contained within the same physical device. Alternatively, any one or more of the signature entry device 503, the display device 505, and the verification device 507 may be contained in separate physical devices, in which case the devices are arranged to communicate with each other via one or more communication channels.

The behaviometric signature verification system 501 may be deployed as an identification verification device. For example, the system 501 may be used to control access to a secure facility by controlling operation of a gate or a door, or it may be used to control access to a secure device, such as a smartphone, tablet computer or similar device. The signature entry device 503 may relate to a touch-sensitive pad configured to detect finger gestures, whereas the display device 505 may relate to an LCD screen.

Considering the aforementioned example where the system 501 is implemented to control access to a secure facility, upon receiving a user request to open the gate or door, the display device 505, which may relate to an LCD screen, may be configured to display instructions instructing the user to provide their signature in the appropriate signature entry device 503, which may relate to the aforementioned touch-sensitive pad. Whilst the signature is entered onto the touch-sensitive pad, both the finger trace (which relates to the stylized script of the signature) on the pad and the time required to enter the signature are recorded. The provided signature is analysed and forwarded to the verification device 507 for comparison with the user's pre-stored biometric signature template 509. The signature analysis comprises analysing and deriving behaviometric information from the provided signature (e.g., the signature that was entered by the user, whose authenticity will be determined). This may be carried out at either the signature entry device 503, processing power permitting, or at the verification device 507. The analyses may be carried out in real-time, whilst the signature is being entered, or it may be analysed after the entire signature has been provided.

The verification device 507 compares the derived behaviometric information with the user's pre-stored behaviometric template to determine if the behaviometric information derived from the provided signature is consistent with the user's behaviometric template. The verification results may be subsequently displayed on the display device 505.

Figure 16:
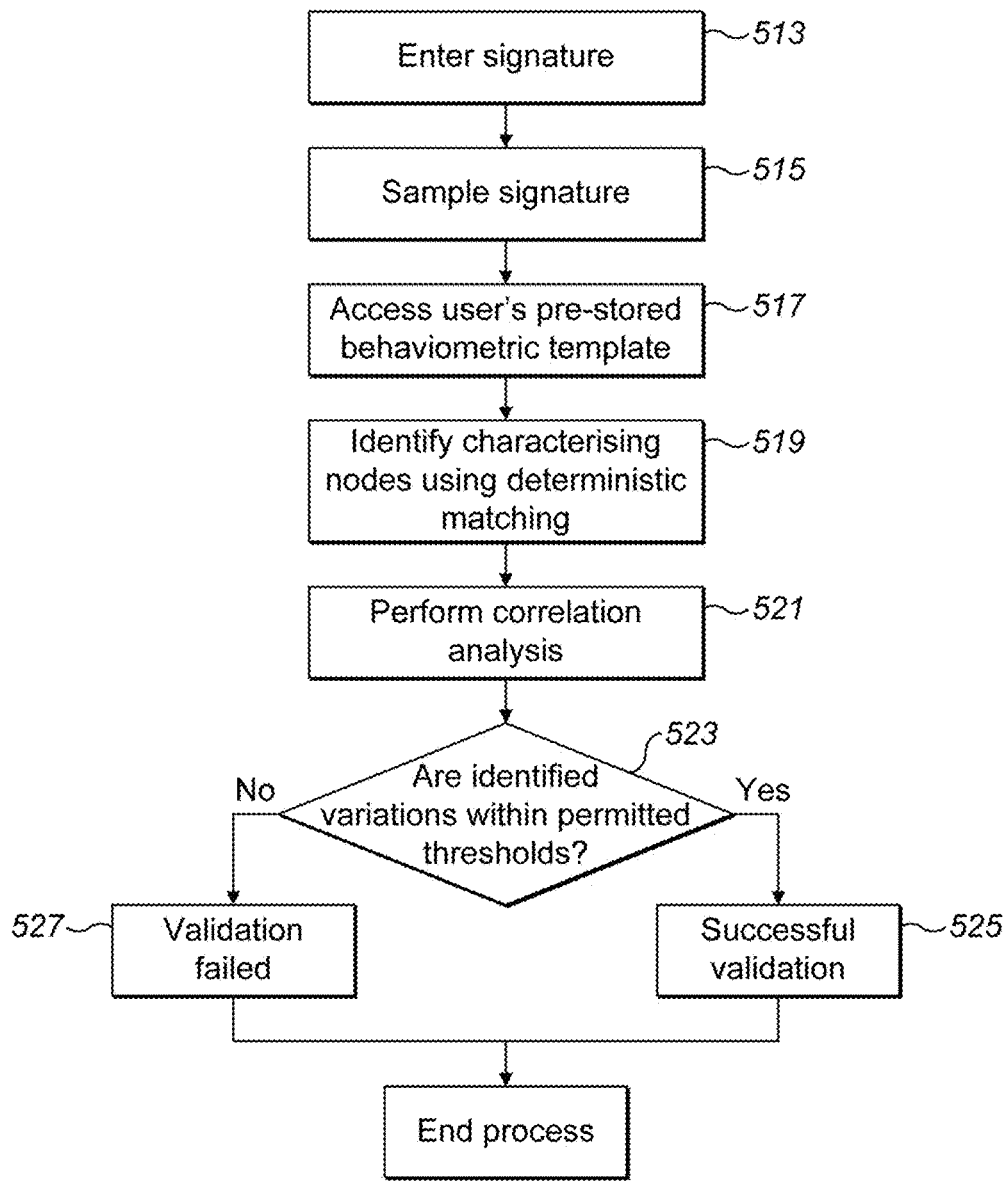
FIG. 16 is a process flow chart outlining the steps comprised in the signature verification method, which may be executed on the exemplary system of FIG. 15.

FIG. 16 is a process flow chart which outlines the different steps comprised in a behaviometric signature verification method that may be carried out, for example, using the system of FIG. 15. A signature 529, such as the signature illustrated in FIG. 17A is provided on a signature entry device 503, at step 513. This may be initiated, as mentioned previously, by the display of a visual cue on the display device 505 instructing the user to provide their signature. The provided signature is sampled and may be normalised, at step 515.

Normalisation is used to address potential differences of scale between different provided iterations of the same signature, and helps to ensure accuracy of derived behaviometrics. For example, and as will be described in further detail below, the user's behaviometric signature template 509 is generated during an enrolment process, wherein one or more copies (also referred to as signature iterations herein) of a user's signature are provided and relevant behaviometric information derived therefrom. The signatures may be normalised to mitigate for differences in physical scale between the different provided signature iterations. This can help to ensure that derived behaviometric information is independent of differences in physical scale between the different provided signature iterations. During subsequent signature verification, signature normalisation can help ensure accuracy by minimising the false reject rate.

The user's associated behaviometric signature template 509 is identified and accessed at step 517. The relevant behaviometric signature template 509 may be identified by requiring entry of a user identifier during the signature entry step 513. Once provided with the user identifier, identification of the relevant behaviometric signature template 509 may be carried out by the verification server 507. The identifier may relate to an alphanumeric code, a name or any other identification means. The identifier may be provided by the user on the signature entry device 503. Similarly, the signature entry device 503 may comprise a touch-sensitive keyboard such as present in most touch-screen equipped smart mobile telephones, such as the iPhone®.

Alternatively, the behaviometric signature verification system 501 of FIG. 15 may be provided with an additional keyboard (not shown in FIG. 15) for providing a user identifier. In this way the user can provide their identifier, and the verification device 507 is able to identify the relevant user behaviometric signature template 509, at step 517.

The user's behaviometric signature template 509 may comprise a set of characterising nodes, which relate to a plurality of pre-selected data points located on the stylized script of the user's signature. The characterising nodes are used during the signature verification process to identify the sampled data points located on the provided signature, which best correspond with the characterising nodes comprised in the user's behaviometric signature template 509. Deterministic matching is used, at step 519, to identify the sampled data points which correspond to the characteristic nodes. The identified sampled data points are also referred to as characterising nodes in the below discussion.

In certain embodiments, the precise stage at which the user's associated behaviometric signature template 509 is identified by the verification server 507 is immaterial. The only requirement may be that the user's behaviometric signature template 509 is identified prior to deterministic matching, at step 519. For example, identification of the user's behaviometric signature template 509 may be carried out prior to signature entry (step 513).

Correlation analysis occurs at step 521, and comprises analysing correlations between the characterising nodes identified on the provided signature, at step 519, and the characterising nodes comprised in the user's behaviometric signature template 509. This comprises identifying statistical variances between the two sets of characterising nodes. Where the statistical variances are determined, at step 523, to lie within permitted predetermined threshold values stored in the user's behaviometric signature template 509, then the verification device 507 returns a successful verification result, at step 525. If the identified statistical variance lies outside permitted predetermined threshold values, then a validation failed result is returned, at step 527. A small magnitude of observed variance between the characterising nodes comprised in the provided signature and in a user's behaviometric signature template 509 is expected, even for a genuine authentic user, due to the inherent inability of the average human to perfectly reproduce their signature each and every time. As a result, each provided signature iteration is expected to deviate slightly from previous iterations, and the system and method may cater to this type of expected variance.

This human characteristic may also be used as an additional security feature. For example, if the correlation analysis results at step 521 display a perfect match with the behaviometric template profile then this may be indicative of a fraudulent signature and for security reasons a failed validation result may be returned, at step 527. A perfect match may be indicative of the instance where the characterising nodes of the provided signature do not have any statistical deviation from the characterising node values defined in the user's behaviometric signature template 509.

Depending on the environment in which the signature verification system 501 is deployed, the verification results may be provided on the display device 505. Where the signature verification system 501 is deployed to control access to a facility, for example, successful verification may result in an optional visual confirmation being displayed on the display device 505, in addition to access to the facility being granted. Any display may be used, e.g., the display may be: a light that turns on when a positive verification is determined, an electronic display, such as a monitor, displaying a customized message, or a mechanical device that physically changes the position of an object such as flipping an object labelled "closed" on one side and "open" on the other.

The above and below described practical implementations of the disclosed systems and methods are provided for illustrative purposes only, and are not limiting. The present method and system may be deployed in a myriad of different environments, and these and other variations and combinations of the features discussed above and below can be utilized without departing from the subject matter as defined by the claims. The provision of the examples described herein (as well as clauses phrased as "such as," "e.g.", "including" and the like) should not be interpreted as limiting the claimed subject matter to the specific examples; rather, the examples are intended to illustrate only some of many possible aspects.

Furthermore, the physical location of the verification device 507 may be local to the signature entry device 503 or located remotely. For example, where the signature entry device relates to the touchscreen of a smartphone, the verification device 507 may be located local to the smartphone, such that the signature may be verified locally on the smartphone without having to establish data communication with a remotely located verification server. In such embodiments it is envisaged that the smartphone may only store one or more authorised users' behaviometric signature templates locally. A further advantage of such an embodiment is that the signature verification system may be used even in so-called mobile telephone 'black-holes.' In other words, the system may be used in geographical areas suffering from very poor or even absent mobile telephone reception signals. Alternatively, the signature entry device 503 may be a dedicated device at one location, verification device 507 may be a server at another location, database 511 may be contained in a memory at yet another location, and all of the devices communicate with one another over a network, such as a wired local area network (LAN), Wi-Fi network, cellular phone network, or wide area network, such as the Internet. In this regard, the signature entry device 503, verification device 507 and database 511, as well as their individual components, may or may not be contained within the same device or at the same location. Similarly, the display device 505 may or may not be contained within the same device as the signature entry device 503, e.g., the display device 505 may be a separate monitor. By way of alternative example, the display device 505 and signature entry device 503 may be implemented via the same touch-sensitive screen.

As previously mentioned, the user's behaviometric signature template 509 is generated during an initial user enrolment process, which is now described in further detail.

Figure 17C:
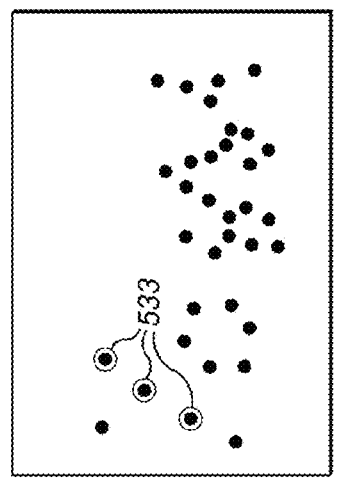
FIGS. 17A, 17B and 17C illustrate the different steps comprised in sampling a provided signature (FIG. 17A), using the system of FIG. 1A; the steps comprising sampling the provided signature (FIG. 17B) and identification of characterising nodes (FIG. 17C).
Figure 17B:
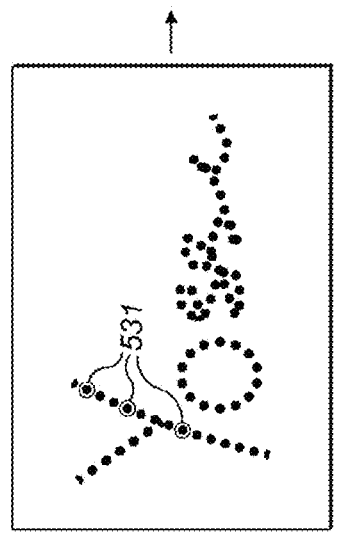
Figure 17A:
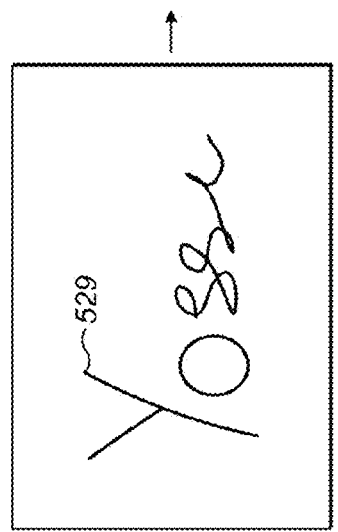

FIGS. 17A, 17B and 17C illustrate different stages comprised in the enrolment process, and specifically illustrate the sampling and characterising node deployment processes. These are described in more detail in relation to FIG. 18 below.

FIG. 17A illustrates a copy of a signature 529 provided at a signature entry device 503, at step 513 of FIG. 16. FIG. 17B illustrates sampled data points 531, as sampled at step 515 of FIG. 16. FIG. 17C illustrates the identification of characterising nodes 533, at step 519 of FIG. 16.

Figure 18:
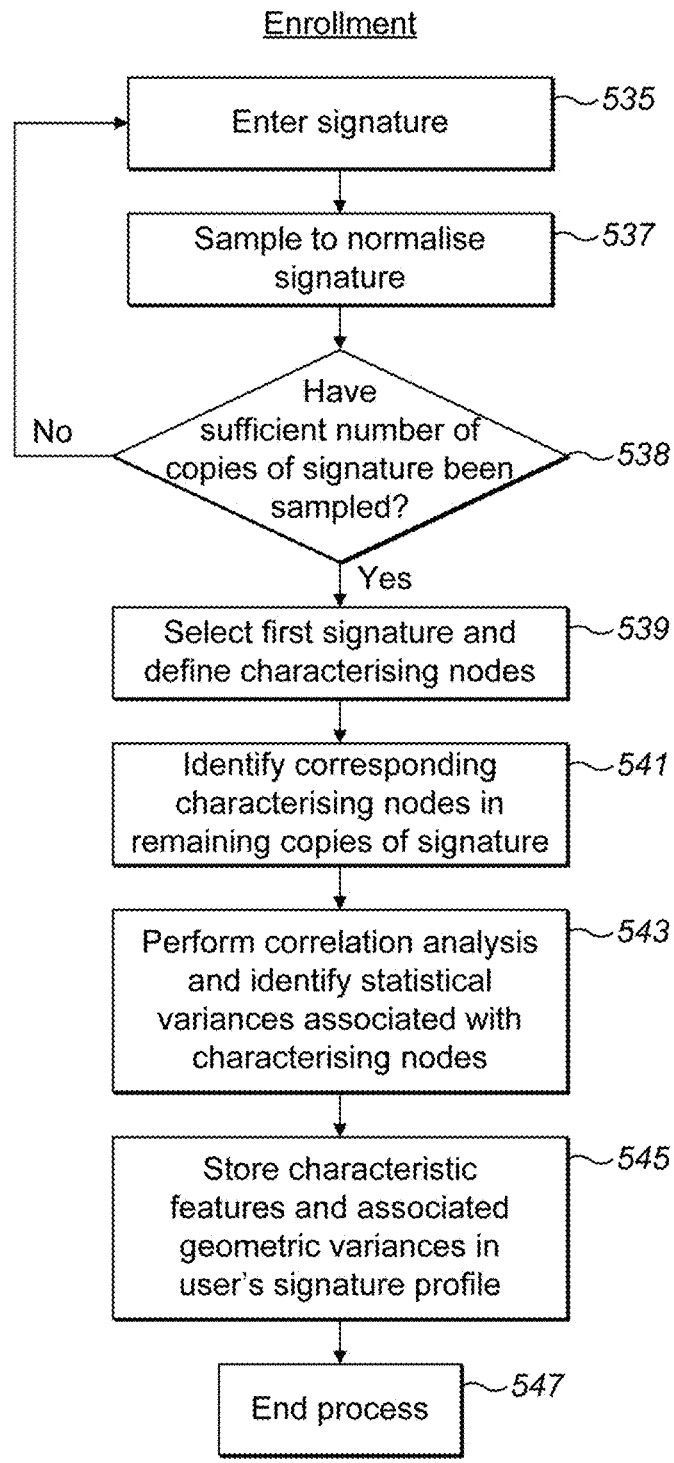
FIG. 18 is a process flow chart outlining the steps comprised in a signature enrolment process, required to generate a user's behaviometric signature template, which may be executed on the exemplary system of FIG. 15.

FIG. 18 is a process flow chart providing an overview of the steps comprised in the enrolment process. The enrolment process may be carried out in the behaviometric signature verification system illustrated in FIG. 15, or in any other similar system comprising at the very least a device 503 for receiving a signature, and a device configured to derive user behaviometric information from the provided signature, such as the illustrated verification device 507.

On initiation of the enrolment process, the user may be required to provide two or more copies of their signature on the signature entry device 503, at step 535. During enrolment two or more iterations (copies) of the same signature may be provided to enable the system to empirically generate statistical tolerance thresholds. These tolerance thresholds improve the practical utility of the signature verification system by reducing the false reject rate. However, tolerance thresholds may be arbitrarily assigned, in which case only a single provided copy/iteration of the signature may be required during enrolment. In order to decrease false reject rates, the which may generate tolerance thresholds customised to each user, on the basis of an empirical analysis. Such calculated tolerance threshold values may at least in part be dependent on an analysis of how consistent the user is in reproducing their signature, such that two or more signatures may be required during enrolment. The behaviometric signature template associated with a user displaying a high level of consistency may have smaller tolerance thresholds compared with a user displaying a lower level of consistency, since for the former a lower degree of statistical variance is expected in provided signature iterations. Therefore, if during a subsequent signature validation process a large degree of statistical variance is observed in the provided signature iteration, it is more likely that the provided signature is a fraudulent signature.

FIG. 17A illustrates an example of a provided signature 529. In the illustrated example the name "Yossi" has been provided. The stylistic script, which graphically characterises the signature, is clearly visible in the illustrated example. As mentioned previously, multiple signature entry enables the behaviometric signature system 501 to generate tolerance threshold values which account for disparities (i.e. statistical variances) between different provided iterations of a signature. As mentioned previously, generated threshold values may be user-specific, and will in part be dependent on how consistent a user is in reproducing substantially identical copies of their signature. A user that is able to consistently reproduce very similar copies of their signature will likely have small threshold values, compared to a user that is unable to reproduce similar copies of their signature. The present signature verification system is designed to cater for both extremes of user.

The larger the number of copies/iterations of the signature provided during enrolment the more accurate the empirically generated tolerance threshold values are likely to be. The term 'accurate' in the present context refers to statistical accuracy, and increases with the number of provided signature iterations during enrolment. The more accurately the generated thresholds quantify a user's ability to accurately and consistently reproduce their signature, the lower the likelihood of the verification system generating a false reject during a subsequent signature verification process. A false reject is generated when a genuine user fails the signature verification process, and for practical implementations of signature verification systems it is desirable to minimise the frequency with which false rejects are generated. Such a system and method may minimise the false reject rate and improve the usability of the signature verification system.

The quality and accuracy of generated behaviometric user information tends to increase with an increase in the number of signature iterations provided during enrolment.

In one aspect, five copies/iterations of the signature are provided during enrolment. The signatures provided during enrolment in the following discussion will be referred to as the reference signatures, to distinguish them from signatures provided for verification during a subsequent verification process. The remaining discussion of FIG. 18 will consider an embodiment wherein five reference signatures are provided during enrolment. However, this is not a hard requirement and that the described method may be carried out with any plurality of provided reference signatures (wherein by a plurality is intended two or more copies of a signature) such that a statistical correlation analysis may be carried out.

The enrolment process is initiated by user entry of a first reference signature on the appropriate signature entry device 503. The reference signature may be concurrently sampled by the signature entry device 503, at step 537, during entry, and normalised. After signature entry the enrolment system queries whether a sufficient number of copies of the reference signatures have been samples, at step 538. The number of required reference signatures may be prescribed by the enrolment entity. Steps 535, 537 and 538 are repeated until the prescribed number of reference signatures has been provided. In the presently described example five reference signatures are required, and thus steps 535, 537 and 538 are repeated for each one of the five provided reference signatures.

A signature may be represented as an ensemble of one or more geometric curves. These one or more geometric curves may be defined mathematically by one or more functions. Sampling may comprise recording a plurality of data points, each data point corresponding to a point located on the geometric curve. A sufficient number of data points on the curve must be sampled in order to mathematically define the geometric curve, which may interchangeably be referred to as a signature curve. In the following discussion the signature curve will be referred to in the singular. However, it is to be appreciated that the signature curve may be comprised of one or more different geometric curves each defined by a different mathematical function.

As mentioned previously in relation to FIG. 16, in order to mitigate for differences in scale (i.e. to compensate for differences in the relative sizes of the entered reference signatures) each one of the entered reference signatures may be normalised. This may be carried out during the sampling process, at step 537. Alternatively, it may be carried out following the sampling step 537. Normalisation mitigates the effects of scale on subsequent validation analyses, thus increasing the likelihood that the analysis results in an accurate result.

Once the system has determined that the prescribed number of reference signatures have been provided, at step 538, a first one of the provided reference signatures is selected and characterising nodes defined on the signature curve, at step 39. This may comprise selecting a subset of the sampled signature data points with a predetermined frequency and or at predefined intervals of separation. This selected subset of signature data points characterises the signature, and are referred to as characterising nodes in order to differentiate them from the remaining data points.

Selection of the characterising nodes may comprise, for example, selecting a subset of the sampled data points that are uniformly distributed along the signature curve. Similarly, data points in the vicinity and/or which bound characterising geometric features comprised in the signature may be selected.

One way of identifying characterising geometric features is to analyse the first and/or second order derivatives between adjacent sampled data points. Analysis of the derivatives may provide information regarding the geometry of the signature curve. In particular, analysis of the second order derivative may be used to determine local maxima, minima and/or points of inflection along the one or more geometric curves. This enables data points associated with significant geometrical variations on the signature curve to be readily identified and designated as characterising nodes.

Once the characterising nodes have been selected on the first selected reference signature, the corresponding data points present on the remaining reference signatures are identified, at step 541, using deterministic optimization methods discussed in further detail below. In the present example, this comprises identifying the corresponding data points on the four remaining reference signatures. This process is referred to as characterising node matching, since it comprises identifying the data points on the remaining reference signatures which correspond to the characterising nodes defined on the first reference signature.

A correlation analysis of the characterising nodes identified in the reference signatures is carried out, and associated statistical variances identified, at step 543. The object is to determine threshold and/or tolerance values that need to be incorporated within the user's behaviometric profile template 509, associated with each one of the characterising node values.

The correlation analysis effectively analyses the relative geometric and temporal relationships between corresponding characterising nodes defined on different reference signatures. This is enabled by sampling both positional and temporal data during the sampling process, at step 537, for each sampled data point. In this way, both the relative geometrical relationships between corresponding characterising nodes defined on different reference signatures, and the relative temporal relationships may be quantified. Further exemplary details of this sampling process are described in the following discussion.

The correlation analysis enables a mean coordinate value along with associated statistical variances to be defined for each characterising node by analysing the statistical variances associated with the coordinate values of each characterising node deployed on each reference signature. This may be determined by comparing relative coordinate values (both positional and temporal) associated with corresponding characterising nodes deployed on the different reference signatures. In other words, one may consider a single characterising node deployed on the five provided reference signatures. The coordinate value associated with the characterising node is likely to differ for each different reference signature on which it is deployed and defines a set of five different coordinate values (assuming that none of the reference signatures are identical). By analysing the set of different coordinate values it is possible to associate a mean coordinate value to the characterising node, in addition to an associated variance.

The present method may adopt relative coordinate values. Rather than defining the coordinates associated with a characterising node with respect to a fixed axis, the positions of the characterising nodes may be defined relative to neighbouring nodes. This may be achieved by associating a positional coordinate vector with each characterising node's position. The positional coordinate vector defines the characterising node's position with respect to a neighbouring node's position. In such embodiments, the relative coordinate values may relate to the scalar component of the positional coordinate vector. The relative mean scalar coordinate values, along with associated variance values are determined from the provided reference signatures. The statistical variance values define the one or more threshold values associated with each characterising node.

Positional coordinate vectors, including mean characterising node coordinate values and associated variances are stored in the user's behaviometric signature profile template 509, at step 545, for future reference during the signature validation process outlined in FIG. 16. The enrolment process is subsequently terminated at step 547, once the positional coordinate vectors have been populated in the user's behaviometric template 509.

In view of the foregoing summary of the registration and validation process, further specific details are set out below in relation to certain embodiments.

The entered signature may be sampled with a predetermined sampling rate, at step 515 of FIG. 16, during verification, and at step 537 of FIG. 18, during signature enrolment. The sampling rate may vary for different applications and will in part be dependent on the hardware capabilities of the signature entry device 503. For example, the signature may be sampled with a frequency in the range of 50 Hz to 200 Hz. Alternative sampling frequencies may equally be used. However, in general the greater the sampling rate the more accurate the derivable behaviometric information is likely to be. Similarly, a very low sampling rate may result in an insufficient number of sampled data points, which in turn may result in less accurate behaviometric information. Alternative sampling frequencies are also envisaged, which lie outside the provided sampling range, and fall within the scope of the present disclosure.

Each sampled data point may be associated with a four dimensional vector $A_v$, where v=x,y,t,c; the set {x,y} are spatial coordinates; t is a time coordinate, which may only take positive values; c is a cusp coordinate (equivalently referred to as a jumping or leaping coordinate, or a pen_up or pen_down coordinate), and is indicative of whether the corresponding spatial and temporal coordinates relate to a data point associated with a mathematical discontinuity. For example, a jump discontinuity and/or a removable discontinuity and/or a pen_up may be associated with a physical gap present in the signature curve. The gap present between the dot and the stems of the letters 'i' and 'j' are examples of a removable discontinuity. In this example the cusp coordinate indicates whether the subject spatial coordinate position is associated with a visible marking, or whether the spatial coordinate position relates to a gap in the signature curve.

The cusp coordinate is a binary value. For example, a cusp value of '0' may be allocated to a data point on the signature curve associated with a visible marking, whilst a cusp value of '1' may be allocated to a data point associated with a gap in the signature curve, or vice versa. The selected convention is irrelevant provided it is applied consistently.

Figure 19:
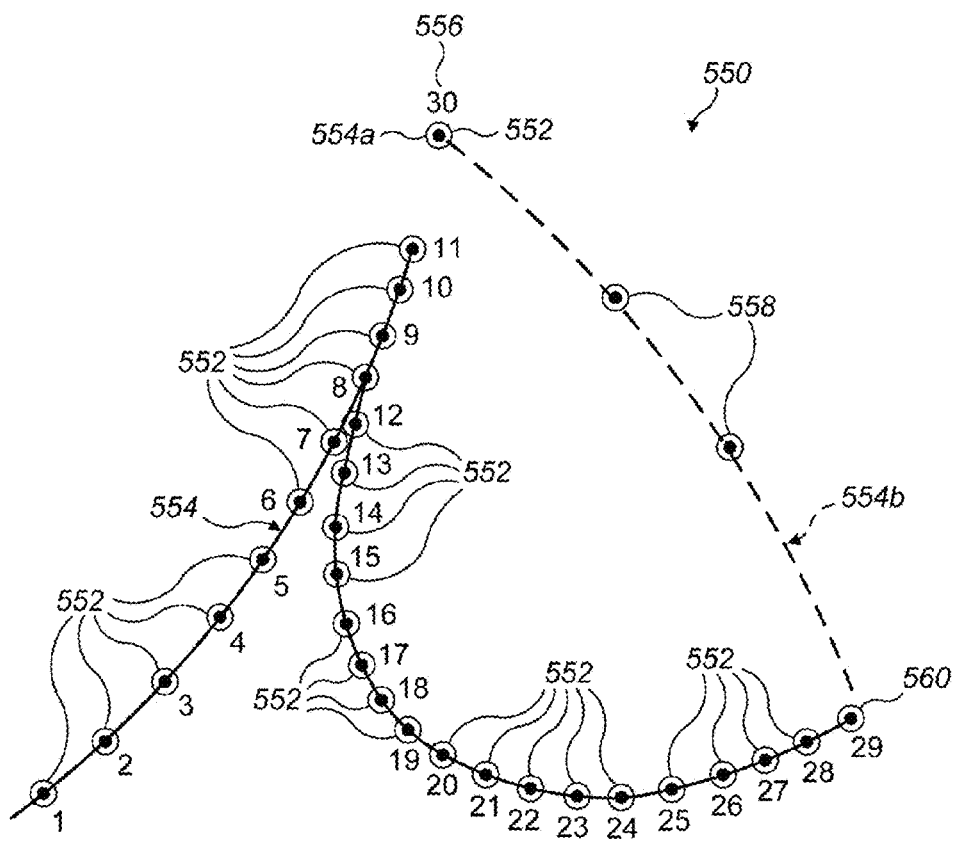
FIG. 19 illustrates a portion of a signature, showing how the signature portion is sampled in order to define a signature curve.

The cusp coordinate c may be considered in view of FIG. 19. In this example an analogy is made with the traditional method of using a pen to provide a signature on paper for illustrative purposes only, since the system illustrated in FIG. 15 does not require use of either pen or paper for signature entry. In accordance with this analogy, a '0' cusp value is associated with a 'pen down' position, and a '1' cusp value is associated with a 'pen up' position. In the following description a cusp coordinate value associated with a 'pen up' position may interchangeably be referred to as a 'pen_up event,' and a cusp coordinate value associated with a 'pen down' position may interchangeably be referred to as a 'pen_down event.' In other words, a '0' is associated with a data point associated with a visible marking, whilst a '1' is associated with a non-visible region. In FIG. 19 the letter 'i' 50 is illustrated, and comprises a plurality of sampled data points 552 defined along the visible portion of the signature curve 554 comprising the dot 554a.

Each one of the sampled data points 552 is associated with a time coordinate. For present purposes, a number 556 indicative of the chronological order in which the different data points on the signature curve have been entered is illustrated. It should be understood that the number 556 indicative of the chronological order in which the sampled data points have been entered is proportional and derivable from the associated time coordinate associated with the specific data point in question, obtained during sampling at step 515 of FIG. 16 or step 537 of FIG. 18. In this way, it is possible to discern the chronological order in which the stylised script of the signature was entered by the user. For example, the chronological order number 556 associated with the dot 554a indicates that this was the last part of the signature that was entered, because its chronological number value is '30'.

The term 'signature curve' may comprise the visible and non-visible line segments, which join all the sampled data points, including singularities such as the dot 554a. Defined in this way the signature curve may not necessarily be equivalent to the stylized script of the signature—it is not exclusively restricted to the visible signature markings 554, 554a. Whilst all the data points associated with visible signature markings are comprised in the signature curve, the signature curve may also comprise a non-visible portion 554b, comprised of data points associated with regions of the signature, which are not associated with visible markings, but that have nonetheless been sampled by the signature entry device 503. For example, interpolated data points 558 (discussed in further detail below) are examples of data points associated with the non-visible portion 554b of the signature curve, and are therefore associated with a '1' cusp coordinate value. In other words, the interpolated data points 558 are associated with a 'pen up' position in the present analogy.

Data points associated with a '1' cusp coordinate value (equivalently referred to as 'pen_up') arise when a data point is sampled on the non-visible portion of the signature curve. The positional coordinates of the sampled data point may then be defined using known interpolation techniques. These interpolated data points 558 lie in the region of the curve discontinuity between the visible sampled data point 560 and the singularity 554a, associated with the dot of the letter 'i'.

Alternatively, the data points associated with a '1' cusp coordinate value ('pen_up') may effectively be represented by a two-dimensional vector (2D), comprising a time coordinate value and a cusp coordinate value only. This avoids having to interpolate the positional coordinates of the data point. In such examples, the sampled data points comprised on the visible portion of the signature curve are 4D vectors, whilst the sampled data points comprised on the non-visible portion of the signature curve are 2D vectors.

Alternatively, sampled data points associated with a '1' cusp coordinate value may be ignored and discarded from the sampled data set. For example, all the sampled data points bounded by a data point associated with a pen_up coordinate and a data point associated with a pen_down coordinate may be discarded. This effectively excludes all but one data point located within the signature curve discontinuity (i.e. within the signature gap). This can reduce computational load, since interpolation of pen_up spatial coordinate values is omitted. In this example the signature curve substantially corresponds to the visible portion of the signature curve.

In certain embodiments, a provided signature may be sampled at a variable sampling rate. This may be achieved by sampling different data points at different frequencies. This reduces the statistical likelihood of any two different signature iterations being identically sampled, and ensures that different data points are sampled for each provided signature iteration. The result of this sampling process is that the set of sampled data points associated with each sampled signature iteration forms a unique data set, which data set may be used to improve the security of the present method. One way in which security may be improved is by executing a hashing function with the sampled data set. Since each sampled data set is unique, the resulting hash associated with each sampled signature iteration is also unique. The hash value associated with each sampled provided signature may be verified during the verification process of FIG. 16. For example, this may be carried out during step 515 once the provided signature has been sampled. Furthermore, the verification device 507 may be arranged to maintain a log of received hash values. In this way, if a signature is provided having a hash value, which corresponds to the hash value of a previously received signature, an error may be flagged, and a verification refusal result returned. The use of a hash function improves the security of the present method and specifically affords protection against relay-type attacks, where a previously sampled signature is recycled. For example, this might occur where a set of data points associated with a previously sampled signature is forwarded to the verification device 507 for verification.

One way in which a random sampling rate may be obtained is through use of multi-thread processing. The device for receiving a signature 3 may comprise a central processing unit (CPU), arranged to execute at least two parallel instruction threads sequentially in the order in which they are received. For example, a first thread may relate to a primary sampling thread instructing the CPU to sample the received signature with a specific frequency, whilst a secondary thread may relate to an alternative instruction set, which is processed in the event that there are insufficient system resources to handle the primary thread. Alternatively, different sampling instructions may be comprised in different instruction threads, which when executed by the CPU instruct the device for receiving a signature 3 to sample the received signature at different rates. For example, the device for receiving a signature 3 may be capable of sampling at a rate of 50 Hz to 100 Hz. A sequence of three different instruction threads may be used to provide the sampling instructions. The first instruction thread may instruct the device 503 to sample at a rate of 60 Hz, whilst the second and third threads may instruct the device to sample at rates of 80 Hz and 100 Hz respectively. This ensures that the provided signature is sampled at a variable sampling rate oscillating between 60 Hz and 100 Hz in this example.

H. Sampling

As mentioned previously in relation to FIGS. 16 and 18 during both the verification and enrolment processes at steps 515 and 537 respectively, the one or more provided reference signatures are sampled. This comprises sampling in both the spatial and time domains, in addition to associating a cusp coordinate value c to the sampled data point (e.g. a '1' for a pen_up event, and a '0' for a pen_down event). This results in a four-dimensional (4D) vector $A_{v_i}$, where i=1, 2, 3, 4 . . . n; and i∈ℕ being associated with every sampled data point. The variable n is indicative of the total number of vectors associated with the data points, and is therefore also indicative of the total number of sampled data points. The variable v has its usual meaning as defined previously. The signature curve may then be defined as a time-ordered series function $f_k(A_v) = \sum_i^{k \le n} A_{v_j}$ where $A_{v_i}$ is a vector delta. The variable i may be any positive integer, and designates different vectors associated with the different data points, including data points associated with non-visible portions of the signature curve.

Since each sampled 4D data point comprises a time coordinate value, the elapsed time with respect to the preceding 4D data point may be determined, such that a velocity vector (V) and an optional acceleration vector (V) may be associated with each sampled data point. The velocity and acceleration vectors capture a user's hand movement behaviometric information.

The normalisation process adopted in certain embodiments, at steps 515 and 537, comprises scaling the provided signature to fit into a predefined rectangle, having a predefined size. For example, the normalization rectangle may have a pixel size of 128,000×96,000. Alternative normalization methods may also be used.

The sampling process (step 515 of FIG. 16; step 537 of FIG. 18) may also comprise a data point density analysis process to determine if a sufficient number of data points have been sampled along the signature curve. This may be carried out in both the spatial domain and in the time domain. The more well defined the signature curve is, the more accurate the derivable behaviometric information.

For the spatial domain, this is achieved by determining if the distance interval between two sampled data points $(x_{i+1}, y_{i+1}, t_{i+1}, c_{i+1})$ and $(x_i, y_i, t_i, c_i)$, i=1, 2, 3, . . . , n lies within a predetermined threshold value, $$(x_{i+1}-x_i)^2 + (y_{i+1}-y_i)^2 \le \text{Maximum allowed distance interval}^2 \qquad \text{eq.1.0}$$

For the time domain, this is achieved by determining if the time interval between two sampled data points is larger than a predetermined threshold value, $$(t_{i+1}-t_i)^2 \le \text{Maximum allowed time interval}^2 \qquad \text{eq.1.1}$$

If either the distance interval threshold or time interval threshold condition of equation 1.0 and/or equation 1.1 is violated, then known linear interpolation techniques may be used to interpolate additional data points on the signature curve within the relevant interval.

The sampled data point density analysis, using equations 1.0 and 1.1 is carried out for all sampled data points along the signature curve. The cusp coordinate value of any interpolated data points will be consistent with the cusp coordinate values of the bounding sampled data points. For example, where the cusp coordinate value $c_{i+1}$ and $c_i$ of two sampled data points bounding an interpolated data point are '0', then the interpolated data point's cusp coordinate value is also '0'. In other words, if two bounding sampled data points relate to a pen_down event, then the interpolated data point located between both sampled data points will also be associated with a pen_down event. Likewise, where the cusp coordinate value of the two bounding data points is '1', then the interpolated data point's cusp coordinate value is also '1'—i.e. a pen_up event. Conventional numerical interpolation techniques may be used, e.g., the text book "A simple introduction to numerical analysis: Volume 2: Interpolation and Approximation" by R. D. Harding and D. A. Quinney, published 1 Jan. 1989, © IOP Publishing Ltd 1989 includes a detailed discussion regarding numerical interpolation.

An illustrative example of a maximum allowable distance interval threshold between two sampled data points, may be nine pixels. In this illustrative example, if the distance interval between any two adjacent sampled data points is greater than nine pixels, then interpolation is used to define one or more additional data points within the interval, until the distance interval threshold condition of equation 1.0 is satisfied.

An illustrative example of a maximum allowable time interval may be five milliseconds, which corresponds to a signature sampling frequency of 200 Hz. Therefore, in this illustrative example, if the sampling rate of the signature entry device 503 is lower than 200 Hz, then interpolation can be used to populate the time intervals between adjacent sampled data points with one or more interpolated data points, until the time interval threshold condition of equation 1.1 is satisfied. Similarly, in certain embodiments interpolation may be used to compensate for any irregularities and/or fluctuations in the sampling rate of the signature entry device 503 in order to maintain a uniform sampled data set.

Interpolation may be used in certain embodiments where the device 503 for receiving the signature also executes other instruction sets associated with different applications. For example, in smartphones arranged to provide a plurality of different functionality, several different applications may be run in parallel, each application being associated with a different instruction thread, and each thread competing for the processor's processing resources. In this example, the processor (e.g. the CPU) may be temporarily unavailable for executing a sampling instruction thread, whilst executing an unrelated instruction thread associated with an unrelated application. For example, this might occur where the smartphone's CPU is occupied determining the GPS position of the handset. The CPU may become temporarily unavailable for executing instruction threads associated with the signature sampling process, which may result in a larger time interval and/or distance interval gap between two adjacent sampled data points. Rather than reinitiating the sampling process, which can be inconvenient, numerical interpolation may be used to complete the sampled data point set.

Optionally, a smoothing function may be used to improve the accuracy of the interpolated data points. This may be achieved by minimising the following action integral, $$f(A_\theta, K) = \text{Min} \int_{t=0}^{t=T} \left( (\text{signature curve} - f)^2 + K\left(\frac{df}{dt}\right)^2 \right) dt \quad \text{eq. 1.2}$$

where the signature curve $A_\theta$ is the set of all sampled data points $B_v$ and interpolated $C_\mu$ data points (i.e. $A_\theta = B_v \cup C_\mu$), $f$ is the smoothing function, and K is a constant which may have a value of 0.5 or less. In this way $f(A_\theta, K)$ is the smoothed function.

Use of a smoothing function may reduce the impact a sampled data point associated with a sharp variance compared to adjacent data points, such as a delta function, has on the verification results. As a result, verification results tend to be more stable. Furthermore, use of a smoothing function during the enrolment process may result in lower determined statistical variance values. This can improve the security of the system by making signatures harder to forge, reducing the false positive rate.

The action integral of equation 1.2 may be minimised by solving the well-known Euler-Lagrange equations of the calculus of variations as a discrete problem, which results in a set of linear equations solved using a three diagonal matrix.

I. Identification of Characterising Nodes

As discussed in relation to FIG. 18, during enrolment a first selected reference signature is analysed and characterising nodes identified, at step 39. Some of the ways that this step may be achieved are now discussed.

The characterising nodes may be defined by selecting a subset of the sampled vectors (recall that the sampled data points are vectors), disregarding any vectors associated with a cusp value of '1' (a pen_up event), such that the selected subset of vectors are substantially evenly distributed throughout the visible portion of the signature curve at uniform length intervals. The selected subset of vectors are referred to as characterising nodes in the following discussion.

Since vectors associated with a cusp value of '1' are disregarded, the nodes relate exclusively to 4D vectors. The density of the nodes is typically much lower than the density of all sampled vectors. Nodes are of the form $(x_{i_1}, y_{i_1}, t_{i_1}, \text{pen\_down}_{i_1}), (x_{i_2}, y_{i_2}, t_{i_2}, \text{pen\_down}_{i_2}), \ldots, (x_{i_m}, y_{i_m}, t_{i_m}, \text{pen\_down}_{i_m})$. The characterising nodes are may be separated from each other with an approximately uniform interval of separation, given by the following inequality.

$$r_{j+1} = \sqrt{(x_{i_{j+1}} - x_{i_j})^2 + (y_{i_{j+1}} - y_{i_j})^2} \cong \text{Constant} \quad \text{eq. 1.3}$$

where j=1, 2, 3, . . . , m and j∈ℕ. While the system and method may favour approximately separating the characterising nodes with uniform intervals of separation, the interval of separation between nodes may diverge from the uniform interval defined in equation 1.3. Equation 1.3 is the Pythagorean Theorem expressed in two dimensions. The distance interval of equation 1.3 only considers geometrical coordinate values, whilst the time and cusp coordinate values are ignored. The index j is used to represent a node, and is not to be confused with the index i, which is used to track the vectors associated with sampled data points, henceforth referred to simply as sampled vectors. The number of nodes m deployed along the visible portion of the signature curve is selected to be less than or equal to half the number of sampled vectors, such that the following condition is satisfied $$m \leq \frac{1}{2}n \quad \text{eq. 1.4}$$

where n is the number of sampled vectors. This may result in significantly reduced processing requirements.

The m nodes are subsequently deployed on the remaining four signatures provided during enrolment in step 535, at step 541. The term 'deployed' as used in the present context is used to refer to the process whereby the sampled vectors comprised on the remaining four signatures are analysed to identify those vectors which substantially correspond to the characterising nodes defined on the first selected signature.

The intervals of the newly deployed nodes, as given by equation 1.3, may be expressed as $$r_{j+1} = \sqrt{(x_{l_{j+1}} - x_{l_j})^2 + (y_{l_{j+1}} - y_{l_j}^2)} \cong \text{Constant} \qquad \text{eq.1.5}$$

where $=1, 2, 3, \ldots, L$, $l \in \mathbb{N}$ represents the number of vectors sampled on the new signature curve, and is unlikely to be equivalent to the number of vectors sampled on the previous signature curve, $L \neq n$. Furthermore the number of vectors L sampled on each new signature curve may be unique, especially where a variable sampling rate is used, and therefore each signature curve may be associated with a different number of sampled vectors L. The constant interval of separation condition set out in equation 1.5 is an approximate relationship, and intervals of separation may diverge from the uniform interval defined in equation 1.5.

The number of nodes m deployed on the visible portions of each remaining signature remains constant $$(\hat{x}_1, \hat{y}_1, \hat{t}_1, \hat{pen\_down}_1), (\hat{x}_2, \hat{y}_2, \hat{t}_2, \hat{pen\_down}_2), \ldots, (\hat{x}_m, \hat{y}_m, \hat{t}_m, \hat{pen\_down}_m) \qquad \text{eq.1.6}$$

where the '^' symbol is used to differentiate the nodes deployed on the remaining four signatures from those deployed on the first provided signature.

The condition of equation 1.4 is maintained for the remaining four provided signatures—the number of nodes m' is less than or equal to half the number of sampled vectors L—which may be expressed as $$m \leq \frac{1}{2} L \qquad \text{eq. 1.7}$$

If this condition is not satisfied for any one of the remaining signatures then a sampling error result may be returned by the signature entry device 503 and displayed on the display device 505. Such an error may be associated with an inadequately sampled signature, for example.

This analysis may be carried out at step 541 by either the signature entry device 503, or by the verification device 507. In the event that a sampling error result is returned, the user may be requested to re-enter their signature, or if a sufficient number of signatures have already been provided, then the signature resulting in the returned error result may be discarded. The latter option may occur where a sufficient amount of behaviometric information has been derived from the preceding signatures. Discarding of one provided signature copy under such circumstances is not expected to unduly compromise the quality of the derived behaviometric information.

The node deployment process is completed by ensuring that the nodes have been deployed on the remaining signatures at substantially equivalent feature positions along the visible portions of the different signature curves. This process is complicated by each different signature curve representing a different signature iteration. Therefore, each signature curve will comprise features which differ slightly from each other signature curve. For this reason a method relying on graphical comparison of the signatures, in order to identify correlated points, may be unsuitable in various circumstances since it will be inaccurate because two non-identical objects are compared. Similarly, a method which matches equivalent coordinates position may also be unsuitable in various circumstances because such a method does not ensure that equivalent features are matched. In view of the foregoing, deterministic matching process may be used as mentioned previously and described in further detail below.

J. Deterministic Matching

The object of the deterministic matching process employed in certain embodiments is to identify the vectors comprised in the remaining four signatures which are most correlated with the nodes deployed on the first provided signature. In the present context the term 'correlated' when associated to vectors is used to mean substantially parallel in orientation. The scalar product of two vectors (also commonly referred to as the 'vector dot product') may be used for this purpose.

The scalar product of two vectors is proportional to the cosine of the angle of separation between the vectors. If the orientation of the two vectors is the same, the angle of separation is zero, and the scalar product is maximised. If the orientation of the two vectors deviates by $\pi/2$ then the scalar product is zero. The scalar product is minimised when the two vectors are separated by $\pi$—e.g. when the two vectors are oriented in opposite directions. Two vectors which are associated with the same node should be substantially parallel in orientation and accordingly the dot product of such vectors is maximised.

Further details of the optimization process will now be described with reference to a first sampled signature curve on which nodes have been defined, and a second sampled signature curve on which the nodes are to be deployed.

The object of the optimization process is to identify a counterpart vector present on the second signature curve for each characterising node defined on the first provided signature. The counterpart is selected as the vector, which is most correlated with the node defined on the first signature. The correlation may be determined from the vector dot product. This process is repeated for every defined node, in order to identify the counterpart vectors present on the second signature curve.

An optimization function M may be defined which is proportional to the scalar product of two vectors, and which is algebraically defined as $$M = \Sigma_{j=1}^{n} f(r_{j+1} * \hat{r}_{j+1}) * g_{j+1} \qquad \text{eq.1.8}$$

where, $$r_{j+1} = \sqrt{(x_{l_{j+1}} - x_{l_j})^2 + (y_{l_{j+1}} - y_{l_j})^2} \qquad \text{eq.1.9}$$

$$\hat{r}_{j+1} = \sqrt{(\hat{x}_{l_{j+1}} - \hat{x}_{l_j})^2 + (\hat{y}_{l_{j+1}} - \hat{y}_{l_j})^2} \qquad \text{eq.1.10}$$

define the line segment lengths, or intervals between adjacent nodes, on respectively the first signature (equation 1.9) and on the second signature (equation 1.10) curves. The '^' symbol is used to denote sampled data points, and/or characterising nodes defined on the second signature.

The line segment lengths are the scalar components of their associated vector quantities. The function $g_{j+1}$ is proportional to the cosine of the angle of separation between the two vectors $(x_{l_{j+1}} - x_{l_j}, y_{l_{j+1}} - y_{l_j})$ defined on the first signature curve and $(\hat{x}_{l_{j+1}} - \hat{x}_{l_j}, \hat{y}_{l_{j+1}} - \hat{y}_{l_j})$ defined on the second signature curve. The product of the scalar components of the aforementioned two vectors $f(r_{j+1} * \hat{r}_{j+1})$ is a convex function.

The vector counterparts of characterising nodes defined on the first signature are identified by maximising the matching function M and solving for each $j^{th}$ index $$\text{maximise } M = \max \Sigma_{j=1}{}^n f(r_{j+1} * f_{j+1}) * g_{j+1} \qquad \text{eq.1.11}$$

Solving the above equation identifies the indices of the counterpart vectors located on the second provided signature, which are most correlated with the nodes deployed on the first signature. In other words, for each node j, maximising the matching function M identifies the associated $1_j^{th}$ vector comprised on the second signature curve, which is most correlated with the $j^{th}$ node. Accordingly, the present optimization process may also be referred to as indices matching, the object being to identify the indices $1_j$ such that j=1, 2, 3, . . . , m and $1_{j+1} > 1_j$.

The matching function $M_j$ for matching the $j^{th}$ characterising node, in accordance with equation 1.11, may be of the form $$M_j = F(\theta_j) * G(d_j, d_{j+1}) * Q(r_j * d_j) \qquad \text{eq.1.12a}$$

such that the total matching is given by $$\text{Total Matching} = M = \Sigma_{j=0}{}^{m-1} M_j \qquad \text{eq.1.12b}$$

where $F(\theta_j)$, $G(d_j, d_{j+1})$, and $Q(r_j * d_j)$ are differentiable functions.

The matching function M may be expressed as a series over all nodes $$\Sigma_{j=0}{}^{m-1} F(\theta_j) * G(d_j, d_{j+1})) * Q(r_j, d_j) \qquad \text{eq.1.13}$$

Using the following definitions:

$$dX_{node\ j+1} = X_{node\ j+1} - X_{node\ j}$$

$$dY_{node\ j+1} = Y_{node\ j+1} - Y_{node\ j}$$

$$dX_{curve\ i_j+1} = X_{curve\ i_j+1} - X_{curve\ i_j}$$

$$dY_{curve\ i_j+1} = Y_{curve\ i_j+1} - Y_{curve\ i_j}$$

$$r_j = \sqrt{dX_{node_{j+1}}{}^2 + dY_{node_{j+1}}{}^2}$$

$$d_j = \sqrt{dX_{curve_{i_{j+1}}}{}^2 + dY_{curve_{i_{j+1}}}{}^2} \qquad \text{eq.1.14}$$

$\theta$ may be defined as the angle formed between the vectors $dX_{node\ j+1}$, $dY_{node\ j+1}$ and $dX_{curve\ i_{j+1}}$, $dY_{curve\ i_{j+1}}$.

$F(\theta_j)$, $G(d_j, d_{j+i})$, and $Q(r_j * d_j)$ have 0 as their minimum value. $F(\theta_j)$, and $G(d_j, d_{j+1})$ are positive and have an upper positive value, and $Q(r_j * d_j)$ is a convex function, such that $Q(ax_1 + (1-a)x_2, ay_1 + (1-a)y_2) \geq aQ(x_1, y_1)$, where $0 \leq a \leq 1$. Whilst Q is a monotonically increasing function, Q', its derivative, monotonically decreases to zero. For example, one may consider a convex function $Z(x) = \ln(1+x)$, its derivative $Z'(x) = 1/(1+x)$, which tends to zero for increasing x. Thus, whilst $Z(x)$ is a monotonically increasing function, its derivative is monotonically decreasing. Similarly, the convex function $Y(x) = x^k$ for $0 < k < 1$ is another example of a monotonically increasing functions, whose derivative is monotonically decreasing—e.g. $Y'(x) = kx^{(k-1)} = k/(x^{(1-k)})$.

The object of the convex function $Q(r_j * d_j)$ in equations 1.12a, 1.12b and 1.13 is to reduce or dampen the effects of edge to edge matching. If the value of the function Q is large when the product $r_j * d_j$ is large then the matching function may inadvertently match vectors associated with similarly long scalar components (e.g. associated with similarly long line segments) in order to increase the value of the matching function $M_j$ even where the matched vectors are associated with different geometric features of the signature curve— e.g. different letters in a signature. Function Q may thus be convex. A convex function is associated with a smaller gradient than for example a linear function, and therefore the rate at which the value of a convex function changes is lower. Use of a convex function in the matching process may result in more stable matching results, which are not as affected by the product of scalar vector lengths, compared to other forms of function. This reduces the likelihood that a characterising node will be matched to a sampled data point associated with a disparate part of the received signature.

$G(d_j, d_{j+1})$ provides a measure of how well distributed the characterising nodes are, and is a maximum when $d_j = d_{j+1}$. In addition, the function $G(d_j, d_{j+1})$ fine-tunes the matching function value when matching between a characterising node and a sampled vector associated both associated with pen_down events. $F(\theta_j)$ is dependent on the angle $\theta_j$ formed between $dX_{node\ j+1}, dY_{node\ j+1}$, $dX_{curve\ i_{j+1}}, dY_{curve\ i_{j+1}}$, and $dX_{node\ j+1}, dY_{node\ j+1}$. In other words, $\theta_j$ is the angle formed between the vector located on the provided signature, $X_{curve\ i_{j+1}} - X_{curve\ i_j}$, $Y_{curve\ i_{j+1}} - Y_{curve\ i_j}$, and the characterising node comprised in the user's behaviometric signature profile template 509, $X_{node\ j+1} - X_{node\ j}$, $Y_{node\ j+1} - Y_{node\ j}$. A characterising node, $node_j$, provided in the behaviomeric signature template 509 is matched to sampled data point, $curve_{i_j}$, comprised in the provided signature.

$F(\theta_j)$ may be selected to be positive and have a lower bound of 0.

The angle $\theta_j$ may be defined with respect to a reference line, defined on the new signature curve, which serves to maintain rotational invariance.

The precise form of the matching function may be selected dependent on certain conditions present on the signature curve. For example, the form of the matching function selected for matching a characterising node associated with a pen_down event, to a vector on the signature curve also associated with a pen_down event may be different to the form of matching function used to match a characterising node associated with a pen_up event to a vector associated with a pen_up event. The selected matching function value may be selected so as to not should not vary excessively as a result of legitimate variances between different provided signature iterations provided by an authentic user, in order to guarantee consistent matching results. Certain such forms of matching function which meet this requirement are discussed below.

The matching function $F(\theta_j) * G(d_j, d_{j+1}) * Q(r_j * d_j)$ of equation 1.12a may be amended in accordance with the following different cases:

Where the node j+1 is associated with a pen_up event and the vector on the curve sample curve $i_{j+1} = (x_{i_{j+1}}, y_{i_{j+1}}, t_{i_{j+1}}, \text{pen\_up}_{i_{j+1}})$ is also associated with a pen_up event, then the matching function $M_j$ of equation 1.12a may be selected to have the form $$M_j = F_2(\theta_j) * Q(r_j, d_j) \qquad \text{eq.1.15}$$

Since in the present scenario both the characterising node and the sampled vector being matched are associated with a pen_up event, the $G(d_j, d_{j+1})$ component may be omitted from the matching function. In other words, because both the characterising node and the sampled vector present on the subsequently provided signature are associated with a gap in the visible portion of the signature curve.

Where the node j+1 is associated with a pen_up event, and the vector on the curve sample curve $i_{j+1} = (x_{i_{j+1}}, y_{i_{j+1}}, t_{i_{j+1}}, \text{pen\_down}_{i_{j+1}})$ is associated with a pen_down event, then the matching function $M_j$ may be selected to have the form $$M_j = F_3(\theta_j) * Q(r_j, d_j) \qquad \text{eq.1.16}$$

where $F_3 \neq F_2$, and the difference between the two functions is related to the derivative of the logarithm of the function, $$\frac{\frac{dF(\theta_j)}{d\theta_j}}{F(\theta_j)}$$

which is

This value is smaller for $F_3$ than for $F_2$.

In this scenario, the characterising node is associated with a gap in the visible portion of the signature curve, whereas the vector present on the subsequently provided signature is associated with a visible portion of the signature. The function $G(d_j, d_{j+1})$ has been omitted from equation 1.16 because the characterising node is associated with a gap (i.e. a pen_up event).

Where the node j+1 is associated with a pen_down event, and the vector on the curve sample curve $i_{j+1} = (x_{i_{j+1}}, y_{i_{j+1}}, t_{i_{j+1}}, \text{pen\_up}_{i_{j+1}})$ is associated with a pen_up event, then the matching function $M_j$ may be selected to have the form, $$M_j = \frac{F(\theta_j) * G(d_j, d_{j+1}) * Q(r_j, d_j)}{10} \qquad \text{eq. 1.17}$$

In this scenario, the characterising node is associated with a visible portion of the signature curve, whereas the vector present on the subsequently provided signature is associated with a gap in the visible portion of the subsequently provided signature.

Where the node j+1 is associated with a pen_down event, and the vector on the curve sample curve $i_{j+1} = (x_{i_{j+1}}, y_{i_{j+1}}, t_{i_{j+1}}, \text{pen\_down}_{i_{j+1}})$ is also associated with a pen_down event, then a matching function having the form of equation 1.12a may be used. In this scenario, both the characterising nodes and the vector present on the subsequently provided signature are associated with visible portions of their respective signature curves.

The form of matching function selected for use in the optimization process is dependent on the characteristics of the node and on the characteristics of the vector comprised on the signature curve. A different matching function is used depending on the characteristics of the node-vector pair being matched, in particular on whether the node-vector pair is associated with a pen_up event. Preferably, the device 503 for receiving a signature may be configured to select the most appropriate form of matching function, on the basis of the node-vector characteristics. Alternatively, the verification device 507 may be configured to select the most appropriate form of matching function.

Equation 1.9 defines the scalar component of the vector associated to a node j as the line segment $r_{j+1}$ between two adjacent nodes j+1 and j, and is therefore dependent on the relative geometrical relationship between the two adjacent nodes. The geometrical orientation of the vector will be determined by the relative orientation of this line segment. The matching process of equation 1.11 effectively identifies the corresponding sampled vector located on the second signature curve, whose associated line segment has a geometrical orientation with respect to an adjacent sampled vector, which most resembles the geometrical orientation of the characterising node's associated line segment defined on the first signature. Since the orientation of the characterising node as defined on the first signature (and therefore the associated line segment) is also dependent on the relative geometrical relationship between two adjacent characterising nodes, the matching process of equation 1.11 effectively analyses and seeks to preserve relative local geometrical relationships.

To improve accuracy and preserve global geometrical relationships between signature iterations, the optimization process may be repeated using an alternative node deployment density. In other words, the characterising nodes are deployed on the first signature with a different density. In order to distinguish this optimization iteration from the previously described iteration, it will be referred to as global optimization, whereas the previous iteration will be referred to as local optimization.

During global optimization, for example, half as many nodes with respect to the number of nodes deployed during local optimization, are deployed on the first signature. The number of deployed nodes m' may be:

$$m' = m/2 \qquad \text{eq.1.18}$$

where m is the number of nodes deployed during local optimization. The number of deployed nodes m' is less than or equal to a quarter the number of sampled vectors L—e.g.

$$m' \leq \frac{L}{4}.$$

As a result of this deployment, the line segments (recall equations 1.9 and 1.10) between adjacent nodes will be larger than the line segments between adjacent nodes found during local optimization. Node matching (the optimization process) is carried out in a similar manner as described previously.

An alternative to re-deployment of the nodes to obtain the required node density, as set out in equation 1.18, is to select alternating nodes previously deployed on the first signature, and to repeat the optimization process as previously described, using these nodes. It may be noted that the line segments in this example will be longer than their local optimization counterparts.

This lower resolution global optimization process establishes whether global geometrical relationships are maintained in the different signature iterations. It may be beneficial to analyse global geometrical relationships between sampled vectors, because global relationships tend to display a larger degree of invariance between different iterations of the same signature, whereas local geometrical relationships are more prone to variation. For this reason, analyses of global geometrical relationships can often provide a good indication of whether a provided signature is a forgery.

Both the local and global optimizations may be carried out by the signature entry device 503, or by the verification device 507 during enrolment, at step 541 of FIG. 18. During a subsequent validation process, local and global geometrical analysis may be carried out during correlation analysis, at step 521 of FIG. 16.

The local and global optimization processes are carried out on all the signature copies provided during enrolment. Where four different copies of the same signature have been provided, the local and global optimization matching processes are carried out three times each. Following the optimization matching process, each node may be associated with a set of coordinate values defining the position of the node on each different signature curve. In this way, a statistical variance may be determined for the position of each node at step 543 of FIG. 18, and this statistical variance along with the nodes may be stored in the user's biometric signature template 509, at step 545. Similarly, the local and global geometric relationships associated with each characterising node may also be stored, along with associated statistical variances. Optionally, the speed and acceleration associated with each node may also be stored. These behaviometrics are all stored in the user's behaviometric signature template 509, for use during a subsequent validation process. The enrolment process is then substantially complete.

During a subsequent validation process (see FIG. 16), at step 519 the nodes pre-stored in the user's behaviometric signature template 509 are deployed on the provided signature. The corresponding positions of the nodes on the newly provided signature are determined using both local and global optimization node densities. The statistical variance with respect to the pre-stored nodes is determined at step 521, and when the corresponding node positions fall outside the acceptable statistical variance associated with each node predefined in the user's biometric signature template 509, at step 523, then a validation fail result is returned at step 527. Similarly, if instead the determined statistical variance with respect to the pre-stored nodes is determined to fall within the allowable variance threshold defined in the user's behaviometric signature profile, at step 523, then a successful validation results is returned, at step 525.

K. Temporal Analysis

To improve the accuracy during validation, in certain embodiments, a temporal analysis of the sampled signature curve is carried out. This comprises analysing the time intervals between the deployed nodes to determine if the observed intervals are consistent with a user's behaviometric signature template 509. Since a genuine user will execute thousands of iterations of their signature during their life, the muscle movements required to execute the signature become automatic. Accordingly, it is expected that the temporal intervals will be substantially constant between different signature iterations. This analysis may also be performed by analysing the speed and acceleration vectors associated with each characterising node. Accordingly, in the below discussion the skilled reference to temporal analysis also comprises analysis of speed and acceleration.

During signature validation the temporal analysis may be carried out during correlation analysis, at step 521. This may comprise calculating the time intervals and/or the speed and/or acceleration vectors between matched nodes deployed on the received signature, and comparing the time intervals with the time intervals and/or the speed and/or acceleration vectors present between the characterising nodes comprised in the user's behaviometric signature profile template 509. If the calculated time intervals lie outside a permitted threshold, then a validation failed result may be returned at step 527, as indicative of a fraudulent user. Similarly, where the calculated velocity and/or acceleration values lie outside permitted thresholds, a validation failed result may be returned, terminating the validation process.

The above discussed temporal data may be derived during the enrolment process, because each sampled data point may be associated with a vector comprising a temporal coordinate value.

Temporal analysis can be useful for identifying attempted signature forgeries, because it relates to a class of behaviometrics which are dependent on a user's movements, namely, the muscle movements carried out in executing the user's signature.

Whilst an expert forger may be able to graphically reproduce a sufficiently identical copy of an authorised user's signature, it is harder for the expert forger to sufficiently reproduce the authorised user's muscle movements in creating the forged signature. In this way, temporal analysis of a received signature can help identify forgeries.

L. Geometric Analysis

Geometric analysis may be carried out during both the enrolment process and the validation process, and may comprise several different analyses. Such analyses may further improve the robustness of the signature verification method and system.

In certain embodiments a geometrical complexity analysis may be carried out, the object being to determine if the provided signature is geometrically sufficiently complex to enable sufficient behaviometric information to be derived therefrom, for subsequent use in a reliable verification process. Typically, the more behaviometric information that is derivable from a provided signature the more secure the system will be. For example, relatively little behaviometric information may be derived from a substantially straight line. In general, the more geometrically complex a provided signature the more behaviometric information can be derived therefrom. Furthermore, the likelihood of a forged signature resulting in a false positive verification result decreases with increased behaviometric information, since there are more variables which can be used to determine the authenticity of the provided signature.

To safeguard the accuracy of the present system 501, and dependent on the specific applications, a minimum geometric complexity rating may be required of a provided signature during enrolment. For example, if the present verification system is used to control access to a safe containing high value documents, a high geometric complexity rating may be required. In such cases, the user may be required to provide their entire signature, comprising first, middle and surnames. In general, a complete signature is likely to be associated with a more complex signature curve, wherefrom more complex behaviometrics may be derived, than for example, a signature comprising only the initials of the user.

For lower-value applications, the geometrical complexity requirements may be reduced, and it may be sufficient to simply provide user initials during enrolment and subsequent validation.

The geometrical complexity analysis may be carried out by analysing first and/or second order derivatives associated with the sampled vectors and/or characterising nodes, thus effectively analysing the curvature changes along the signature curve. A geometrically simple curve will exhibit little curvature change, whilst a complex signature curve will exhibit substantial curvature change.

The geometrical complexity analysis may be carried out both during validation and enrolment. During enrolment, the complexity analysis may be carried out during the sampling stage, at step 537 of FIG. 18, or during the correlation analysis stage, at step 543 of FIG. 18. During validation, the geometrical complexity analysis may be carried out during the sampling stage, at step 515 of FIG. 16, or during the correlation analysis stage, at step 521 of FIG. 16. Conducting the geometrical complexity analysis during sampling has the advantage that the enrolment and or validation process, as the case may be, is immediately terminated in the event that the provided signature is not sufficiently complex, and a new signature entry cycle may be initiated. In this event the user will be instructed via the display device 505 to re-enter a more complex signature iteration. For example, the user may be instructed to enter their complete signature comprising first name and surname, and optionally middle name and/or initial.

Statistical and deterministic deviations may also be analysed. This may comprise analysing the geometrical relationship between a deployed node and a plurality of sequentially located neighbouring nodes deployed along the signature curve. For example, for each deployed node it may comprise analysing the geometrical relationship relative to the succeeding five nodes deployed sequentially along the signature curve. The number of sequential neighbouring nodes the geometrical relationship is analysed with respect is not necessarily required. Rather, the level of security may be increased by increasing the number of sequentially located neighbouring nodes included in the analysis for each node. In certain embodiments six consecutive nodes are used for short signature analysis and eight consecutive sequential nodes are used for long signature analysis. In this context, a short signature may be defined as a signature comprising at most four letters having a geometrical complexity, wherein the direction of the signature curve changes by $\pi$ (e.g. 180°) or more. For example, the letter 'C' is an example of a letter wherein the signature curve changes by $\pi$. In contrast a long signature may be defined as a signature comprising more than four letters comprising a signature curve which changes by $\pi$ or more. Accordingly, signature length may not be associated with the number of different letters comprised in the signature, but instead associated with the number of geometrically complex letters comprised in the signature.

During enrolment, the geometrical relationships may be calculated during correlation analysis, at step 543 of FIG. 18, and are stored in the user's behaviometric template 509, at step 545.

Figure 20:
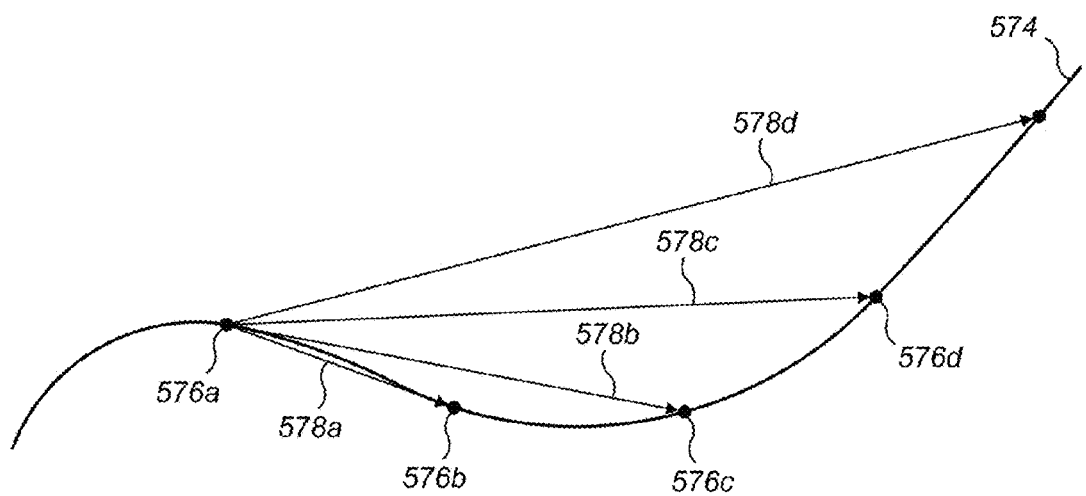
FIG. 20 is a visible portion of a signature curve comprising a plurality of characterising nodes, and shows how geometric relationship information may be calculated during the signature enrolment process of FIG. 18, or during the verification process of FIG. 17.

FIG. 20 provides an illustrative example of how geometrical relationship information may be calculated during enrolment. A portion of a signature curve 74 is illustrated comprising five consecutive nodes 576a, 576b, 576c, 576d, 576e located sequentially along it. Starting with the first node 576a, the geometric relationship with respect to each one of the neighbouring nodes 576b, 576c, 576d, and 576e is determined. The geometric relationship may be defined by a vector joining the two relevant nodes. For example, the geometric relationship between nodes 576a and 576b is defined by the vector 78a. Similarly, the geometric relationship between nodes 576a and 576c is defined by the vector 78b; the geometric relationship between nodes 576a and 576d is defined by the vector 78c; and the geometric relationship between nodes 576a and 576e is defined by the vector 78d. In the illustrated example, whilst only four geometric relationships are defined between the five illustrated nodes 576a, 576b, 576c, 576d, 576e, the five geometric relationships may be defined between six sequentially deployed nodes.

This process is repeated for each one of the signature iterations provided during enrolment. For example, if five iterations of a signature are provided during enrolment, the above described process is repeated for each signature iteration. In this way, an average and statistical variance value may be determined for each geometric relationship and used to define a threshold tolerance level, which is stored in the user's behaviometric template 509.

This geometrical analysis may be repeated for both the local and global optimization node densities. When the geometrical analysis is carried out for nodes deployed with a density provided by equation 1.7 (local optimisation), the geometrical analysis effectively analyses local geometrical relationships. When the geometrical analysis is carried out for nodes deployed with a density provided by equation 1.18 (global optimization), the geometrical analysis effectively analyses global geometrical relationships.

During a subsequent validation process, the above described geometric analysis is repeated to identify the corresponding geometric relationships. Henceforth, any reference to geometric analysis comprises analysis of both local and global geometrical relationships, using the node densities associated with respectively local optimisation and global optimisation.

Geometrical relationships identified during validation are subsequently compared with the predefined threshold tolerance levels stored in the user's behaviometric template 509. If the calculated geometric relationships lie outside the threshold tolerance levels, then a consistency error may be raised and a validation failed result is returned, at step 527 of FIG. 16.

During enrolment the above described process may be carried out for each characterising node, such that the relative geometric relationships between each characterising node and its neighbouring nodes are defined. In this way, during a subsequent validation process, any one or more randomly selected deployed characterising nodes may be used for the purposes of carrying out the geometric analysis. This tends to reduce the required computing complexity and/or power since only the relative geometric relationships of a randomly selected subset of deployed characterising nodes is analysed. The geometric analysis may also be carried out on each deployed characterising node, processing power permitting.

Similarly, during validation the geometric analysis of one or more randomly selected deployed characterising nodes and the three adjacent sequentially located nodes may be analysed. Any number of sequentially located nodes may be used for geometric analysis.

For example, a sequence of eight deployed nodes of the form $Curve_{i_j}$ may be selected, as illustrated below:

e.g. $Curve_{i_j}, Curve_{i_{j+1}}, Curve_{i_{j+2}}, Curve_{i_{j+3}}, Curve_{i_{j+4}}, Curve_{i_{j+5}}, Curve_{i_{j+6}}, Curve_{i_{j+7}}$ It is to be noted that the term deployed nodes in this example refers to the sampled vectors comprised on the subsequently provided signature, which have been matched to the characterising nodes comprised in the user's behaviometric signature template 509.

Alternatively, the geometrical relationships associated with six to eight sequentially located nodes may be analysed. In certain embodiments, geometrical analysis might comprise calculating a moving average of the geometrical relationships and monitoring how this average changes for each successive group of sequentially located nodes. For example, where six sequentially located nodes are selected, a length vector may be defined between the first selected node and each one of the five subsequently located nodes, as illustrated in FIG. 6. The statistical average of this length vector may be determined, and compared to the statistical average length vector calculated for a subsequently located group of six sequentially located nodes. This process may be repeated for each node comprised on the signature curve, such that a statistical average length vector value may be associated with each node. The moving average of the determined length vector may be stored for use during validation in the user's behaviometric signature template 509.

During a subsequent validation process a similar analysis is carried out in respect of the signature provided for validation. The moving average of the determined length vector may then be compared with the moving average data stored in the user's behaviometric signature template 509 for consistency. If significant variances in moving average are observed, which are larger than a predetermined threshold value, then a validation failed result may be returned, at step 527 of FIG. 16. This statistical average length vector is proportional to the geometrical relationships between adjacent vectors, and therefore if a large discrepancy is observed during validation, between the moving average values comprised in the user's behaviometric signature template 509 and a signature provided for verification, this is likely indicative of the provided signature being fraudulent.

In different embodiments, a different number of sequentially located nodes may be used to analyse a moving average of geometrical relationships. However, the information content of the moving average will be proportional to the number of different sequentially located nodes comprised in the moving average. In general, less geometrical information may be derived from a smaller number of sequentially located nodes. For example, if only two sequentially located nodes are used, then only one geometrical relationship datum may be derived—the length interval between the two adjacently located nodes. Such a selection provides a limited overview of any present geometrical relationships. For this reason, six to eight sequentially located nodes may be used for geometric analysis purposes. This choice of number of nodes may be based on consideration of local and/or global geometric relationships and processing restrictions.

The method may be tailored to the processing resources of the system. For example, method may be executed on hardware having relatively limited processing power, such as a smartphone.

Where processing power is available in abundance, the moving average may be calculated for more nodes, e.g. for more than eight sequentially located nodes.

The geometric analysis may also be combined with the previously described temporal analysis, in which case the time intervals between the selected nodes are analysed and compared with data comprised in the user's behaviometric template 509.

As mentioned previously, this may comprise analysis of time and associated acceleration vectors.

M. Uncovered Curve Error

In certain embodiments an uncovered curve error analysis is also performed during validation. This comprises determining the amount of geometric information present between two adjacently deployed nodes, deployed on a signature provided for verification. If the determined geometric information is greater than a threshold value, an error is flagged. This means that the provided signature comprises a curve portion absent from the user's behaviometric signature template 509, and may be indicative of a forged signature, in which case a validation failed result is returned at step 527 of FIG. 16.

The geometric information may be determined from an analysis of first and/or second order derivatives associated with sampled vectors present between deployed nodes. For example, consider the adjacently deployed nodes $(\hat{x}_{k_{j+1}} - \hat{x}_{k_j}, \hat{y}_{k_{j+1}} - \hat{y}_{k_j})$. If the geometric information present between the two deployed nodes is larger than a threshold value, then an error is raised. The error is raised when the straight line segment $(x_{i_{j+1}} - x_{i_j}, y_{i_{j+1}} - y_{i_j})$ is mapped to $(\hat{x}_{k_{j+1}} - \hat{x}_{k_j}, \hat{y}_{k_{j+1}} - \hat{y}_{k_j})$, and the amount of geometric information present between the points $(\hat{x}_{j+1}, \hat{y}_{k_{j+1}})$ and $(\hat{x}_{k_j}, \hat{y}_{k_j})$ is greater than the predetermined threshold. In the present context, this means that an analysis of the first and second order derivatives between the aforementioned points is larger than a predetermined threshold. This might occur where a meandering curve is present between the aforementioned data points, which is not present in the user's behaviometric signature template 509.

N. Cusp Errors/Arc Deviation

In certain embodiments an arc deviation analysis is carried out, which comprises comparing the length of the signature curve joining successive nodes deployed on the provided signature, with the length of the signature curve joining successive nodes present on the one or more signatures provided during enrolment. This ratio may be expressed as $$\operatorname*{Min}_{j}\left(\frac{d_j}{\operatorname{Arc}(Curve_{i_j}, Curve_{1+i_j}, Curve_{2+i_j}, \ldots, Curve_{i_{j+1}})}\right) \quad \text{eq. 1.19}$$

where the following relationships hold $$dX_{curve\ i_{j+1}} = X_{curve\ i_{j+1}} - X_{curve\ i_j}$$

$$dY_{curve\ i_{j+1}} = Y_{curve\ i_{j+1}} - Y_{curve\ i_j}$$

$$d_j = \sqrt{dX_{curve i_{j+1}}^2 + dY_{curve i_{j+1}}^2}$$

If the ratio is less than a predetermined threshold value, then an error is raised during the validation process. The arc deviation analysis helps to identify statistical variations in the provided signature, which may be indicative of a fraudulent signature.

In certain embodiments during the enrolment process illustrated in FIG. 18, the provided signature displaying the greatest variance with the other four provided signatures is discarded and is not used to derive user biometric information for populating in the user's biometric signature template 509.

O. Customisable Security Policy

The method and system may also be used to implement a dynamic, customisable security policy, wherein the applied threshold values comprised in the user's behaviometric signature profile template 509, may be varied on the basis of a historical risk assessment of the user's preceding transactions. This may be achieved by monitoring and maintaining a record of historical transactions associated with a user's behaviometric signature profile template 509. This is explained in further detail below.

The risk assessment may comprise monitoring and calculating any one or more of the following characteristics:

User Consistency

The object of this characteristic is to determine how consistent the user is in reproducing their signature. This may be achieved by comparing a selection of previously provided signatures and analysing the statistical variances of the characterising node values deployed on each previously provided signature. In this way a mean statistical variance may be determined, and on the basis of which a consistency rating may then be defined. If the observed mean statistical variance is very small, then the user displays a high level of consistency in reproducing their signature, and the consistency rating will reflect this. Similarly, if the observed mean statistical variance is large, then the user displays a relatively low level of consistency in reproducing their signature, and the consistency rating will reflect this.

The behaviometric threshold values used during the validation process in order to determine if a provided signature is authentic, may be reduced for a user displaying a high degree of consistency, since it is expected, on the basis of the historical analysis, that such a user will be able to consistently reproduce their signature to a high level of accuracy.

Similarly, the behaviometric threshold values used during the validation process in order to determine if a provided signature is authentic, may be increased for a user displaying a low level of consistency, since it is expected, on the basis of the historical analysis, that such a user will not be able to consistently reproduce their signature to a high level of accuracy. Rather, it is expected that the provided signatures will display a high level of inconsistency, which may be reflected by a relatively large mean statistical variance observed between previously provided signatures.

The mean statistical variance may be determined by analysis of a plurality of previously provided signatures. For example, the historical analysis may comprise analysing all signatures provided over a preceding time period. For example, over the course of one year. Alternative time periods may also be used such as one or two weeks, or one or more years.

Alternatively, the historical analysis may compare a fixed number of previously provided signatures. For example, the five previously provided signatures may be analysed. The specific number of previously provided signatures may be selected based on the needs of the particular application.

In this way the consistency rating may be used to adapt and/or customise the specific behaviometric threshold values for the user, depending on how consistently they are able to reproduce their signature. One advantage of this approach is that the false reject rate is likely to be lowered. Furthermore, since a user's signature will tend to change over long time periods, for example over years, the behaviometric threshold values defined in a user's behaviometric signature profile template 509 may or may not remain consistent with the user's signature. In particular, a behaviometric signature profile template which adopts static behaviometric threshold values may become obsolete over time, in particular if the user's signature changes during that period of time.

Signature Complexity

The complexity of the signature may be analysed by looking at the velocity and associated acceleration vectors defined for each node. In particular, a complexity rating may be defined as $$\text{Signature Complexity} = \int_{t+0}^{T} R_1(V, \dot{V}) dt \qquad \text{eq.1.20}$$

$R_1$ is a measure of how the velocity changes along the provided signature and it effectively provides information regarding direction changes of the signature curve.

$R_1$ is defined as $$\int_{t=0}^{T} \left( \left\| \frac{d}{dt}\left( \dot{V} - \frac{\dot{V} \cdot V}{V \cdot V} V \right) \right\| + \left\| \frac{d}{dt}\left( \frac{\dot{V} \cdot V}{V \cdot V} V \right) \right\| \right) dt;$$

where V is the velocity vector; and $\dot{V}$ is the acceleration vector.

The signature complexity may be used to determine if the signature is sufficiently complex. In this context, complexity relates to geometrical complexity. For example, a straight line lacks complexity, whereas a curve having many different changes in gradient is likely to be geometrically complex. Accordingly, geometric complexity is proportional to slope (i.e. gradient), and therefore velocity and acceleration.

Where the calculated signature complexity value for a provided signature is less than a predetermined complexity threshold value, then the provided signature may be determined to lack the required complexity, and the signature validation may be refused. Alternatively, and dependent on the context within which the present method is implemented, a reduced or restricted level of access may be provided. For example, when the present signature verification method is used to control remote access to a bank account, a reduced level of access may comprise allowing the user to view their bank statements, but not allow the transfer of funds unless further security procedures are successfully passed. In general a signature lacking complexity may be more easily forged than a geometrically complex signature, and on this basis a policy decision may be made by the entity implementing the present method in order to determine what further security measures may be required for verifying the identity of a user having a signature lacking the required complexity.

In certain embodiments, when a signature is provided which lacks the required level of complexity, the user may be requested to re-enter a more complex version of their signature. For example, where the user has provided a signature comprising only the initials of the user's name, the provided signature may lack the required level of complexity. If this finding is subsequently confirmed by the complexity analysis, then the user may be required to provide a signature comprising their entire name for verification.

User Experience

This analysis may comprise reviewing a historical log associated with a particular user's behaviometric signature profile 509 to determine how often the user has provided their signature for verification. The more often a user uses the present method, the more accurate the user's behaviometric profile is likely to be, especially where the behaviometric thresholds are updated using historical user data. Thus experience may be indicative of how reliable the behaviometric thresholds are for the purposes of verifying a user's identity. This observation may have a bearing on the level of services offered to a specific user by the entity implementing the present method. For example, a user associated with a high experience rating may be provided with more access to different services on the basis of a verified signature, compared to a user having a low experience rating.

Returning to the example of a bank, where the present signature verification method is used to access a user's bank account, a user associated with a high experience rating may be provided with access to funds transfer services, whereas a use associated with a low experience rating may only be provided with access to account statements.

Security Alert Logging

In certain embodiments a log may be maintained for each user, which log maintains records of any previously raised security alerts. For example, a record of any failed verification results raised in respect of any previously provided signature. On the basis of this log, the behaviometric threshold values may be amended to improve security. For example, if a particular user's account has witnessed a high number of failed signature verification results over a predetermined period of time, then the behaviometric thresholds may be reduced to decrease the likelihood of a fraudulent user generating a false positive signature verification result. In other words, a user account which has witnessed a relatively high number of failed verification results may be flagged as a high risk user account and the behaviometric threshold values amended accordingly, to decrease the likelihood of a fraudulent user deceiving the present system.

Likewise, the log may also comprise a record of all successfully passed verification results, in which case this may be used as an indicator of how accurate the behaviometric tolerance threshold values comprised in the user's behaviometric signature profile template 509 are. For example, if a user's log indicates that a large number of successful signature verification events have occurred, then this may be indicative that the behaviometric information comprised in the user's behaviometric signature template 509, comprising the tolerance thresholds, accurately represent the user. In this way, a security rating may be associated with the specific user's behaviometric signature profile. A service provider, for example a financial entity, may then tailor the available services to the user on the basis of the associated security rating. For example, the financial entity may allow a user whose behaviometric signature template 509 is associated with a high security rating to effect large value transactions without requiring any further form of identity verification. In contrast, a user whose behaviometric signature template 509 is associated with a low security rating may be restricted to only low value transactions.

In accordance with this aspect, a recently enrolled user's behaviometric signature template 509 is likely to be associated with a low security rating, which will increase as the number of successful verifications increases.

This embodiment is well suited for use with dynamic behaviometric tolerance thresholds, which are fine-tuned in time on the basis of a historical analysis of the observed statistical variances displayed by signatures previously provided over a predetermined time period—for example, over the course of the preceding year.

P. Additional Embodiments

In certain embodiments, the device 503 for receiving the signature may relate to an electronic processing device such as a computer comprising a touch screen, a touch-screen enabled smartphone, or any other electronic device comprising a touch screen. In such embodiments, the functionality of the display device 505 and the signature entry device 503 may be provided by the same physical apparatus. Similarly, the electronic device, be it a computer or a touch screen enabled smartphone, may also be used during signature validation. In other words, a user's biometric signature may be verified using a user's existing electronic devices.

Alternatively, the device 503 for receiving the signature may relate to an image capture device such as a motion picture capture device (e.g. a camera), arranged to capture a sequence of images. In such embodiments, the signature may be provided by a user gesture, which gesture is captured by the image capture device. For example, the user may trace their signature via a gesture which is captured by the image capture device. The sequence of captured image frames are then analysed in order to determine the user's signature. The remaining signature analysis may be substantially as described in the receding description. However, in such aspects the image capture device may be arranged to capture three-dimensional spatial coordinate values. Thus, any relative change of the distance of the users hand and/or fingers in a plane perpendicular to the capture plane of the image capture device may also be captured. The image capture device may be arranged to track relative coordinate positions along any one of three orthogonal axis x (e.g. horizontal axis), y (e.g. vertical axis) and z (e.g. depth axis) relative to the image capture device. This can help to identify pen_up events (e.g. gaps in the signature curve) in the signature. When tracing their signature via a gesture, the user is likely to mimic the hand movements that they would normally reproduce using conventional pen and paper to sign their signature, in a plane which is substantially parallel to the image capture plane. Every signature gap, for example the gap between the stem of the letter 'i' 554 and its dot 554*a* (see FIG. 19) may be associated with a relative displacement of the hand in a plane oriented substantially normal to the image capture plane, which is akin to the hand gesture associated with the act of lifting the pen from paper. In this way, a hand/finger gesture associated with a signature may be captured, and gaps in the signature curve readily identified.

The disclosed systems and methods may be used as a security means to control unauthorised use of weapons, such as a handgun. For example, the handgun may comprise a signature entry device arranged to receive an authorised user's signature. The handgun may be configured with a secure local storage unit comprising the authorised user's behaviometric template. In order to operate the handgun, entry of an authorised signature is required. In order to achieve this, the handgun may be configured with an electronic and/or mechanical circuit arranged to prevent operation of the handgun until a valid signature has been provided in the signature entry device. The validity of the provided signature may be verified using the afore-described method. The enrolment process may be carried out at the point of sale.

The disclosed systems and methods may also be used to control access to a vehicle. In place or in addition to the conventional key and lock, the vehicle may comprise a device suitable for receiving a signature and a verification device arranged to verify the authenticity of a provided signature.

The system and method may be used to control access to a secure resource and/or entity, e.g., to a safe comprising valuable items, or to a secure facility.

Whilst many of the foregoing examples have been described within the context of determining the authenticity of a provided signature comprising a stylized script of letters representative of a person's name, the system and method may be used to also verify other user generated symbols and/or patterns. By way of example, this may comprise verifying the manner in which a user traces a pattern on a touchpad and/or on a touchscreen. Where the patterns are traced on a touchpad, the pattern may be invisible as it is being generated (e.g. a person may use a touchpad, in which there is no separate display arranged to display the pattern as it is being generated). Alternatively, a touch-sensitive screen may be used, such that the pattern may be displayed on the screen as it is being generated. The user generated pattern may then be verified in substantially the same manner as described in the preceding description, albeit in this instance the user's behaviometric signature template 509 may relate instead to a user's behaviometric pattern template. Accordingly, it is to be appreciated that within the present context, a signature may relate to any user generated indicia.

The disclosed systems and methods may be used to authorise an online transaction via an intermediate payment authority, such as PayPal™. For example, a user wishing to initiate a transaction with an e-commerce entity, such as an online retailer (e.g. Amazon.com™), may nominate to execute the transaction using PayPal™. At the transaction confirmation stage, the user may be required to provide their signature in order to complete the transaction, which provided signature may be verified using the method and/or system of the present disclosure.

While many of the foregoing components and steps relate to increasing the accuracy of signature verification, these steps will not be applicable or necessary in all circumstances. In that regard, many applications will not require a variety of the foregoing components and steps in order to reach commercially acceptable levels of accurate verification.

It is noted that although the disclosed systems and methods are presented above in the context of the architecture arrangements depicted in FIGS. 1A, 2A, 2B and 2C alternative arrangements may be conceived by the skilled person that fall within the scope of the claims. For example, a mobile computing device may perform the functions of the server in FIGS. 2A, 2B and 2C. Furthermore, although such a mobile computing device may use an integrated touchscreen device to receive/capture a user's signature gesture other input mechanisms may be used. For example, the mobile computing device may be in communication with a "smartpen" that is able to track the position of its tip as a user signs their signature gesture. Alternatively the mobile computing device may be in communication with other "smart" devices, such as a smartwatch with an input mechanism (such as a touchscreen). Communication between the mobile computing device and the smart device may conveniently be via a wireless connection, e.g. WiFi, near-field communication, Bluetooth or any other suitable wireless communications system.

The herein described embodiments are provided for by way of example only, and are not limiting. It will be understood that the present invention may be implemented in a myriad of different applications where identification verification is required, and such applications fall within the scope of the present invention. In that regard, references herein to requirements and aspects of "the present invention" are not intended, and depending on the context will not, refer to requirements and aspects that are present in the subject matter defined by any particular claim. In other words, each claim is defined by the limitations in the claim and is not limited by the particular examples set forth in this detailed description. It will also be understood that the embodiments described may be used individually or in combination, and such alternatives fall within the present scope.

The invention claimed is:

1. A registration method for verifying the identity of a user and granting access to a restricted resource on the basis of a pre-defined security policy, the method comprising:
  receiving, at an authentication server from a computing device n signature gestures from a user, each of the n signature gestures representing a different level of signature complexity, and where the n signature gestures comprise at least a full form and a partial form of the user's signature;
  storing in a data store associated with the authentication server each of the n signature gestures within a user profile as a reference signature gesture; and
  associating at a processor of the authentication server, in a registration step, each of the n reference signature gestures with a different security level defined within a security policy, wherein the processor is operable to subsequently compare received signature gestures associated with a user request for access to the restricted resource with one or more of the stored n reference signature gestures in order to verify the identity of the user, and, in the event the that the user is verified, to grant access to the restricted resource.

2. The method of claim 1, wherein the signature gestures received from the user are in the form of user data captured as the user enters the signature gesture at the computing device, the user data comprising a plurality of sample points.

3. The method of claim 1, wherein the authentication server, during an enrolment process, receives a number of samples of each of the n signature gestures from the user, comprising at least a number of samples of a full form of the user's signature and a number of samples of a partial form of the user's signature, and wherein the processor characterises and defines each of the n signature gestures using the number of samples of each of the n signature gestures received from the user.

4. An authentication server for verifying the identity of a user and granting access to a restricted resource on the basis of a pre-defined security policy, the authentication server comprising:
  inputs arranged to receive n signature gestures from a user, each of the n signature gestures representing a different level of signature complexity, and comprising at least a full form and a partial form of the user's signature;
  a data store associated with the authentication server arranged to store each of the n signature gestures within a user profile as a reference signature gesture;
  a processor arranged to associate each of the n reference signature gestures with a different security level defined within the security policy;
  inputs arranged to receive user data relating to a signature gesture entered by a user at a computing device, the user data associated with a user request for access to the restricted resource, the user data comprising a plurality of sample points, wherein the processor is operable to verify the user data by comparing the user data to the reference signature gestures, and to encode a verification message within a digital image; and
  outputs arranged to notify the user that the identity of the user has been verified on the basis of the user data received from the computing device.

5. A method of verifying the identity of a user and granting access to a restricted resource on the basis of a pre-defined security policy, the method comprising:
  receiving a request for access to the restricted resource;
  determining a security level associated with the received request on the basis of the pre-defined security policy;
  accessing a user profile, the user profile comprising a stored reference signature gesture associated with each security level within the predefined security policy;
  determining the stored reference signature gesture associated with the security level associated with the received access request;
  notifying the user of signature gesture sign-in requirements based on the access request and the determined security level;
  receiving the required signature gesture from the user; and
  comparing the received signature gesture with the reference signature gesture to determine the identity of the user and in the event that the user is verified to grant access to the restricted resource.

6. The method of claim 5, wherein the required signature gesture is received in the form of user data captured as the user performs the required signature gesture at a computing device, the user data comprising a plurality of sample points.

7. The method of claim 5, wherein, in the event that the user is not verified on the basis of the received signature gesture, but the comparison result is within a predefined tolerance of a required tolerance level, the user is granted access to the restricted resource at a lower security level than the level requested.

* * * * *